United States Patent
Alli et al.

(10) Patent No.: US 10,209,534 B2
(45) Date of Patent: Feb. 19, 2019

(54) INCREASED STIFFNESS CENTER OPTIC IN SOFT CONTACT LENSES FOR ASTIGMATISM CORRECTION

(71) Applicant: Johnson & Johnson Vision Care, Inc., Jacksonville, FL (US)

(72) Inventors: Azaam Alli, Jacksonville, FL (US); Dola Sinha, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 106 days.

(21) Appl. No.: 15/203,414

(22) Filed: Jul. 6, 2016

(65) Prior Publication Data

US 2016/0313571 A1    Oct. 27, 2016

Related U.S. Application Data

(63) Continuation-in-part of application No. 13/430,891, filed on Mar. 27, 2012.

(51) Int. Cl.
  *C08J 3/28* (2006.01)
  *G02C 7/04* (2006.01)
  (Continued)

(52) U.S. Cl.
  CPC ........ *G02C 7/049* (2013.01); *B29D 11/00048* (2013.01); *B29D 11/00153* (2013.01); *C08J 3/28* (2013.01); *C08J 5/18* (2013.01); *G02B 1/043* (2013.01); *G02C 7/047* (2013.01); *B29K 2033/26* (2013.01); *B29K 2083/00* (2013.01); *B29K 2105/0061* (2013.01);
  (Continued)

(58) Field of Classification Search
  None
  See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |

(Continued)

FOREIGN PATENT DOCUMENTS

| | | |
|---|---|---|
| CN | 1936648 A | 3/2007 |
| CN | 101076752 A | 11/2007 |

(Continued)

OTHER PUBLICATIONS

Crivello, et al, Photoinitiators for Free Radical Cationic & Anionic Photopolymerisation, 2nd Edition, vol. III, pp. 275-298, John Wiley and Sons, New York, 1998.

(Continued)

*Primary Examiner* — Peter A Salamon
(74) *Attorney, Agent, or Firm* — Raef M. Shaltout

(57) ABSTRACT

A molded contact lens comprising a stiffer optic zone relative to the peripheral zone of the contact lens provides an optical element for correcting astigmatism without the need for or substantially minimizing the need for the correction of rotational misalignment. The higher elastic modulus optic zone vaults over the cornea thereby allowing a tear lens to form. The tear lens follows or assumes the shape of the back surface of the contact lens. The combination of the tear lens and the optical zone provide an optical element for correction of refractive error.

36 Claims, 2 Drawing Sheets

(51) Int. Cl.
*G02B 1/04* (2006.01)
*B29D 11/00* (2006.01)
*C08J 5/18* (2006.01)
*B29K 105/00* (2006.01)
*B29K 33/00* (2006.01)
*B29K 83/00* (2006.01)

(52) U.S. Cl.
CPC ........ *C08J 2383/07* (2013.01); *C08J 2439/06* (2013.01); *C08J 2483/04* (2013.01); *G02C 2202/22* (2013.01)

(56) References Cited

U.S. PATENT DOCUMENTS

| | | | |
|---|---|---|---|
| 3,808,178 A | 4/1974 | Gaylord | |
| 3,944,347 A | 3/1976 | Barkdoll et al. | |
| 4,113,224 A | 9/1978 | Clark et al. | |
| 4,120,570 A | 10/1978 | Gaylord | |
| 4,136,250 A | 1/1979 | Mueller et al. | |
| 4,153,641 A | 5/1979 | Deichert et al. | |
| 4,166,255 A * | 8/1979 | Graham | G02C 7/049 264/1.7 |
| 4,182,822 A | 1/1980 | Chang | |
| 4,197,266 A | 4/1980 | Clark et al. | |
| 4,208,362 A | 6/1980 | Deichert et al. | |
| 4,343,927 A | 8/1982 | Chang | |
| 4,407,766 A * | 10/1983 | Haardt | B29D 11/00019 249/117 |
| 4,436,887 A | 3/1984 | Chromecek et al. | |
| 4,495,313 A | 1/1985 | Larsen | |
| 4,659,782 A | 4/1987 | Spinelli | |
| 4,659,783 A | 4/1987 | Spinelli | |
| 4,666,249 A | 5/1987 | Bauman et al. | |
| 4,680,336 A | 7/1987 | Larsen et al. | |
| 4,701,288 A | 10/1987 | Cook et al. | |
| 4,702,574 A | 10/1987 | Bawa | |
| 4,740,533 A | 4/1988 | Su et al. | |
| 4,889,664 A | 12/1989 | Kindt-Larsen et al. | |
| 4,910,277 A | 3/1990 | Bambury et al. | |
| 5,006,622 A | 4/1991 | Kunzler et al. | |
| 5,034,461 A | 7/1991 | Lai et al. | |
| 5,039,459 A | 8/1991 | Kindt-Larsen et al. | |
| 5,070,215 A | 12/1991 | Bambury et al. | |
| 5,236,969 A | 8/1993 | Kunzler et al. | |
| 5,244,981 A | 9/1993 | Seidner et al. | |
| 5,270,418 A | 12/1993 | Kunzler et al. | |
| 5,298,533 A | 3/1994 | Nandu et al. | |
| 5,314,960 A | 5/1994 | Spinelli et al. | |
| 5,321,108 A | 6/1994 | Kunzler et al. | |
| 5,331,067 A | 7/1994 | Seidner et al. | |
| 5,371,147 A | 12/1994 | Spinelli et al. | |
| 5,387,662 A | 2/1995 | Kunzler et al. | |
| 5,539,016 A | 7/1996 | Kunzler et al. | |
| 5,611,970 A * | 3/1997 | Apollonio | B29C 33/303 264/2.5 |
| 5,753,150 A | 5/1998 | Martin et al. | |
| 5,760,100 A | 6/1998 | Nicolson et al. | |
| 5,776,999 A | 7/1998 | Nicolson et al. | |
| 5,789,461 A | 8/1998 | Nicolson et al. | |
| 5,824,719 A | 10/1998 | Kunzler et al. | |
| 5,849,811 A | 12/1998 | Nicolson et al. | |
| 5,923,397 A | 7/1999 | Bonafini, Jr. | |
| 5,944,853 A | 8/1999 | Molock et al. | |
| 5,962,548 A | 10/1999 | Vanderlaan et al. | |
| 5,965,631 A | 10/1999 | Nicolson et al. | |
| 5,998,498 A | 12/1999 | Vanderlaan et al. | |
| 6,020,445 A | 2/2000 | Vanderlaan et al. | |
| 6,087,415 A | 7/2000 | Vanderlaan et al. | |
| 6,367,929 B1 | 4/2002 | Maiden et al. | |
| 6,383,419 B1 * | 5/2002 | Dean | B29C 33/30 264/1.1 |
| 6,420,453 B1 | 7/2002 | Bowers et al. | |
| 6,423,761 B1 | 7/2002 | Bowers et al. | |
| 6,579,918 B1 | 6/2003 | Auten et al. | |
| 6,583,419 B1 * | 6/2003 | Moy | H01L 31/02161 250/370.01 |
| 6,610,220 B1 | 8/2003 | Caltrider et al. | |
| 6,767,979 B1 | 7/2004 | Muir et al. | |
| 6,822,016 B2 | 11/2004 | McCabe et al. | |
| 6,867,245 B2 | 3/2005 | Iwata et al. | |
| 6,943,203 B2 | 9/2005 | Vanderlaan et al. | |
| 7,052,131 B2 | 5/2006 | McCabe et al. | |
| 7,172,285 B1 | 2/2007 | Altmann et al. | |
| 7,247,692 B2 | 7/2007 | Laredo | |
| 7,249,848 B2 | 7/2007 | Laredo et al. | |
| 7,553,880 B2 | 6/2009 | Nicolson et al. | |
| 7,666,921 B2 | 2/2010 | McCabe et al. | |
| 7,691,916 B2 | 4/2010 | McCabe et al. | |
| 7,786,185 B2 | 8/2010 | Rathore et al. | |
| 7,934,830 B2 | 5/2011 | Blackwell et al. | |
| 7,956,131 B2 | 6/2011 | Arnold et al. | |
| 7,994,356 B2 | 8/2011 | Awasthi et al. | |
| 8,022,158 B2 | 9/2011 | Rathore et al. | |
| 8,138,290 B2 | 3/2012 | Blackwell et al. | |
| 8,273,802 B2 | 9/2012 | Laredo et al. | |
| 8,389,597 B2 | 3/2013 | Blackwell et al. | |
| 8,399,538 B2 | 3/2013 | Steffen et al. | |
| 8,415,405 B2 | 4/2013 | Maggio et al. | |
| 8,450,387 B2 | 5/2013 | McCabe et al. | |
| 8,470,906 B2 | 6/2013 | Rathore et al. | |
| 8,487,058 B2 | 7/2013 | Liu et al. | |
| 8,507,577 B2 | 8/2013 | Zanini et al. | |
| 8,637,621 B2 | 1/2014 | Iwata et al. | |
| 8,662,663 B2 | 3/2014 | Matsushita et al. | |
| 8,703,891 B2 | 4/2014 | Broad | |
| 8,772,367 B2 | 7/2014 | Saxena et al. | |
| 8,772,422 B2 | 7/2014 | Saxena et al. | |
| 8,937,110 B2 | 1/2015 | Alli et al. | |
| 8,937,111 B2 | 1/2015 | Alli et al. | |
| 8,940,812 B2 | 1/2015 | Reboul et al. | |
| 9,056,878 B2 | 6/2015 | Fujisawa et al. | |
| 9,057,821 B2 | 6/2015 | Broad et al. | |
| 9,125,808 B2 | 9/2015 | Alli et al. | |
| 9,140,825 B2 | 9/2015 | Alli et al. | |
| 9,156,934 B2 | 10/2015 | Alli et al. | |
| 9,170,349 B2 | 10/2015 | Mahadevan et al. | |
| 9,244,196 B2 | 1/2016 | Scales et al. | |
| 9,244,197 B2 | 1/2016 | Alli et al. | |
| 9,260,544 B2 | 2/2016 | Rathore et al. | |
| 9,297,928 B2 | 3/2016 | Molock et al. | |
| 9,297,929 B2 | 3/2016 | Scales et al. | |
| 2002/0000680 A1 | 1/2002 | Altmann et al. | |
| 2002/0016383 A1 | 2/2002 | Iwata et al. | |
| 2003/0142267 A1 | 7/2003 | Gemert et al. | |
| 2004/0141150 A1 * | 7/2004 | Roffman | G02C 7/044 351/159.05 |
| 2005/0018130 A1 * | 1/2005 | Dahi | B29D 11/00048 351/159.14 |
| 2005/0181130 A1 * | 8/2005 | Thomsen | C03C 17/22 427/249.7 |
| 2007/0284770 A1 | 12/2007 | Ansell et al. | |
| 2008/0074611 A1 | 3/2008 | Meyers et al. | |
| 2008/0245747 A1 * | 10/2008 | Kernick | B01D 19/0052 210/750 |
| 2008/0274207 A1 | 11/2008 | Nayiby et al. | |
| 2009/0146329 A1 | 6/2009 | Yin et al. | |
| 2010/0014047 A1 * | 1/2010 | Chang | B29D 11/00038 351/159.33 |
| 2010/0048847 A1 | 2/2010 | Broad | |
| 2012/0283353 A1 * | 11/2012 | Mahadevan | G02B 1/041 523/107 |
| 2013/0056889 A1 | 3/2013 | Jan | |
| 2013/0258276 A1 * | 10/2013 | Hansen | B29D 11/00048 351/159.22 |
| 2016/0313571 A1 * | 10/2016 | Alli | G02C 7/049 |

FOREIGN PATENT DOCUMENTS

| | | |
|---|---|---|
| CN | 101078815 A | 11/2007 |
| DE | 2261549 A1 | 6/1974 |
| EP | 0080539 B1 | 6/1983 |
| EP | 207640 A2 | 1/1987 |

(56) References Cited

FOREIGN PATENT DOCUMENTS

| | | |
|---|---|---|
| JP | 2002006269 A | 1/2002 |
| JP | 2003019720 A | 1/2003 |
| JP | 2011016272 A | 1/2011 |
| WO | 9631792 A1 | 10/1996 |
| WO | 2003022321 A2 | 3/2003 |
| WO | 2005079290 A2 | 9/2005 |
| WO | 2008061992 A2 | 5/2008 |
| WO | 2011130138 A1 | 10/2011 |
| WO | 2014121030 A2 | 8/2014 |
| WO | 2014123959 A1 | 8/2014 |

OTHER PUBLICATIONS

European Search Report (Partial) for corresponding Patent Application No. EP13161165 completed May 17, 2013.
European Search Report dated Oct. 8, 2013 for Application No. EP13161165.
ISO 18369-4:2006: Ophthalmic optics—Contact lenses—Part 4: Physicochemical properties of contact lens materials.
ISO 9913-1: 1996: Optics and optical instruments—Contact Lenses—Part 1: Determination of oxygen permeability and transmissibility by the FATT method.
Report issued by the Danish Patent and Trademark Office (Singapore Written Opinion) for Application No. 2013009709 dated Jun. 20, 2014.
Singapore Search Report for Application No. 201300970-9 dated Oct. 15, 2013.
Chen et al, Copolymerization of Methyl Methacrylate and N-Alkyl Methacrylamide, Journal of Applied Polymer Science, vol. 82, pp. 400-405 (2001).
Compendium of Polymer Terminology and Nomenclature: IUPAC Recommendations 2008, edited by: Richard G. Jones, Jaroslav Kahovec, Robert Stepto, Edward S. Wilks, Michael Hess, Tatsuki Kitayama, and W. Val Metanomski.
Kodaira et al, Solvent Effect on the Radical Copolymerization of N-Methyl- and N,N-Dimethylacrylamides in N-Methylmethacrylamide with Methyl Methacrylate, Polymer Journal, vol. 20, No. 11, pp. 1021-1029 (1988).
Kuo et al, Substituent-induced delocalization effects on hydrogen-bonding interaction in poly(N-phenyl methacrylamide) derivatives, Polymer, vol. 52, pp. 2600-2608 (2011).
Kuo et al, Thermal behavior and specific interaction in high glass transition temperature PMMA copolymer, Polymer, vol. 44, pp. 6873-6882 (2003).
Miyake et al, Coordination—Addition Polymerization and Kinetic Resolution of Methacrylamides by Chiral Metallocene Catalysts, Macromolecules, vol. 42, pp. 1462-1471 (2009).
Ritter el al, Cyclodextrins in Polymer Synthesis: Two-Step Reaction to Aliphatic Poly(methacrylimide) Foams by Thermal Treatment of Copolymers Obtained from Cyclodextrin Complexes of tert-Butyl Methacrylate and Various N-alkyl Methacrylamides, Macromolecules, vol. 36, pp. 318-322 (2003).
Schrooten et al, Propagation Kinetics of the Radical Polymerization of Methylated Acrylamides in Aqueous Solution, Macromolecular Chemistry and Physics, vol. 214, pp. 2283-2294 (2013).
Shea et al, Synthesis and Characterization of Highly Cross-Linked Polyacrylamides and Polymethacrylamides. A New Class of Macroporous Polyamides, Macromolecules, vol. 23, No. 21, pp. 4497-4507 (1990).
Anonymous: "List of soft contact lens materials—Wikipedia", Wikipedia, Jul. 14, 2017 (Jul. 14, 2017), XP055405881, Retrieved from the Internet: URL:https://en.wikipedia.org/wiki/List_of_soft contact lens materials.
Chambers, "ChemIDplus—478799-92-7—Senofilcon A [USAN]—Similar structures search, synonyms, formulas, resource links, and other chemical information.", Jan. 1, 2017 (Jan. 1, 2017), XP055405710, Retrieved from the Internet: URL:https://chem.nlm.nih.gov/chemidplus/m/478799-92-7.
PCT International Search Report, dated Sep. 20, 2017, for PCT Int'l Appln. No. PCT/US2017/037326.
PCT International Search Report, dated Aug. 30, 2017, for PCT Int'l Appln. No. PCT/US2017/037341.

* cited by examiner

INCREASED STIFFNESS CENTER OPTIC IN SOFT CONTACT LENSES FOR ASTIGMATISM CORRECTION

FIELD OF THE INVENTION

The present invention relates to contact lenses having a higher stiffness in the central optic zone relative to the peripheral zone, and more particularly to soft contact lenses incorporating a higher modulus hydrogel material in the central optic zone relative to the peripheral zone for the correction of astigmatic refractive errors as well as possible higher order aberrations created by corneal geometry. The higher modulus hydrogel material creates a stiffer central optic zone relative to the peripheral zone of the contact lenses.

BACKGROUND

Myopia or nearsightedness is an optical or refractive defect of the eye wherein rays of light from an image focus to a point before they reach the retina. Myopia generally occurs because the eyeball or globe is too long or the shape or contour of the cornea is too steep. A minus powered spherical lens may be utilized to correct myopia. Hyperopia or farsightedness is an optical or refractive defect of the eye wherein rays of light from an image focus to a point after they reach or behind the retina. Hyperopia generally occurs because the eyeball or globe is too short or the shape or contour of the cornea is too flat. A plus powered spherical lens may be utilized to correct hyperopia. Astigmatism is an optical or refractive defect in which an individual's vision is blurred due to the inability of the eye to focus a point object into a focused image on the retina. Unlike myopia and/or hyperopia, astigmatism is unrelated to globe size or corneal steepness, but rather it is caused by a non-rotationally symmetric cornea or from the misalignment or positioning of the crystalline lens. The vast majority of astigmatism occurs due to non-rotationally symmetric corneal curvature. A perfect cornea is rotationally symmetric whereas in most individuals with astigmatism, the cornea is not rotationally symmetric. In other words, the cornea is actually more curved or steeper in one direction than another, thereby causing an image to be stretched out rather than focused to a point. A cylindrical lens or toric contact lens, rather than a spherical lens may be utilized to resolve astigmatism.

Corneal astigmatism may be corrected using a hard or rigid gas permeable contact lens. In this case, a fluid or tear lens may exist between the posterior surface of the rigid contact lens and the cornea. This fluid or tear lens follows or assumes the shape of the back surface of the contact lens. Since the index of refraction of the fluid or tear lens is nearly a match for the cornea, the corneal toricity is optically neutralized or reduced. In these cases, a toric lens will not be required. However, rigid gas permeable contact lenses and hard contact lenses are generally less comfortable than soft or hydrogel contact lenses. Since soft or hydrogel contact lenses wrap around the cornea, a fluid lens is generally not found and the tear fluid more closely resembles a thin film. In this case, a toric lens design is required.

A toric lens is an optical element having two different powers in two orientations that are perpendicular to one another. Essentially, a toric lens has one power, spherical, for correcting myopia or hyperopia and one power, cylinder, for correcting astigmatism built into a single lens. These powers are created with curvatures at different angles which are preferably maintained relative to the eye. Toric lenses may be utilized in eyeglasses, intraocular lenses and contact lenses. The toric lenses used in eyeglasses and intraocular lenses are held fixed relative to the eye thereby always providing optimal vision correction. However, toric contact lenses may tend to rotate on the eye thereby temporarily providing sub-optimal vision correction. Accordingly, currently utilized toric contact lenses also include a mechanism to keep the contact lens relatively stable on the eye when the wearer blinks or looks around. For many high order aberrations, many of which are not rotationally symmetric, positional stability is also required to provide optimal vision correction.

When a toric contact lens is first placed in the eye, it must automatically position or auto-position itself and it then maintains that position over time. However, once the toric contact lens is positioned, it tends to rotate on the eye due to the force exerted on the contact lens by the eyelids during blinking as well as eyelid and tear fluid movement. Maintenance of the on-eye orientation of a toric contact lens is generally accomplished by altering the mechanical characteristics of the toric contact lens. For example, prism stabilization, including decentering of the contact lens' front surface relative to the back surface, thickening of the inferior contact lens periphery, forming depressions or elevations on the contact lens' surface, and truncating the contact lens edge are all methods that have been utilized.

Each of more traditional stabilization techniques have advantages and disadvantages associated therewith. The main disadvantage of these types of designs is that they rely on the interaction of the eyelids and the contact lens' thickness differential to orient the contact lens to the correct location on the wearer's eye. The problem is particularly acute with plus powered toric contact lenses intended for hyperopia.

Astigmatic masking lenses in which the lens vaults over the cornea thereby creating a space between the corneal surface and the lens have also been disclosed. Tear film fills that space and masks the astigmatic properties of the cornea. Current masking lenses which have sufficient stiffness in the central region are either undesirably thick, or are incompatible with the hydrogel materials used in the periphery.

U.S. Pat. No. 4,166,255 discloses a hybrid contact lens based from conventional hydrogels with a rigid central optical area surrounded by or embedded in a relatively soft transparent plastic component with a flexible periphery.

U.S. Pat. No. 4,701,288 disclosed a method of making a hybrid contact lens by sequential ultraviolet photopolymerizations with different reactive mixtures in a mold to make a composite article from which a contact lens may be machined.

U.S. Pat. No. 5,923,397 disclosed a bimodulus contact lens comprising a rigid gas permeable polymeric core and a softer end section attached annularly around the core section.

U.S. Pat. No. 6,579,918 disclosed a method of making a composite contact lens in which one optical component is cast molded around a second optical component, thereby encapsulating the second optical component.

U.S. Pat. No. 8,662,663 disclosed a hybrid soft contact lens including a central portion with a Young's modulus between 435 psi and 14,503 psi and a peripheral portion with a Young's modulus between 29 psi and 435 psi.

However, current masking lenses which have sufficient stiffness in the central region are either undesirably thick, or are incompatible with the hydrogel materials used in the periphery.

Accordingly, it would be advantageous to design contact lenses, including toric contact lenses, that correct for astigmatism as well as possible higher order aberrations caused by corneal geometry with less reliance on specific on-eye orientation and therefore less or no stabilization means.

SUMMARY OF THE INVENTION

In order for a soft contact lens to vault over the cornea surface, the central portion of the lens must be stiff enough to maintain the shape required for vaulting without causing patient discomfort at the same time. The present invention is directed to silicone hydrogels that have sufficient stiffness for vaulting at relatively high water contents to form composite soft contact lenses with other silicone hydrogels that are comfortable to wear.

In one embodiment of the present invention, composite contact lenses are provided having a central region and a peripheral region, wherein the central region is formed from a silicone hydrogels formed from reactive mixtures comprising at least one N-alkyl methacrylamide, at least one silicone-containing component, and at least one cross-linking agent, and optional components including at least one hydrophilic monomer, at least one wetting agent. These silicone hydrogels have water contents from about 10 weight percent to about 40 weight percent and moduli from about 15,000 psi to about 75,000 psi. Silicone hydrogel formulations having water contents of about 10 to about 40 weight percent and moduli from about 20 to about 500 psi about 50 to about 200 psi, or about 50 to about 150 psi monomers may be used in the peripheral region. Either the first, second or both silicone hydrogels may further comprise at least one internal wetting agent and one or more hydrophilic component.

In another embodiment, a process for making such composite contact lenses is described comprising (a) dosing a first silicone hydrogel formulation of claim 1 into a first mold, (b) partially curing the first silicone hydrogel formulation into a gel, (c) dosing a second silicone hydrogel formulation into the first mold, (d) allowing time for the second silicone hydrogel formulation to imbibe into the gel, (e) placing a second mold on top of the first mold, and (f) fully curing the combination to form the composite contact lens.

The present invention is also directed to a contact lens. The contact lens comprising an optic zone being formed from a material having a water content from about 10 weight percent to about 40 weight percent and Young's modulus between about 10,000 psi to about 200,000 psi, and a peripheral zone being formed from a material a having water content of about 10 to about 40 weight percent and Young's modulus from about 20 to about 500 psi, less than 200 psi or less than 150 psi.

A method of making an ophthalmic device, the method comprising dosing a first reactive mixture comprising at least one N-alkyl methacrylamide and at least one silicone-containing component, into a center portion of a contact lens front curve mold;

dosing into the contact lens front curve mold on top of the first material, a second material having a second Young's modulus when cured of less than about 200 psi, and wherein the first material, when cured, has a first Young's modulus greater than about 1000, and wherein said first and second reactive mixtures are substantially immiscible during a period from dosing to curing;

positioning a contact lens back curve mold on the second material; and curing said reactive mixtures.

The present invention is also directed to a contact lens comprising an optic zone being formed from a first material having a first Young's modulus between about 1,000 psi and about 200,000 psi, said first material formed from a reactive mixture comprising at least one N-alkyl methacrylamide and at least one silicone-containing component; and a peripheral zone formed from a material having a second Young's modulus less than about 200 psi or about 150 psi.

The present invention is also directed to a contact lens comprising an optic zone having a first stiffness, said optic zone being formed from a first material having a first Young's modulus between about 1,000 psi and about 200,000 psi, said first material formed from a reactive mixture comprising at least one N-alkyl methacrylamide and at least one silicone-containing component; and a peripheral zone having a second stiffness formed from a material having a second Young's modulus less than about 200 psi or about 150 psi, the first stiffness being greater than the second stiffness.

Throughout the specification, the term stiffness should be understood to be a function of the Young's modulus of the material, the thickness of the material, the shape of the material, and any tension or stress built into the material. Accordingly, for a given shape and a given thickness, a material with a higher Young's modulus will be stiffer than one with a lower Young's modulus.

The present invention is directed to a contact lens having an increased stiffness in the optic zone. This increased stiffness optic zone may be achieved in a number of ways, including utilizing a reactive mixture, which when cured provides a higher Young's modulus than the bulk material forming the contact lens in the optic zone, utilizing a suitable additive for raising the Young's modulus in the optic zone, by manufacturing the contact lens with specific processes such as varying cure light intensity across the lens thereby causing an increase in the stiffness of the center of the lens, or by pre-tensioning of the contact lens to create resistance to deformation when placed on-eye. By having a stiffer optical zone, the optic zone vaults over or does not conform to the astigmatic geometry of the cornea while the remaining portion of the contact lens does. This vaulting or lack of conformation allows a tear or fluid lens to form between the cornea and the optic zone. This tear or fluid lens follows or assumes the shape of the back surface of the contact lens, which is rotationally symmetric or contains cylinder correction smaller than the corneal astigmatism. Since tears have substantially the same index of refraction as that of the cornea, the fluid lens and the contact lens combination forms an optic surface or element that corrects all or a portion of the visual deficit or refractive error caused by the corneal geometry. In other words, since the index of refraction of the fluid or tear lens is nearly a match for the cornea, the corneal toricity is optically neutralized or reduced when combined with the contact lens optics.

The contact lens of the present invention may be manufactured utilizing any suitable process without a significant increase in expense or complexity. This design may be implemented in any number or type of soft contact lenses.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION

Figure 1A:
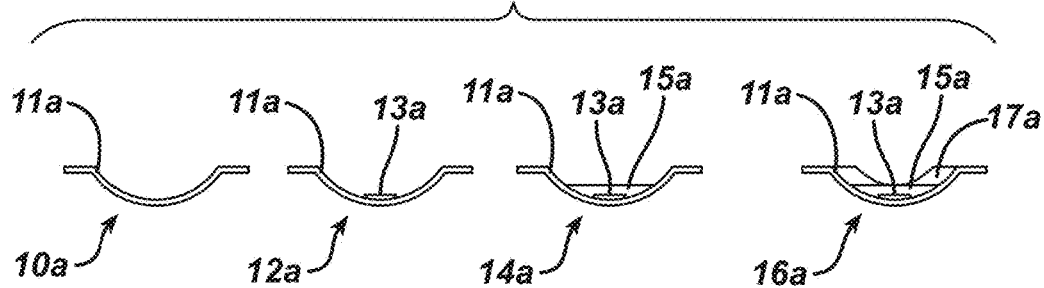
FIGS. 1a and 1b are a diagrammatic representation of the steps to manufacture a contact lens in accordance with the present invention.

With respect to the terms used in this disclosure, the following definitions are provided. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski.

As used herein, the term "about" refers to a range of +/−5% of the number that is being modified. For example, the phrase "about 10" would include both 9.5 and 10.5.

The term "(meth)" designates optional methyl substitution. Thus, a term such as "(meth)acrylate" denotes both methacrylate and acrylate radicals. Wherever chemical structures are given, it should be appreciated that alternatives disclosed for the substituents on the structure may be combined in any combination. Thus, if a structure contained substituents R* and R**, each of which contained three lists of potential groups, 9 combinations are disclosed. The same applies for combinations of properties.

When a subscript, such as "n" in the generic formula $[***]_n$, is used to depict the number of repeating units in a polymer's chemical formula, the formula should be interpreted to represent the number average molecular weight of the macromolecule.

A "macromolecule" is an organic compound having a molecular weight of greater than 1500, and may be reactive or non-reactive.

A "polymer" is a macromolecule of repeating chemical units linked together into a chain or network structure and is composed of repeating units derived from the monomers and macromers included in the reactive mixture.

A "homopolymer" is a polymer made from one monomer or macromer; a "copolymer" is a polymer made from two or more monomers, macromers or a combination thereof; a "terpolymer" is a polymer made from three monomers, macromers or a combination thereof. A "block copolymer" is composed of compositionally different blocks or segments. Diblock copolymers have two blocks. Triblock copolymers have three blocks. "Comb or graft copolymers" are made from at least one macromer.

A "repeating unit" or "repeating chemical unit" is the smallest repeating group of atoms in a polymer that result from the polymerization of monomers and macromers.

A "biomedical device" is any article that is designed to be used while either in or on mammalian tissues or fluids, and preferably in or on human tissue or fluids. Examples of these devices include but are not limited to wound dressings, sealants, tissue fillers, drug delivery systems, coatings, adhesion prevention barriers, catheters, implants, stents, sutures and ophthalmic devices such as intraocular lenses and contact lenses. The biomedical devices may be ophthalmic devices, such as contact lenses, including contact lenses made from silicone hydrogels.

"Individual" includes humans and vertebrates.

"Ocular surface" includes the surface and glandular epithelia of the cornea, conjunctiva, lacrimal gland, accessory lacrimal glands, nasolacrimal duct and meibomian gland, and their apical and basal matrices, puncta and adjacent or related structures, including eyelids linked as a functional system by both continuity of epithelia, by innervation, and the endocrine and immune systems.

"Ophthalmic device" refers to any device which resides in or on the eye or any part of the eye, including the ocular surface. These devices can provide optical correction, cosmetic enhancement, vision enhancement, therapeutic benefit (for example as bandages) or delivery of active components such as pharmaceutical and nutriceutical components, or a combination of any of the foregoing. Examples of ophthalmic devices include, but are not limited to, lenses and optical and ocular inserts, including, but not limited to punctal plugs and the like. "Lens" includes soft contact lenses, hard contact lenses, hybrid contact lenses, intraocular lenses, and overlay lenses. The ophthalmic device may comprise a contact lens.

"Contact lens" refers to a structure, an ophthalmic device that can be placed on the cornea of an individual's eye. The contact lens may provide corrective, cosmetic, therapeutic benefit, including wound healing, delivery of drugs or neutraceuticals, diagnostic evaluation or monitoring, or UV blocking and visible light or glare reduction, or a combination thereof. A contact lens can be of any appropriate material known in the art, and can be a soft lens, a hard lens, or a hybrid lens containing at least two distinct portions with different properties, such as modulus, water content, light absorbing characteristics or combinations thereof.

The biomedical devices, ophthalmic devices, and lenses of the present invention may be comprised of silicone hydrogels. These silicone hydrogels typically contain a silicone component and/or hydrophobic and hydrophilic monomers that are covalently bound to one another in the cured device.

"Silicone hydrogel contact lens" refers to a contact lens comprising at least one silicone hydrogel material. Silicone hydrogel contact lenses generally have increased oxygen permeability compared to conventional hydrogels. Silicone hydrogel contact lenses use both their water and polymer content to transmit oxygen to the eye.

A "polymeric network" is cross-linked macromolecule that can swell but cannot dissolve in solvents, because the polymeric network is essentially one macromolecule. "Hydrogel" or "hydrogel material" refers to a polymeric network that contains water in an equilibrium state. Hydrogels generally contain at least about 10 wt. % water.

"Conventional hydrogels" refer to polymeric networks made from monomers without any siloxy, siloxane or carbosiloxane groups. Conventional hydrogels are prepared from monomeric mixtures predominantly containing hydrophilic monomers, such as 2-hydroxyethyl methacrylate ("HEMA"), N-vinyl pyrrolidone ("NVP"), N, N-dimethylacrylamide ("DMA"), or vinyl acetate. U.S. Pat. Nos. 4,436,887, 4,495,313, 4,889,664, 5,006,622, 5,039459, 5,236,969, 5,270,418, 5,298,533, 5,824,719, 6,420,453, 6,423,761, 6,767,979, 7,934,830, 8,138,290, and 8,389,597 disclose the formation of conventional hydrogels. Commercially available hydrogel formulations include, but are not limited to, etafilcon, polymacon, vifilcon, genfilcon, lenefilcon, hilafilcon, nesofilcon, and omafilcon, including all of their variants.

"Silicone hydrogel" refers to a hydrogel obtained by copolymerization of at least one silicone-containing component with at least one hydrophilic component. Hydrophilic components may also include non-reactive polymers. Each of the silicone-containing components and the hydrophilic components may be a monomer, macromer or combination thereof. A silicone-containing component contains at least one siloxane or carbosiloxane group. Examples of commercially available silicone hydrogels include balafilcon, acquafilcon, lotrafilcon, comfilcon, delefilcon, enfilcon, fanfilcon, formofilcon, galyfilcon, senofilcon, narafilcon, falcon II, asmofilcon A, samfilcon, riofilcon, stenficlon, somofilcon, as well as silicone hydrogels as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9,156,934, 9,170,349, 9,244,196, 9,244,197, 9,260,544, 9,297,928, 9,297,929 as well as WO 03/22321, WO 2008/061992, and US 2010/048847. These patents, as well as all other patents disclosed in this paragraph, are hereby incorporated by reference in their entireties "Silicone-containing component" refers to a monomer, macromer, prepolymer, cross-linker, initiator, additive, or polymer that contains at least one silicon-oxygen bond, in the form of siloxane [—Si—O—Si] group or carbosiloxane group. Examples of silicone-containing components include, but are not limited to, silicone macromers, prepolymers, and monomers. Examples of silicone macromers include, but are not limited to, polydimethylsiloxane methacrylated with pendant hydrophilic groups. Examples of silicone-containing components which are useful in this invention may be found in U.S. Pat. Nos. 3,808,178, 4,120,570, 4,136,250, 4,153,641, 4,740,533, 5,034,461, 5,962,548, 5,244,981, 5,314,960, 5,331,067, 5,371,147, 5,760,100, 5,849,811, 5,962,548, 5,965,631, 5,998,498, 6,367,929, 6,822,016, 5,070,215, U.S. Pat. Nos. 8,662,663, 7,994,356, 8,772,422, 8,772,367, EP080539 and WO2014/123959.

"Reactive mixture" and "reactive monomer mixture" refer to the mixture of components (both reactive and non-reactive) which are mixed together and when subjected to polymerization conditions, form the silicone hydrogels and lenses of the present invention. The reactive mixture comprises reactive components such as monomers, macromers, prepolymers, cross-linkers, initiators, diluents, and additional components such as wetting agents, release agents, dyes, light absorbing compounds such as UV absorbers, pigments, dyes and photochromic compounds, any of which may be reactive or non-reactive but are capable of being retained within the resulting biomedical device, as well as active components such as pharmaceutical and neutraceutical compounds, and any diluents. It will be appreciated that a wide range of additives may be added based upon the biomedical device which is made, and its intended use. Concentrations of components of the reactive mixture are given in weight % of all components in the reaction mixture, excluding diluent. When diluents are used their concentrations are given as weight % based upon the amount of all components in the reaction mixture and the diluent.

"Monomer" is a molecule having non-repeating functional groups, which can undergo chain growth polymerization, and in particular, free radical polymerization. Some monomers have di-functional impurities that can act as cross-linking agents. "Macromers" are linear or branched polymers having a repeating structure and at least one reactive group that can undergo chain growth polymerization. Monomethacryloxypropyl terminated mono-n-butyl terminated polydimethylsiloxane (molecular weight=500-1500 g/mol) (mPDMS) and mono-(2-hydroxy-3-methacryloxypropyl)-propyl ether terminated mono-n-butyl terminated polydimethylsiloxane (molecular weight=500-1500 g/mol) (OH-mPDMS) are referred to as macromers.

"Reactive components" are the components in the reactive mixture which become part of the structure of the polymeric network of the resulting silicone hydrogel, by covalent bonding, hydrogen bonding or the formation of an interpenetrating network. Diluents and processing aids which do not become part of the structure of the polymer are not reactive components. Typically, the chemical structure of the macromer is different than the chemical structure of the target macromolecule, that is, the repeating unit of the macromer's pendent group is different than the repeating unit of the target macromolecule or its mainchain.

"Polymerizable" means that the compound comprises at least one reactive group which can undergo chain growth polymerization, such as free radical polymerization. Examples of reactive groups include the monovalent reactive groups listed below. "Non-polymerizable" means that the compound does not comprises such a polymerizable group.

"Monovalent reactive groups" are groups that can undergo chain growth polymerization, such as free radical and/or cationic polymerization. Non-limiting examples of free radical reactive groups include (meth)acrylates, styrenes, vinyl ethers, (meth)acrylamides, N-vinyllactams, N-vinylamides, O-vinylcarbamates, O-vinylcarbonates, and other vinyl groups. In one embodiment, the free radical reactive groups comprise (meth)acrylate, (meth)acrylamide, N-vinyl lactam, N-vinylamide, and styryl functional groups, or (meth)acrylates, (meth)acrylamides, and mixtures of any of the foregoing.

Examples of the foregoing include substituted or unsubstituted $C_{1-6}$alkyl(meth)acrylates, $C_{1-6}$alkyl(meth)acrylamides, $C_{2-12}$alkenyls, $C_{2-12}$alkenylphenyls, $C_{2-12}$alkenylnaphthyls, $C_{2-6}$alkenylphenyl$C_{1-6}$alkyls, where suitable substituents on said $C_{1-6}$ alkyls include ethers, hydroxyls, carboxyls, halogens and combinations thereof.

Other polymerization routes such as living free radical and ionic polymerization can also be employed. The device-forming monomers may form hydrogel copolymers. For hydrogels, the reactive mixture will typically include at least one hydrophilic monomer.

Hydrophilic components are those which yield a clear single phase when mixed with deionized water at 25° C. at a concentration of 10 wt. %.

"Interpenetrating polymer networks" or "IPNs" are polymers comprising two or more polymeric networks which are at least partially interlaced on a molecular scale, but not covalently bonded to each other and cannot be separated unless chemical bonds are broken.

"Semi-interpenetrating polymer networks" or "semi-IPNs" are polymer comprising one or more polymer network(s) and one or more linear or branched polymer(s) characterized by the penetration on a molecular scale of at least one of the networks by at least some of the linear or branched chains. A "cross-linking agent" is a di-functional or multi-functional component which can undergo free radical polymerization at two or more locations on the molecule, thereby creating branch points and a polymeric network. Common examples are ethylene glycol dimethacrylate, tetraethylene glycol dimethacrylate, trimethylolpropane trimethacrylate, methylene bisacrylamide, triallyl cyanurate, and the like.

For purposes of the present invention a contact lens is defined by at least two distinct regions. The inner region or optical zone from which the vision correction is obtained and the outer peripheral zone of the contact lens that provides mechanical stability of the contact lens on eye. In some cases, an optional intermediate zone or region located between the inner optical zone and the outer peripheral zone may be used for blending the two aforementioned zones in a smooth manner such that discontinuities do not occur. A contact lens is also defined by a front surface or surface power, a back curve or base curve and an edge.

The inner region or optical zone provides vision correction and is designed for a specific need such as single vision myopia or hyperopia correction, astigmatism vision correction, bi-focal vision correction, multi-focal vision correction, custom correction or any other design that may provide vision correction. The outer periphery or peripheral zone provides mechanical features which influence positioning and stabilization of the contact lens on the eye including, centration and orientation. Orientation stabilization is fundamental when the optical zone includes non-rotationally symmetric features, such as astigmatic correction and/or high order aberrations correction. The optional intermediate region or zone ensures that the optical zone and the peripheral zone are smoothly blended. It is important to note that both the optical zone and the peripheral zone may be designed independently, though sometimes their designs are strongly related when particular requirements are necessary.

Referring now to FIG. 1, there is illustrated a planar view of an exemplary contact lens design or construct in accordance with the present invention. The contact lens 100 comprises an optic zone 102 and a peripheral zone 104 surrounding the optic zone 102. This arrangement or configuration is a standard contact lens design. In accordance with the present invention; however, the optic zone 102 is modified, as detailed subsequently, to be stiffer than the surrounding region; namely, the peripheral zone 104. The optic zone 102 may be made stiffer than the peripheral zone 104 via a number of methods and means as is discussed subsequently. The stiffer optic zone 102 may be achieved utilizing a material with a higher Young's modulus or higher elastic modulus in the optic zone 102 than the material in the peripheral zone 104. In addition to being of higher elastic modulus, the material in the optic zone 102 may also have a higher viscosity, than the second hydrogel reactive mixture, such that the first silicone hydrogel reactive mixture remains fixed in position. The first silicone hydrogel mixture may also be partially or fully cured prior to dosing the second hydrogel reactive mixture.

It is desirable to minimize the generation of stresses at the interface between the first and second hydrogel polymers in the resulting lens. This may be done by substantially matching the water content and/or expansion of the first and second hydrogel reactive mixtures.

It has been found that by balancing the expansion factor of the polymers formed from the photochromic dye monomer mixture and the clear monomer mixture hydrogel contact lenses having desirable optics and comfort may be produced. In one embodiment the expansion factors of the polymers formed from the respective monomer mixtures are within about 10% in some embodiments within about 8% and in other embodiments within about 5%. The expansion factor may be adjusted by manipulating a number of formulation variables including the diluent concentration, the concentration and hydrophilicity or hydrophobicity of hydrophilic and hydrophobic components and concentration of initiator and crosslinker, and combinations thereof. Many photochromic dyes are highly hydrophobic and at the concentrations used in the present invention can have an impact on the expansion factor the hydrogels which contain them. In one embodiment, where the photochromic dye is hydrophobic, it is added to the formulation replacing a similar amount of another hydrophobic component. Similarly, if the photochromic compound were hydrophilic it will be added to the formulation replacing a similar amount of another hydrophilic component. In some embodiments, for example, where a silicone hydrogel contact lens is being produced, it may be desirable to maintain the concentration of the silicone components and replace a part of one of hydrophilic components. In these embodiments, multiple adjustments may be needed to achieve the desired expansion factor.

In addition, other formulation variables may be modified to achieve the desired expansion factor. In some embodiments varying the concentration of the hydrophilic components, the diluent concentration and the initiator concentration, and combinations thereof have been effective at providing photochromic contact lenses having desirable optics and comfort. In one embodiment a hydrophilic polymer, such as poly(vinyl pyrrolidone) (PVP), methacrylic acid, polydimethylacrylamide or poly(vinyl methacetamide) may be added to the photochromic dye monomer mixture.

It may be desirable to use the same or similar components in both the central and peripheral zones. For example, it may be desirable to include the same hydrophilic components in both reactive mixtures. In this case, formulation variables in addition to the concentration of hydrophilic components may be varied.

When a single sided cure is used, the expansion factor may be matched using monomers, diluent concentration and combinations thereof. Where cure is effected from only one side (such as during photocuring), increasing the initiator concentration may also be desirable.

The peripheral region may be formed from contact lens materials made from HEMA based hydrogel or silicone hydrogel materials, which include but are not limited to silicone hydrogels, and fluorohydrogels. Examples of soft contact lenses formulations include but are not limited to the formulations of etafilcon A, genfilcon A, lenefilcon A, polymacon, acquafilcon A, balafilcon A, galyfilcon A, senofilcon, narafilcon A, narafilcon B, comfilcon, filcon II 3, asmofilcon, Monomer A and lotrafilcon A, and the like. Silicone hydrogels formulations, such as those disclosed in U.S. Pat. No. 5,998,498; U.S. patent application Ser. No. 09/532,943, a continuation-in-part of U.S. patent application Ser. No. 09/532,943, filed on Aug. 30, 2000, and U.S. Pat. No. 6,087,415, U.S. Pat. No. 6,087,415, U.S. Pat. No. 5,760,100, U.S. Pat. No. 5,776,999, U.S. Pat. No. 5,789,461, U.S. Pat. No. 5,849,811, U.S. Pat. No. 5,965,631, U.S. Pat. No. 7,553,880, WO2008/061992, US2010/048847, may also be used. These patents are hereby incorporated by reference for the hydrogel compositions contained therein. In one embodiment contact lens formulations are selected from etafilcon A, balafilcon A, acquafilcon A, lotrafilcon A, galyfilcon A, senfilcon, comfilcon, narafilcon, Monomer A and silicone hydrogels.

A material with a higher Young's modulus is stiffer than a material with a lower Young's modulus. The stiffness of a component, element and/or part determines how much it will deflect under a given load. The more stiff a material is, the higher the load required to elastically deform it; however, the stiffness of an element is also a function of the material thickness as well as the shape of the element. Accordingly, for a given shape and thickness, the higher the Young's modulus, the greater the stiffness. With this type of design, astigmatic correction may be achieved via an increase in the contact lens stiffness for a rotationally or non-rotationally symmetric optic zone, in order to optically neutralize or reduce the effect of corneal astigmatism, by providing for the central optic or optic zone 102 of the contact lens 100 to vault over the astigmatic geometry of the cornea. In other words, the optic zone 102 vaults over, or does not conform to, the astigmatic geometry of the cornea while the peripheral zone 104 remains in contact with the eye such that a thicker tear fluid lens forms between the cornea and the optic zone 102. Since tears have substantially the same index of refraction as that of the cornea, the tear fluid lens and the contact lens combination form an optic surface or element that corrects the visual deficit or refractive error caused by the corneal geometry. In other words, given that the index of refraction of the fluid or tear lens is nearly a match for the cornea; the corneal toricity is optically neutralized or reduced when combined with the contact lens optics. An advantage of the present invention is that in reducing or eliminating the need for the contact lens to contain non-rotationally symmetric optical correction, the stabilization features may be reduced in size or eliminated, thereby providing a more comfortable lens.

Based upon the specific stiffness achieved through the first silicone hydrogel material having a modulus of about 10,000 to about 200,000 psi, 15,000 psi to about 100,000 psi in combination with the specific lens geometry, for example, spherical, aspheric and/or toric, on top of an astigmatic corneal geometry, a contact lens designed in this manner may be utilized for the correction of low levels of astigmatism and also may be selectively utilized to enhance vision for higher amounts of astigmatism as well as any possible higher order aberrations created by corneal geometry. Accordingly, the present invention utilizes a contact lens with a specific prescription, but formed with an optic zone formed from a silicone hydrogel having a modulus of about of about 10,000 to about 200,000 psi, or 15,000 psi to about 100,000 psi to correct optical defects with reduced or no need to maintain the lens rotationally aligned if rotational alignment would normally be required. It should be appreciated that silicone hydrogels with higher modulus values will provide greater design flexibility and allow for a thinner optical zone.

In order to realize this design, the optic zone 102 preferably comprises a silicone hydrogel having a modulus of about 10,000 psi to about 200,000 psi, or of about 15,000 to about 100,000 psi. Surprisingly, despite these very high moduli values, the silicone hydrogels also comprise water contents between about 10 wt % and 40 wt % or 10 wt % to 30 wt %.

First Silicone Hydrogel Reactive Mixture

The silicone hydrogels of the present invention are formed from reactive mixtures comprising (a) at least one N-alkyl methacrylamide monomer, (b) at least one silicone-containing component, and (e) at least one cross-linking agent. The N-alkyl methacrylamide monomer has the structure shown in Formula I:

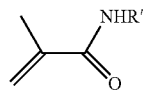

Formula I wherein R' is selected from linear, branched, or cyclic alkyl groups containing one to eight carbon atoms, benzyl or phenyl, any of which may be un-substituted or substituted with additional functional groups such as hydroxyl, amino, and the like.

R' may also be selected from the group consisting of unsubstituted $C_1$-$C_4$ alkyl groups.

When R' is methyl, the N-alkyl methacrylamide monomer is N-methyl methacrylamide (NMMA).

The N-alkyl methacrylamide monomer may be present in the reactive mixture in concentrations between about 1 and about 50 weight percent, about 5 to about 50, about 7 to about 30, about 7 to about 25 or about 7 to about 20 wt %, based upon all reactive components.

It has been surprisingly found that hydrogels made from reactive mixtures comprising at least one N-alkyl methacrylamide monomer and at least one silicone containing component display significantly increased modulus, while still retaining water content values of greater than 10% or 15% water. The modulus values can range up to 200,000 psi. Despite their surprisingly increased modulus, the silicone hydrogels of the present invention are not brittle, and have acceptable % elongation values greater than 5%, or greater than 10%. These materials may be used to create hybrid contact lenses, with rigid centers which retain their shape when placed on eye, instead of vaulting over the cornea. This creates a stiffer central optic zone relative to the peripheral zone of the contact lens. Stiffness is the modulus of the material, E, multiplied by the cube of thickness, t: $Et^3$.

For contact lenses, as a lens gets thicker, especially beyond about 150 or 200 microns, lens awareness increases. Thus, when creating a hybrid lens, it may be desirable use materials having moduli greater than about 1,000, 10,000 or 100,000. The at least one N-alkyl methacrylamide monomer and siloxane groups on the at least one silicone containing component appear to interact with each other to create hydrogels having increased modulus values compared to formulations without both the at least one N-alkyl methacrylamide monomer and at least one silicone containing component.

The silicone-containing component may be a monomer or macromer and may comprise at least one monovalent reactive group and at least one siloxane group. The silicone-containing components may have at least four repeating siloxane units, which may be any of the groups defined below.

The silicone-containing component may also contain at least one fluorine atom. The silicone-containing component may be selected from the polydisubstituted siloxane macromer of Formula II,

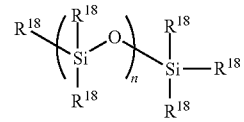

Formula II wherein:
at least one $R^{18}$ is a monovalent reactive group, and the remaining $R^{18}$ are independently selected from
monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof;
fluoroalkyl alkyl or aryl groups; partially fluorinated alkyl or aryl groups; halogens; linear, branched or cyclic alkoxy or aryloxy groups; linear or branched polyethyleneoxyalkyl groups, polypropyleneoxyalkyl groups, or poly(ethyleneoxy-co-propyleneoxyalkyl groups; and monovalent siloxane chains comprising between 1-100 siloxane repeat units which may further comprise functionality selected from alkyl, alkoxy, hydroxy, amino, oxa, carboxy, alkyl carboxy, alkoxy, amido, carbamate, halogen or combinations thereof;

wherein n is 0 to 500 or 0 to 200, or 0 to 100, or 0 to 20, where it is understood that when n is other than 0, n is a distribution having a mode equal to a stated value.

In Formula II from one to three $R^{18}$ may comprise monovalent reactive groups.

Suitable monovalent alkyl and aryl groups include
unsubstituted and substituted monovalent linear, branched or cyclic $C_1$ to $C_{16}$ alkyl groups, or unsubstituted monovalent $C_1$ to $C_6$ alkyl groups, such as substituted and unsubstituted methyl, ethyl, propyl, butyl,
substituted or unsubstituted $C_6$-$C_{14}$ aryl groups, or a substituted or un-substituted $C_6$ aryl group, wherein the substituents include amido, ether, amino, halo, hydroxyl, carboxyl, carbonyl groups; or a phenyl or benzyl group, combinations thereof and the like.

When one $R^{18}$ is a monovalent reactive group, the additional silicone containing compounds may be selected from the polydisubstituted siloxane macromer of Formulae IIIa or IIIb; the styryl polydisubstituted siloxane macromer of Formula IVa or IVb or the carbosilane of Formula IVc:

each methylene group may optionally be independently substituted with ethers, amines, carbonyls, carboxylates, carbamates and combinations thereof; or
an oxyalkylene segment $(OCH_2)_k$ and
k is a whole number from one to three, or wherein $R^{19}$ may be a mixture of alkylene and oxyalkylene segments and the sum of r and k is between 1 and 9;

wherein each $R^3$ and $R^4$ are independently a linear, branched, or cyclic alkyl group containing between one and six carbon atoms, a linear, branched, or cyclic alkoxy group containing between one and six carbon atoms, a linear or branched polyethyleneoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof;

wherein $R^5$ is a substituted or un-substituted linear or branched alkyl group having 1 to eight carbon atoms, or 1 to 4 carbon atoms, or methyl or butyl; or an aryl group, any of which may be substituted with one or more fluorine atoms.

Non-limiting examples of polysiloxane macromers include monomethacryloxypropyl terminated mono-n-butyl terminated polydimethylsiloxanes (mPDMS) as shown in Formula V wherein n is between 3 and 15; monomethacryloxypropyl terminated mono-n-alkyl terminated polydimethylsiloxanes, mono-n-alkyl terminated, polydimethyl, Formula IIIa

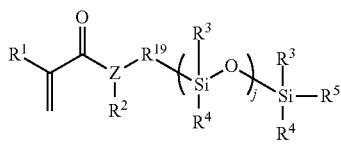

Formula IIIb

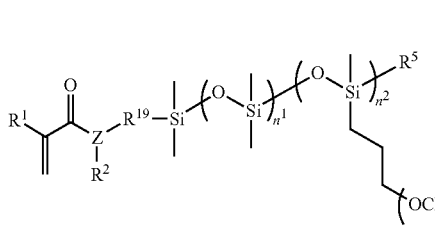

Formula IVa

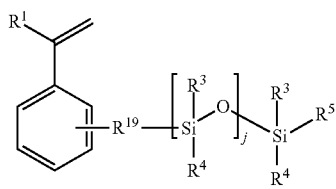

Formula IVb

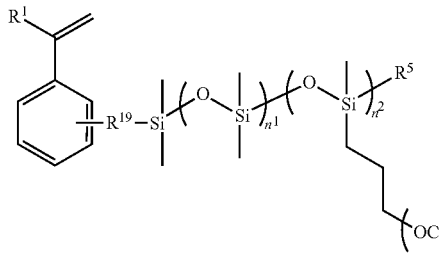

Formula IVc wherein $R^1$ is a hydrogen atom or methyl;

Z is selected from O, N, S or $NR_1CH_2CH_2O$; when Z=O or S, $R^2$ is not required;

wherein j is a whole number between 1 and 20;

wherein $R^{19}$ is a substituted or unsubstituted $C_{1-6}$, $C_{1-4}$ or $C_{2-4}$ alkylene segment $(CH_2)_r$, polyethylene glycol siloxanes as shown in Formulae VIa and VIb wherein q is up to 50, 5 to 30 or 10-25; $n^1$ and $n^2$ are between 4 to 100; 4 to 50; or 4 to 25; $n^3$ is 1-50, 1-20, or 1-10, and $R^2$ though $R^4$ are as defined above; q is up to 50, 5-30 or 10-25; and macromers having the chemical structures as shown in formulae VIIa through Xb, where n is between 4-100, 4 and 20, or between 3 and 15, and $R^5$ may be C1-C4 alkyl or methyl or butyl.

Formula V

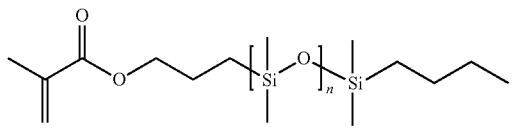

Formula VIa

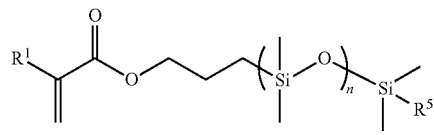

Formula VIb

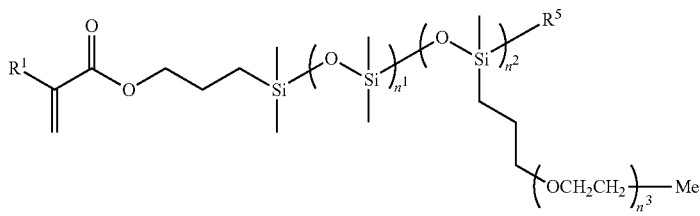

Formula VIIa

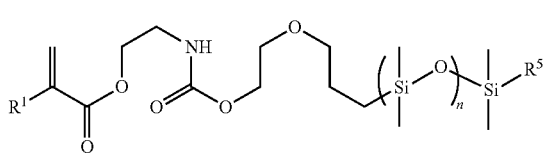

Formula VIIb

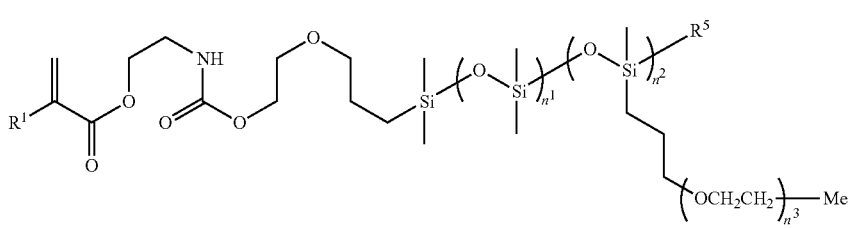

Formula VIIc

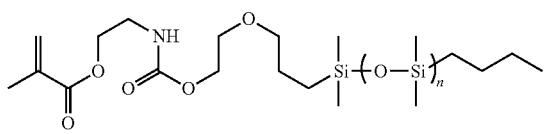

Formula VIII

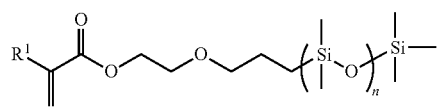

Formula IX

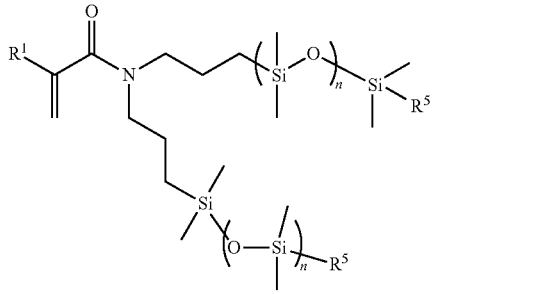

Formula Xa

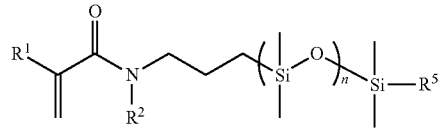

Formula Xb

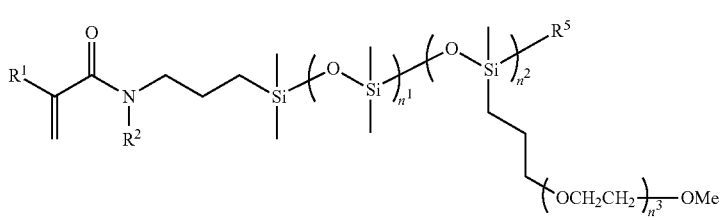

Examples of suitable mono(meth)acryloxyalkylpolydisubstituted siloxanes include mono(meth)acryloxypropyl terminated mono-n-butyl terminated polydimethylsiloxane, mono(meth)acryloxypropyl terminated mono-n-methyl terminated polydimethylsiloxane, mono(meth)acryloxypropyl terminated mono-n-butyl terminated polydiethylsiloxane, mono(meth)acryloxypropyl terminated mono-n-methyl terminated polydiethylsiloxane, mono(meth)acrylamidoalkylpolydialkylsiloxanes mono(meth)acryloxyalkyl terminated mono-alkyl polydiarylsiloxanes, and mixtures thereof.

In Formula II, when n is zero, one or more $R^{18}$ may comprise a monovalent reactive group, two or more $R^{18}$ comprise tristri$C_{1-4}$alkylsiloxysilane groups, monovalent siloxane chains comprising between 1-100, 1-10 or 1-5 siloxane repeat units which may further comprise functionality selected from alkyl, alkoxy, hydroxy, amino, oxa, carboxy, alkyl carboxy, alkoxy, amido, carbamate, halogen or combinations thereof; and the remaining $R^{18}$ are selected from monovalent alkyl groups having 1 to 16, 1 to 6 or 1-4 carbon atoms. Non-limiting examples of silicone components include, 3-methacryloxypropyltris(trimethylsiloxy)silane (TRIS), 3-methacryloxypropylbis(trimethylsiloxy) methylsilane, and 3-methacryloxypropylpentamethyl disiloxane.

The number of siloxane repeating units, n, may also be 2 to 50, 3 to 25, or 3 to 15; wherein at least one terminal $R^{18}$ comprises a monovalent reactive group and the remaining $R^{18}$ are selected from monovalent alkyl groups having 1 to 16 carbon atoms, or from monovalent alkyl groups having 1 to 6 carbon atoms. Silicone-containing compounds may also include those where n is 3 to 15, one terminal $R^{18}$ comprises a monovalent reactive group, the other terminal $R^{18}$ comprises a monovalent alkyl group having 1 to 6 carbon atoms and the remaining $R^{18}$ comprise monovalent alkyl group having 1 to 3 carbon atoms. Non-limiting examples of silicone components include monomethacryloxypropyl n-butyl terminated polydimethylsiloxanes ($M_n$=800-1000), (mPDMS, as shown in V).

Formula II may also include compounds where n is 5 to 400 or from 10 to 300, both terminal $R^{18}$ comprise monovalent reactive groups and the remaining $R^{18}$ are independently of one another selected from monovalent alkyl groups having 1 to 18 carbon atoms which may have ether linkages between carbon atoms and may further comprise halogen.

One to four $R^{18}$ in Formula II may comprise a vinyl carbonate or vinyl carbamate of Formula XI:

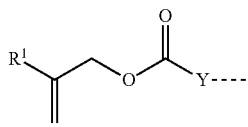

Formula XI wherein: Y denotes O—, S— or NH—; $R^1$ denotes a hydrogen atom or methyl.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris(trimethylsiloxy)silane]; 3-[tris(trimethylsiloxy)silyl] propyl allyl carbamate; 3-[tris(trimethylsiloxy) silyl] propyl vinyl carbamate; trimethylsilylethyl vinyl carbonate; trimethylsilylmethyl vinyl carbonate, and the crosslinking agent of Formula XII.

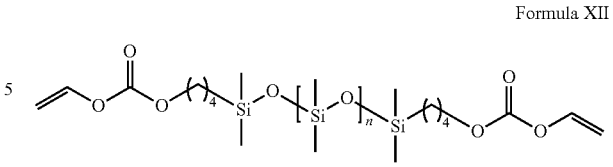

Formula XII

Where biomedical devices with moduli below about 200 psi are desired, only one $R^{18}$ comprises a monovalent reactive group and no more than two of the remaining $R^{18}$ groups comprise monovalent siloxane groups.

Another suitable silicone-containing macromer is compound of Formula XIII in which the sum of x and y is a number in the range of 10 to 30. The silicone containing macromer of Formula XXIII is formed by the reaction of fluoroether, hydroxy-terminated polydimethylsiloxane, isophorone diisocyanate and isocyanatoethylmethacrylate.

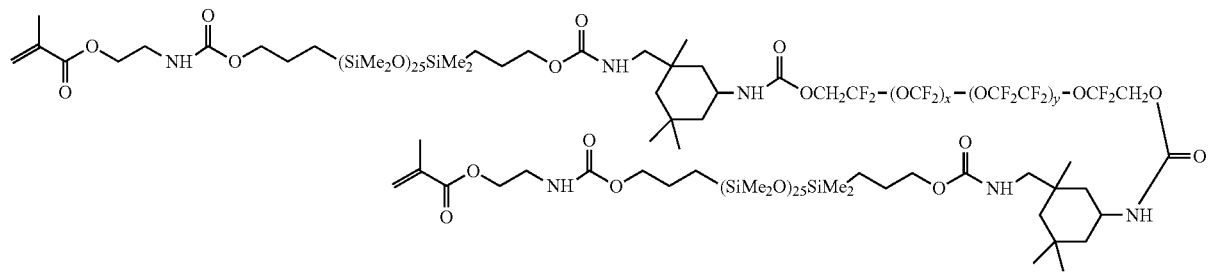

Formula XIII

The non-hydroxyl containing silicone-containing component may be selected from non-hydroxyl containing acrylamide silicones of U.S. Pat. No. 8,415,405. Other silicone components suitable for use in this invention include those described is WO 96/31792 such as macromers containing polysiloxane, polyalkylene ether, diisocyanate, polyfluorinated hydrocarbon, polyfluorinated ether and polysaccharide groups. Another class of suitable silicone-containing components includes silicone-containing macromers made via GTP, such as those disclosed in U.S. Pat. Nos. 5,314,960, 5,331,067, 5,244,981, 5,371,147, and 6,367,929. U.S. Pat. Nos. 5,321,108, 5,387,662, and 5,539,016 describe polysiloxanes with a polar fluorinated graft or side group having a hydrogen atom attached to a terminal difluoro-substituted carbon atom. US 2002/0016383 describes hydrophilic siloxanyl methacrylates containing ether and siloxanyl linkages and crosslinkable monomers containing polyether and polysiloxanyl groups. Any of the foregoing polysiloxanes can also be used as the silicone-containing component in this invention.

The non-hydroxyl containing silicone component may be selected from the group consisting of monomethacryloxypropyl terminated, mono-n-alkyl terminated linear polydisubstituted siloxane; methacryloxypropyl-terminated linear polydisubstituted siloxane; and mixtures thereof.

The non-hydroxyl containing silicone component may also be selected from monomethacrylate terminated, $C_1$-$C_4$ alkyl terminated, linear polydimethylsiloxanes; and mixtures thereof.

In some instances, the non-hydroxyl functionalized silicone-containing component may be used in amounts up to about 10 wt %. Examples include those selected from mPDMS of Formula XXII where $R^5$ is methyl or butyl, compounds of Formulae XXVIa, XVIIb through XVIIIb, XX, XXIa, XXIb and the macromers shown in Formula XXV or XXVI where n is n is 1-50 and m is 1-50, 1-20 or 1-10:

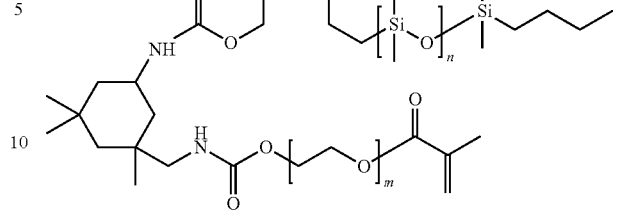

Formula XV

Specific examples of non-hydroxyl functionalized silicone-containing components include mPDMS of Formula VIa, compounds of Formulae VIa or b, or VIII where $R^1$ is methyl and $R^5$ is selected from methyl or butyl and the macromers shown in Formula XIV where n is 1-50 or 4-40, 4-20.

Specific examples of silicone containing crosslinkers include bismethacryloxypropyl polydimethyl siloxane, where n may be 4-200, or 4-150, and the following compounds of Formula XVIa-XVIc, where $n^1$ and $n^2$ are independently selected from 4 to 100; 4 to 50; or 4 to 25; $n^3$ is 1-50, 1-20 or 1-10, m is 1-100, 1-50, 1-20 or 1-10, and q is up to 50, 5-30 or 10-25.

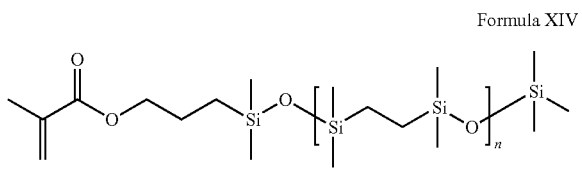

Formula XIV

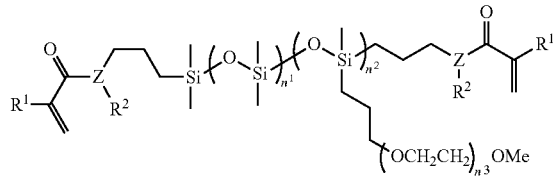

Formula XVIa

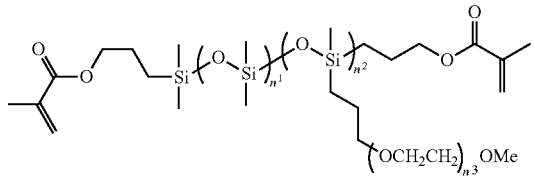

Formula XVIb

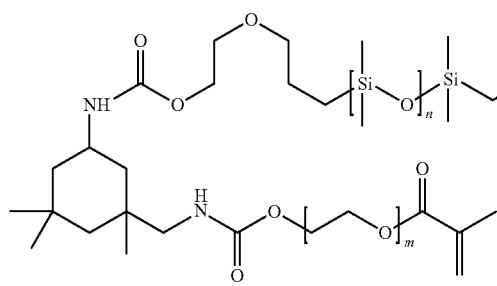

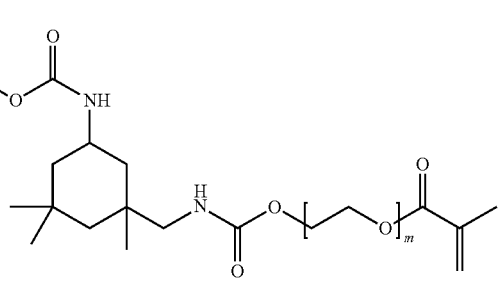

Formula XVIc

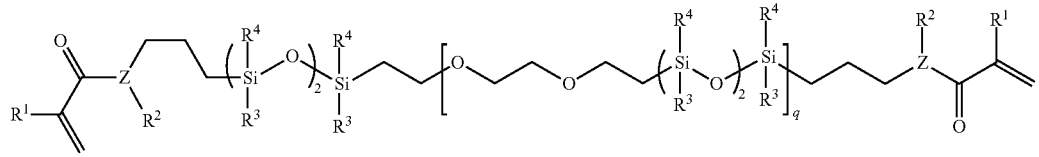

Formula XVIIa

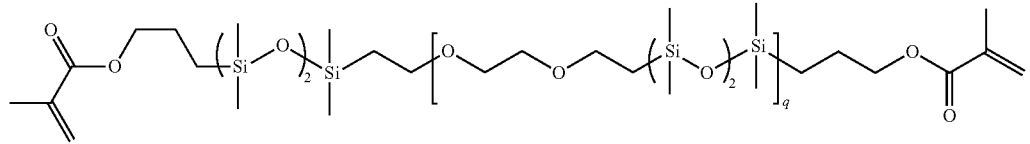

Formula XVIIb

Formula XVIIc

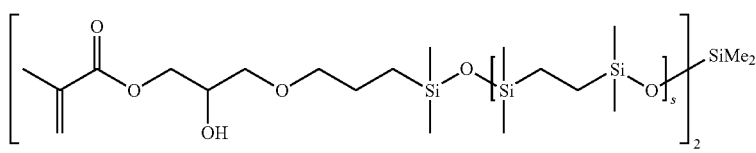

The non-hydroxyl containing silicone component may have an average molecular weight of from about 400 to about 4000 Daltons.

When Z is O, the silicone containing component may be a monomethacryloxypropyl terminated mono-n-butyl terminated polydimethylsiloxanes (mPDMS) as shown in Formula VI wherein n is between 3 and 15; monomethacryloxypropyl terminated mono-n-alkyl terminated polydimethylsiloxanes as shown in Formula VIa wherein n is between 3 and 15 and R is a linear, branched, or cyclic alkyl group containing between 1 and 8 carbon atoms; and macromers having the chemical structures as shown in Formulae VIIa through XIIc, or VIII where n is between 4 and 20, or between, 3 and 15, 3-30, 3-25, 3-20 or 3-15.

When X is N, further examples of polysiloxane macromers include Mono(meth)acrylamidoalkylpolydialkylsiloxanes may be selected from those disclosed in U.S. Pat. No. 8,415,405, and those shown in Formulae XIII, mono(meth)acrylamidoalkyl polydimethylsiloxanes, such as those in Formulae XIX-XXIII, and N-(2,3-dihydroxypropane)-N'-(propyl tetra(dimethylsiloxy) dimethylbutylsilane)acrylamide:

Formula XIII

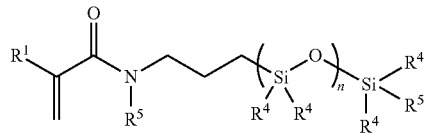

Formula XIX

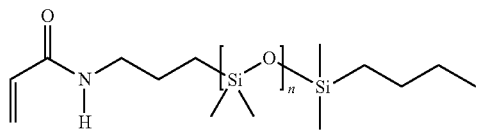

Formula XX

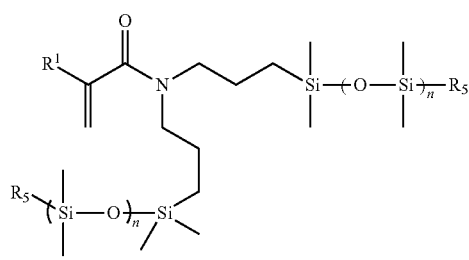

Formula XXI

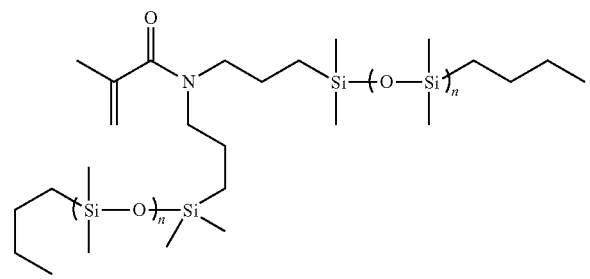

Formula XXII

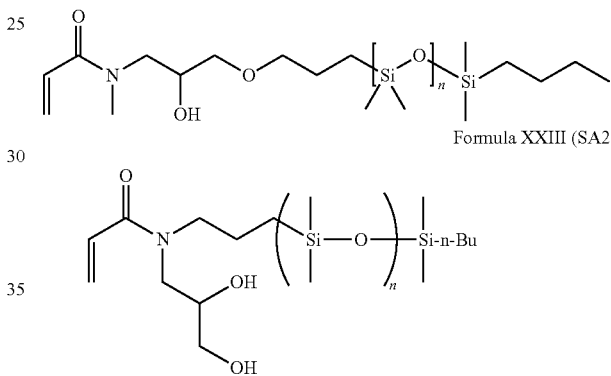

Formula XXIII (SA2)

Examples of styryl monomers include tris(trimethylsiloxy)silyl styrene. Examples of styryl macromers are shown below in chemical formulae XXIV through XIX, wherein n is as defined above.

Formula XXIV

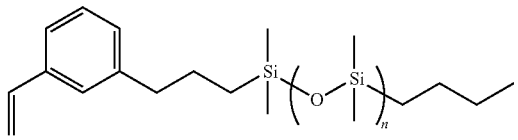

Formula XXV

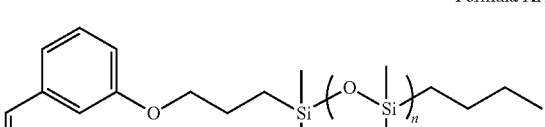

Formula XXVI

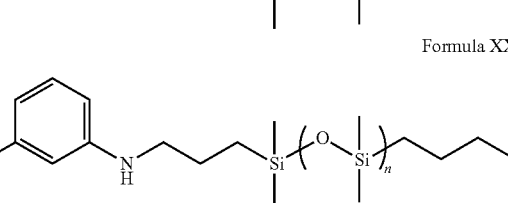

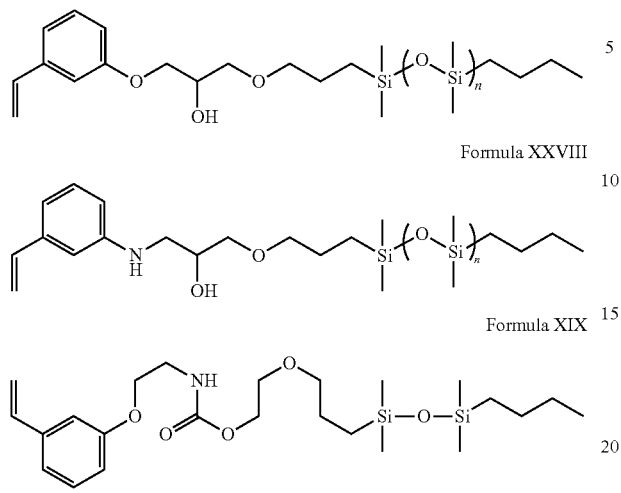

Formula XXVII

Formula XXVIII

Formula XIX

The length of the silicone chain may have an impact on the modulus of the resulting silicone hydrogel and may be adjusted along with the other components of the reactive mixture to achieve the desired balance of physical and mechanical properties. For instance, the amounts of NMMA and the length of the silicone chain may be chosen to attain a water content of the silicone hydrogel that moderates stiffness and increases elongation to break concurrently. As the polydialkylsiloxane chain length increases, modulus will decrease and elongation to break will increase. Polydialkylsiloxane chain lengths between 1 and 20, 1 and 15, 3-30, 3-25, 3-20 or 3-15 may be selected.

The silicone-containing component may further include silicone-containing monomers with branched siloxane groups. Examples include tris(trimethylsiloxy)silylstyrene (Styryl-TRIS), 3-tris(trimethylsiloxy)silylpropyl methacrylate (TRIS), N-[3-tris(trimethylsiloxy)silyl]-propyl acrylamide (TRIS-Am, Formula XXI), 2-hydroxy-3-[3-methyl-3,3-di(trimethylsiloxy)silylpropoxy]-propyl methacrylate (SiMAA), and other bulky silicone monomers, such as those in Formulae XXa through XXe, wherein $R^8$ and $R^9$ is independently linear, branched, or cyclic alkyl groups containing between one and eight carbon atoms, or are trimethylsiloxy groups.

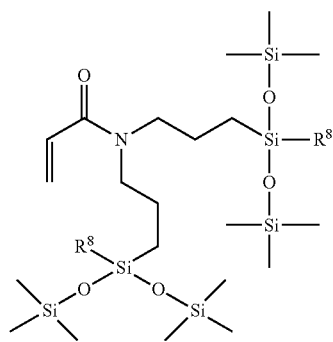

Formula XXa

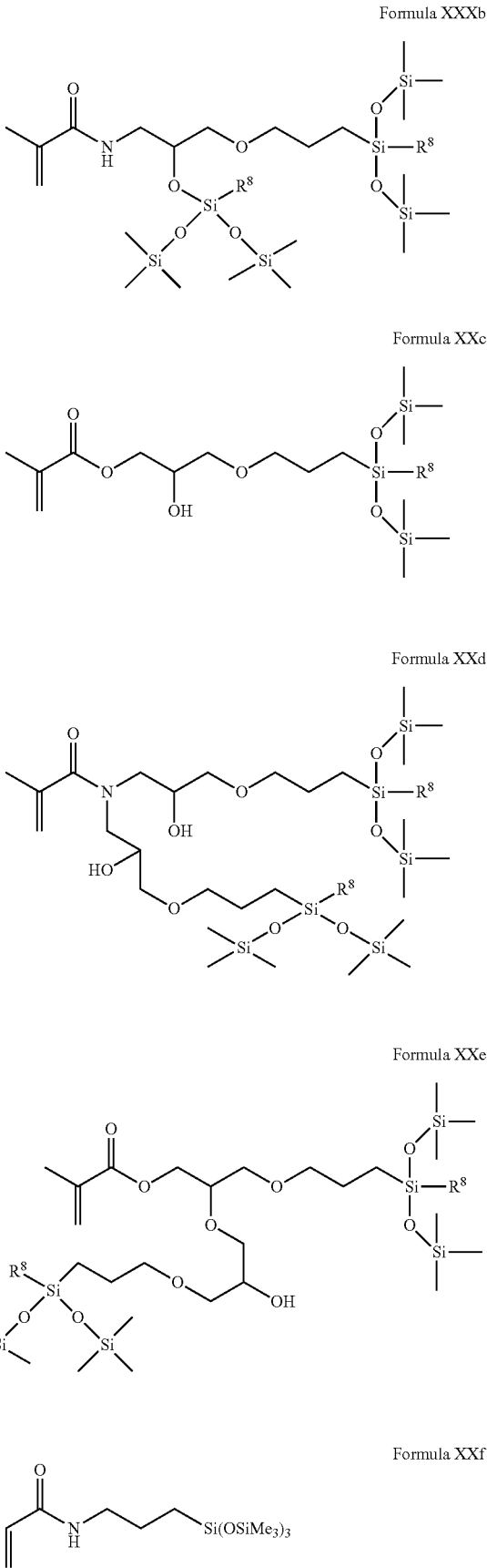

Formula XXXb

Formula XXc

Formula XXd

Formula XXe

Formula XXf

-continued

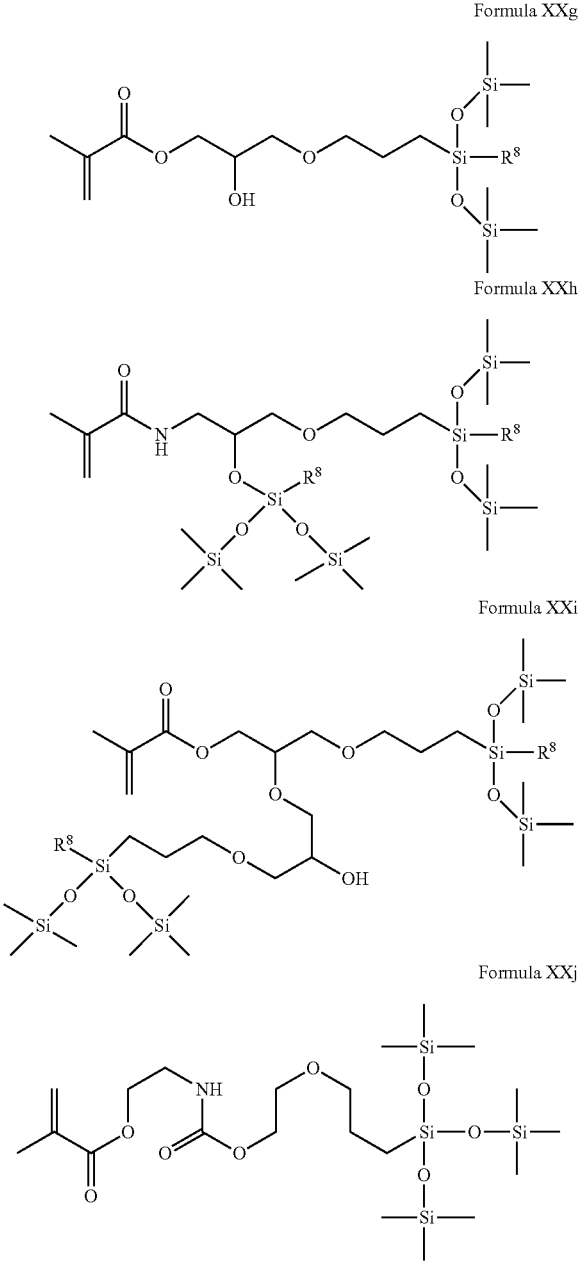

Formula XXg

Formula XXh

Formula XXi

Formula XXj

The aforementioned macromers have methacrylate, acrylamide, or methacylamide reactive groups. These reactive groups may be replaced with any other reactive group capable of undergoing free radical polymerization, such as acrylates, styrenes, vinyl ethers, N-vinyllactams, N-vinylamides, N-vinylimides, N-vinylureas, O-vinylcarbamates, O-vinylcarbonates, and other vinyl compounds. Where moduli greater than about 5000 psi are desired, monomers and macromers with styryl reactive groups are beneficially included. Alternative silicone-containing components suitable for use include those described in WO 96/31792 and U.S. Pat. No. 5,314,960, U.S. Pat. No. 5,331,067, U.S. Pat. No. 5,244,981, U.S. Pat. No. 5,371,147, U.S. Pat. No. 6,367,929, U.S. Pat. No. 5,321,108, U.S. Pat. No. 5,387,662, U.S. Pat. No. 5,539,016, U.S. Pat. No. 6,867,245, and others will be apparent to one skilled in the art.

Hydroxyl-Containing Silicone Component

The silicone containing component may also comprise one or more hydroxyl-containing silicone component. Hydroxyl-containing silicone components may help to compatibilize high concentrations of silicone containing components with hydrophilic components, including polymeric hydrophilic components, and silicone components having bulky siloxane groups or longer chains of repeating siloxane units. Hydroxyl-containing silicone components include hydroxyl containing silicone monomers and macromers. The Hydroxyl-containing silicone components may have 4 to 200, 4-100 or 4-20 siloxane repeating units and may be monofunctional or multifunctional.

Hydroxyl-containing silicone components having 4 polysubstituted siloxane repeating units in the siloxane chain are not a distribution and have four repeating units in each monomer. For all hydroxyl-containing silicone components having more than four polydisubstituted siloxane repeating units in the siloxane chain the number of repeating units is a distribution, with the peak of the distribution centered around the listed number of repeat units.

Examples of hydroxyl-containing silicone monomers include propenoic acid-2-methyl-2-hydroxy-3-[3-[1,3,3,3-tetramethyl-1-[(trimethylsilyl)oxy]-1-disiloxanyl]propoxy] propyl ester ("SiGMA"), and 2-hydroxy-3-methacryloxypropyloxypropyl-tris(trimethylsiloxy)silane, and compounds of Formula XXd.

The hydroxyl-containing silicone components may be selected from monofunctional hydroxyl substituted poly (disubstituted siloxane)s of Formula XXI:

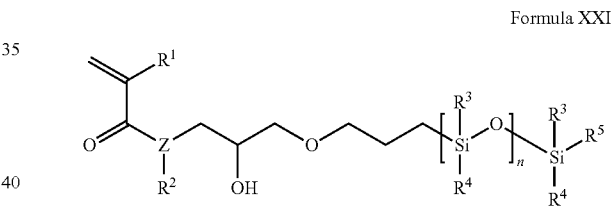

Formula XXI wherein Z is selected from O, N, S or $NR^1CH_2CH_2O$, when Z is O or S $R^2$ is not present;
$R^1$ is independently H or methyl;
$R^2$, $R^3$ and $R^4$ are independently a linear, branched, or cyclic alkyl group containing one to eight carbon atoms, any of which may be further substituted with at least one hydroxy group, and which may be optionally substituted with amide, ether, and combinations thereof; $R^3$ and $R^4$ may be independently selected from methyl, ethyl or phenyl, or may be methyl;
n is the number of siloxane units and is from 4 to 8 for the first monofunctional hydroxyl substituted poly(disubstituted siloxane) monomer, and
$R^5$ is selected from straight or branched $C_1$ to $C_5$ alkyl groups, which may be optionally substituted with one or more hydroxyl, amide, ether, and
combinations thereof. $R^5$ may be straight or branched $C_4$ alkyl, either of which may optionally be substituted with hydroxyl, or may be methyl.

Examples of monofunctional hydroxyl containing silicone components include mono-(2-hydroxy-3-methacryloxypropyl)-propyl ether terminated mono-n-butyl terminated polydimethylsiloxanes (OH-mPDMS) as shown in Formula) XXIIa wherein n is between 4 and 30, 4-8 or 10-20; and polydimethylsiloxanes having the chemical structures as shown in Formulae XXIIb through XXIIId, where n is between 4 and 30, 4 and 8 or 10 and 20; $n^1$ $n^2$, and $n^3$ are independently between 4 to 100; 4 to 50; 4 to 25; $R^5$ is selected from straight or branched $C_1$ to $C_8$ alkyl groups, which may be optionally substituted with one or more hydroxyl, amide, ether, polyhydroxyl groups selected from straight or branched $C_1$ to $C_8$ groups having a formula of $C_fH_g(OH)_h$ wherein f=1-8 and g+h=2f+1 and cyclic $C_1$ to $C_8$ groups having a formula of $C_fH_g(OH)_h$ wherein f=1-8 and g+h=2f−1, and combinations thereof; or $R^5$ may be selected from methyl, butyl or hydroxyl substituted $C_2$-$C_5$ alkyl, including hydroxyl ethyl, hydroxyl propyl, hydroxyl butyl, hydroxyl pentyl and 2,3-dihydroxypropyl, and polycarbosiloxanes of Formula XXIV where a and b are between 4-100 or 4-8 and c is 4-8 for the first hydroxyl-containing silicone component and $R^1$ and $R^5$ are as defined above.

Formula XXIIa

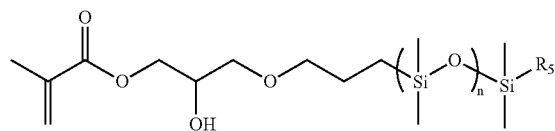

Formula XXIIb

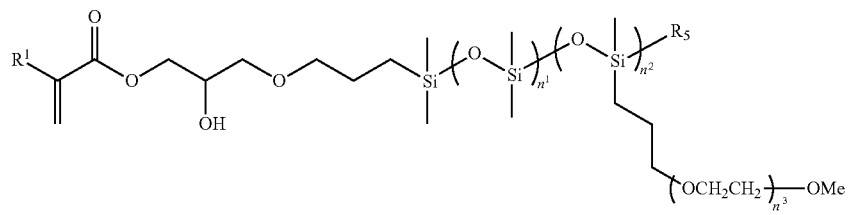

Formula XXIIIa

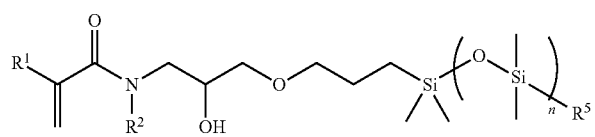

Formula XXIIIb

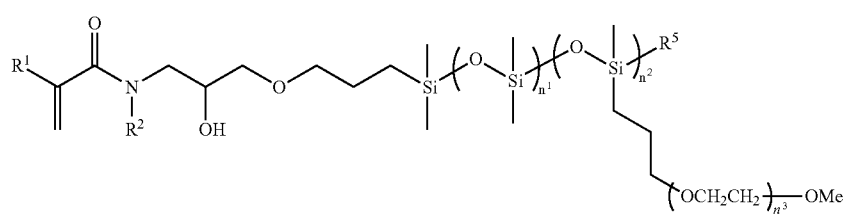

Formula XXIIIc

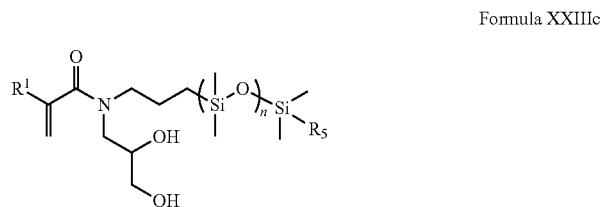

Formula XXIIId

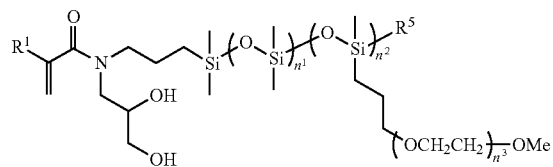

Formula XXIVa

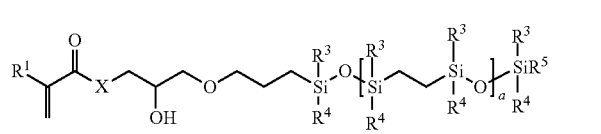

Formula XXIVb

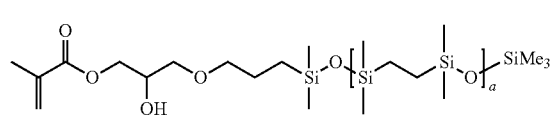

The hydroxyl-containing silicone component may also be selected from multifunctional hydroxyl substituted, poly(disubstituted siloxane) of Formula XXV having 10 to 500, or 10 to 200, or 10 to 100 siloxane repeating units, and mixtures thereof:

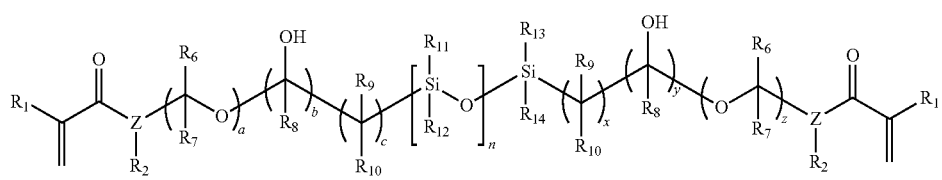

Formula XXV wherein in Formula XXV, Z is selected from O, N, S or $NR^1CH_2CH_2O$; wherein $R^1$ is independently a hydrogen atom or methyl group; for Z=O and S, $R^2$ is not required;

- $R^2$, $R^6$, $R^7$, $R^8$, $R^9$, $R^{19}$ are independently selected from the group consisting of a hydrogen atom or any of the substituents defined for $R^{11}$ through $R^{14}$;
- $R^{11}$, $R^{12}$, $R^{13}$, $R^{14}$ are independently selected from the group consisting of a linear, branched, or cyclic alkyl group containing one to eight carbon atoms, any of which may be further substituted with at least one hydroxy group, amido, ether, amino, carboxyl, carbonyl groups and combinations; a linear or branched alkyleneoxy group, specifically ethyleneoxy groups, $[CH_2CH_2O]_p$ wherein p is between 1 and 200, or 1 and 100, or 1 and 50, or 1 and 25, or 1 and 20, optionally substituted with one or more hydroxyl, amino, amido, ether, carbonyl, carboxyl, and combinations thereof;
- a $C_1$-$C_6$ linear or branched fluoroalkyl groups optionally substituted with one or more hydroxyl, amino, amido, ether, carbonyl, carboxyl, and combinations thereof;
- a substituted or un-substituted aryl groups, specifically phenyl groups, wherein the substituents are selected from halogen, hydroxyl, alkoxy, alkylcarbonyl, carboxy, and linear or branched or cyclic alkyl groups which may be further substituted with halogen, hydroxyl, alkoxy, alkylcarbonyl, and carboxyl groups, and combinations thereof; and
- a, b, c, x, y and z are independently between 0 and 100, between 0 and 50, between 0 and 20, between 0 and 10, or between 0 and 5; and
- n is the number of siloxane repeating units and is from 10 to 500; 10 to 200; 10 to 100; 10 to 50; 10 to 20.

Examples of multifunctional hydroxyl containing silicones include α-(2-hydroxy-1-methacryloxypropyloxypropyl)-w-butyl-decamethylpentasiloxane and the difunctional polysiloxanes of Formulae XXVI or XXVII:

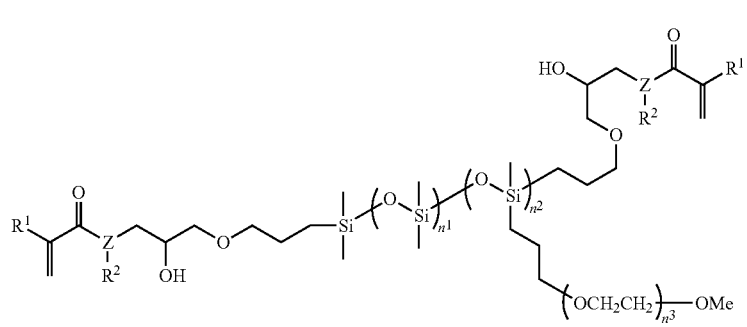

Formula XXVI

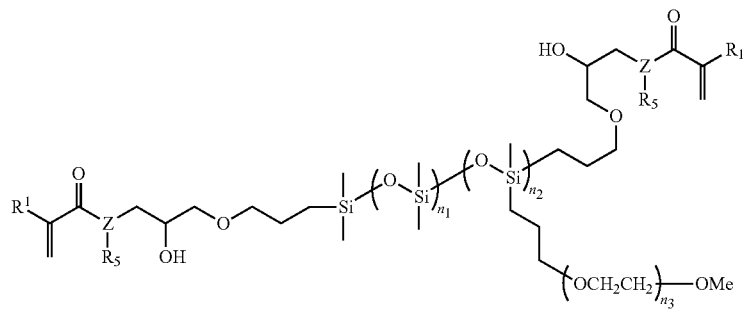

Wherein the substituents are as defined above;

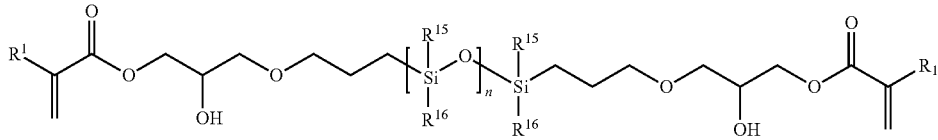

Formula XXV wherein
$R^1$ is independently a hydrogen atom or methyl group;
$R^{15}$ and $R^{16}$ are independently a linear, branched, or cyclic alkyl group containing one to eight carbon atoms, any of which may be further substituted with at least one hydroxy group, amido, ether, amino, carboxyl, carbonyl groups and combinations thereof; or are independently selected from unsubstituted $C_{1-4}$ alkyl groups and $C_{1-4}$ alkyl groups substituted with hydroxyl or ether; or are selected from methyl, ethyl or —$(CH_2CH_2O)_{n3}OCH_3$;
$n^1$ and $n^2$ are independently selected from is 4 to 100; 4 to 50; or 4 to 25 and $n^3$ is 1-50, 1-20, and 1-10

At least one silicone-containing component is present in the reactive mixture in an amount sufficient to provide the desired modulus and oxygen permeability of the silicone hydrogel. It has been found that the N-alkyl methacrylamides provide a surprising increase in modulus when included in formulations also comprising a silicone-containing component. This increase in modulus is not observed in conventional hydrogel formulations. The silicone-containing component may be included in the reactive mixture in amounts from about 20 to about 60 weight %, or from about 30 to about 55 weight %, from about 30 weight % to about 50 weight %, from about 50 weight % to about 60 weight %, all based upon the total weight of all of the reactive components.

It may also be desirable for the resulting silicone hydrogel to exhibit oxygen permeability greater than about 50 barrers, between about 50 barrers and about 200 barrers; between about 70 barrers and about 150 barrers; or between about 80 barrers and about 150 barrers.

Cross-Linking Agent

The silicone hydrogels of the present invention include at least one cross-linking agent. A variety of cross-linking agents may be used, including silicone-containing and non-silicone containing cross-linking agents, and mixtures thereof. Non-silicone-containing cross-linking agents include ethylene glycol dimethacrylate (EGDMA), diethyleneglycol dimethacrylate, trimethylolpropane trimethacrylate (TMPTMA), tetraethylene glycol dimethacrylate (TEGDMA), triallyl cyanurate (TAC), glycerol trimethacrylate, 1,3-propanediol dimethacrylate; 2,3-propanediol dimethacrylate; 1,6-hexanediol dimethacrylate; 1,4-butanediol dimethacrylate, methacryloxyethyl vinylcarbonate (HE-MAVc), allylmethacrylate, methylene bisacrylamide (MBA), polyethylene glycol dimethacrylate (wherein the polyethylene glycol preferably has a molecular weight up to 5,000 Daltons). Any of the above disclosed multifunctional silicone-containing components may be used as cross-linking agents.

Other cross-linking agents will be known to one skilled in the art and may be used to make the silicone hydrogel of the present invention.

The non-silicone containing crosslinking agents are used in amounts from about 0.5 weight % to about 20 weight %, 3 weight % to 20 weight % or from about 3 weight % to about 15 weight %, all based upon the total weight of all of the reactive components. The exact amounts vary depending on the mechanical property targets and the other reactive components in the reactive mixture. In other units, the cross-linking agent may vary from about 16 mmoles in 100 grams of reactive mixture to about 30 mmole in 100 grams of reactive mixture, and preferably between 16 mmoles/100 grams and 25 mmoles/100 grams of reactive mixture. It may be desirable to select the crosslinking agents which have reactive groups with similar reactivity rates with those of the other components to form the silicone hydrogel networks. Thus it may be desirable to select crosslinking agents with at least one reactive group which is the same as the reactive groups included in the other reactive components. The structure and morphology of the resulting silicone hydrogel may also be influenced by the diluent(s) and cure conditions used.

Multifunctional silicone-containing components, including macromers may also be included to further increase the modulus and retain tensile strength. The silicone containing crosslinking agents may be used alone or in combination with other cross-linking agents. An example of a silicone containing monomer which can act as a crosslinking agent and, when present, does not require the addition of a crosslinking monomer to the reaction mixture includes α,ω-bismethacryloypropyl polydimethylsiloxane.

When silicone cross-linking agents are used in the formulation, limiting the number of siloxane repeating units in the silicone cross-linking agent between 5 and 200, 5 and 150, 5 and 120 allows the retention of modulus values in excess of 15,000 psi, without significantly impacting other properties such as oxygen permeability, and elongation. When moduli over 15,000 psi are desired, silicone cross-linking agents may be included in amounts between 0 to about 25 weight percent, or between about 10 weight percent and 20 weight percent, all based upon the total weight of all of the reactive components.

Non-limiting examples of silicone cross-linking agents are shown in Formulae XII, XIII, XVIa-XVIIc, above and the following chemical Formulae XXVI through XXXVII, wherein n is between 1 and 200, preferably n is between 50 and 150, more preferably between 50 and 100, and most preferably n is between 10 and 50.

Formula XXVI
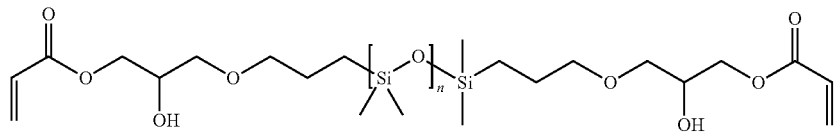
Formula VII
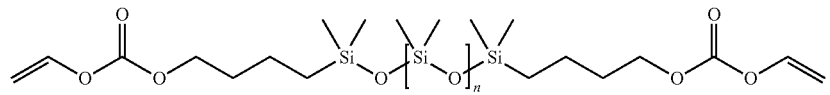
Formula XXVII
Formula XXIX
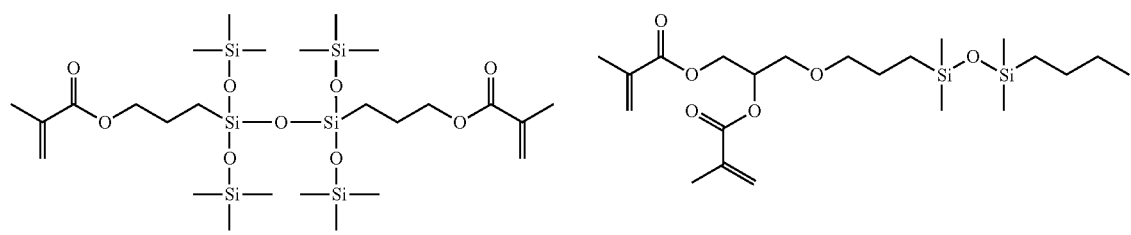
Formula XXX
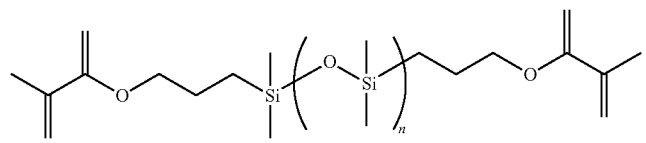
Formula XXXI
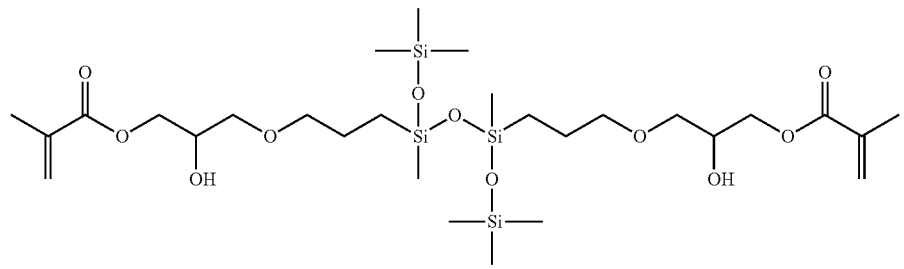
Formula XXXXII
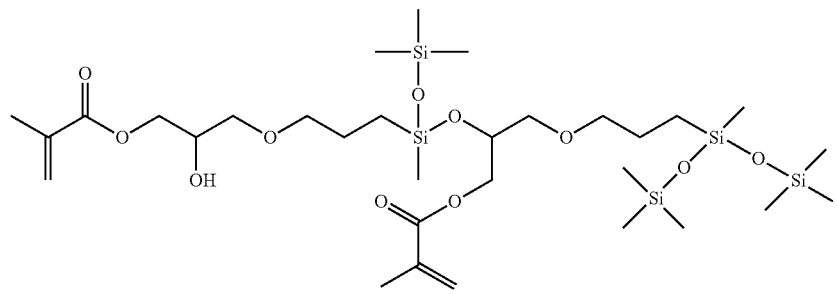
Formula XXXXIII
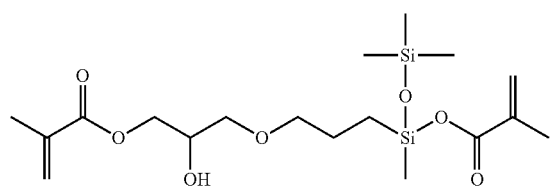
Formula XXXIV
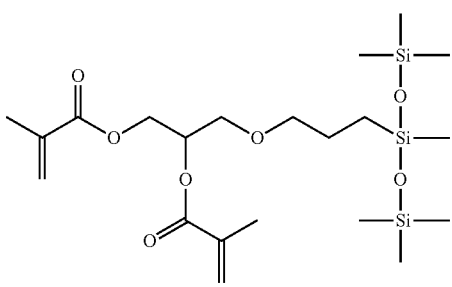

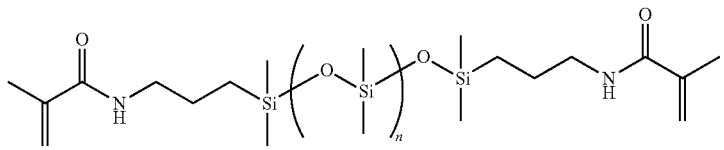

Formula XXXV

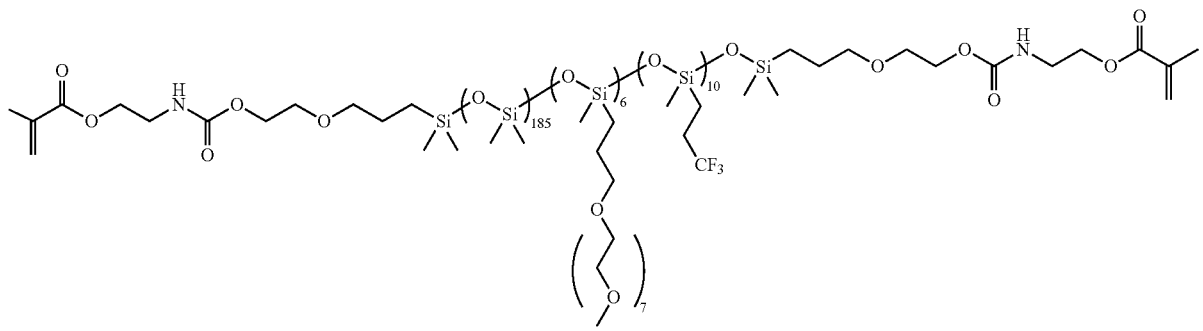

Formula XXXVI

The aforementioned silicone cross-linking agents may also have acrylate, methacrylate, O-vinylcarbonate, or methacylamide reactive groups. These reactive groups may be replaced with any other reactive group capable of undergoing free radical polymerization, such as, styrenes, vinyl ethers, N-vinyllactams, N-vinylamides, N-vinylimides, N-vinylureas, O-vinylcarbamates, and other vinyl compounds. In some embodiments, silicone cross-linking agents with styryl reactive groups are preferred.

Cross-linking agents that have rigid chemical structures and reactive groups that undergo free radical polymerization may also be used. Non-limiting examples of suitable rigid structures include cross-linking agents comprising phenyl and benzyl ring, such are 1,4-phenylene diacrylate, 1,4-phenylene dimethacrylate, 2,2-bis(4-methacryloxyphenyl)-propane, 2,2-bis[4-(2-acryloxyethoxy)phenyl]propane, 2,2-bis[4-(2-hydroxy-3-methacryloxypropoxy)phenyl]propane, and 4-vinylbenzyl methacrylate, and combinations thereof. Rigid crosslinking agents may be included in amounts between about 2 and about 15, or 2-10, 3-7 based upon the total weight of all of the reactive components.

The more NMMA used, the more crosslinker can be used, while still reaching target water contents, and modulus.

The physical and mechanical properties of the silicone hydrogels of the present invention may be optimized for a particular use by adjusting the components in the reactive mixture. It is a benefit of the present invention that the desired moduli may be achieved using monofunctional silicone-containing components.

Hydrophilic Monomer

The silicone hydrogels of the present invention may further include one or more hydrophilic monomer. Hydrophilic monomers can be any of the hydrophilic monomers known to be useful to make hydrogels. Classes of suitable hydrophilic monomers include acrylic-containing monomers and vinyl-containing monomers. Examples of suitable families of hydrophilic monomers include N-vinyl amides, N-vinylimides, N-vinyl lactams, hydrophilic (meth)acrylates, (meth)acrylamides, hydrophilic styrenes, vinyl ethers, O-vinyl carbonates, O-vinyl carbamates, N-vinyl ureas, other hydrophilic vinyl compounds and mixtures thereof.

The hydrophilic monomers that may be used to make the polymers of this invention have at least one polymerizable double bond and at least one hydrophilic functional group. Such hydrophilic monomers may themselves be used as crosslinking agents, however, where hydrophilic monomers having more than one polymerizable functional group are used, their concentration should be limited as discussed above to provide a contact lens having the desired modulus. The term "vinyl-type" or "vinyl-containing" monomers refer to monomers containing the vinyl grouping (—CH═CH$_2$) and are generally highly reactive. Such hydrophilic vinyl-containing monomers are known to polymerize relatively easily.

"Acrylic-type" or "acrylic-containing" monomers are those monomers containing an acrylic group (CH$_2$═CRCOX) wherein R is H or CH$_3$, and X is O or N, which are also known to polymerize readily, such as N,N-dimethyl acrylamide (DMA), 2-hydroxyethyl methacrylamide, polyethyleneglycol monomethacrylate, methacrylic acid, acrylic acid, mixtures thereof and the like.

Hydrophilic monomers with at least one hydroxyl group (hydroxylalkyl monomer) may be used. The hydroxyl alkyl group may be selected from $C_2$-$C_4$ mono or dihydroxy substituted alkyl, and poly(ethylene glycol) having 1-10 repeating units; or is selected from 2-hydroxyethyl, 2,3-dihydroxypropyl, or 2-hydroxypropyl, and combinations thereof.

Examples of hydroxyalkyl monomers include 2-hydroxyethyl (meth)acrylate (HEMA), 3-hydroxypropyl (meth)acrylate, 2-hydroxypropyl (meth)acrylate, 2,3-dihydroxypropyl (meth)acrylate, 2-hydroxybutyl (meth)acrylate, 3-hydroxybutyl (meth)acrylate, 1-hydroxypropyl 2-(meth)acrylate, 2-hydroxy-2-methyl-propyl (meth)acrylate, 3-hydroxy-2,2-dimethyl-propyl (meth)acrylate, 4-hydroxybutyl (meth)acrylate, 2-hydroxyethyl (meth)acrylamide, N-(2-hydroxypropyl) (meth)acrylamide, N,N-bis(2-hydroxyethyl) (meth)acrylamide, N,N-bis(2-hydroxypropyl) (meth)acrylamide, N-(3-hydroxypropyl) (meth)acrylamide, 2,3-dihydroxypropyl (meth)acrylamide, glycerol (meth)acrylate, polyethyleneglycol monomethacrylate, and mixtures thereof.

The hydroxyalkyl monomer may also be selected from the group consisting of 2-hydroxyethyl methacrylate, glycerol methacrylate, 2-hydroxypropyl methacrylate, hydroxybutyl methacrylate, 3-hydroxy-2,2-dimethyl-propyl methacrylate, and mixtures thereof.

The hydroxyalkyl monomer may comprise 2-hydroxyethyl methacrylate, 3-hydroxy-2,2-dimethyl-propyl methacrylate, hydroxybutyl methacrylate or glycerol methacrylate.

When hydrophilic polymers in quantities great than about 3 wt % are desired, Hydroxyl containing (meth)acrylamides are generally too hydrophilic to be included as compatibilizing hydroxyalkyl monomers, and hydroxyl containing (meth)acrylates may be included in the reactive mixture and the lower amount of hydroxyalkyl monomers may be selected to provide a haze value to the final lens of less than about 50% or less than about 30%.

It will be appreciated that the amount of hydroxyl component will vary depending upon a number of factors, including, the number of hydroxyl groups on the hydroxyalkyl monomer, the amount, molecular weight and presence of hydrophilic functionality on the silicone containing components. The hydrophilic hydroxyl component may be present in the reactive mixture in amounts up to about 15%, up to about 10 wt %, between about 3 and about 15 wt % or about 5 and about 15 wt %.

Hydrophilic vinyl-containing monomers which may be incorporated into the hydrogels include monomers such as hydrophilic N-vinyl lactam and N-vinyl amide monomers including: N-vinyl pyrrolidone (NVP), N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, N-vinyl acetamide (NVA), N-vinyl-N-methylacetamide (VMA), N-vinyl-N-ethyl acetamide, N-vinyl-N-ethyl formamide, N-vinyl formamide, N-vinyl-N-methylpropionamide, N-vinyl-N-methyl-2-methylpropionamide, N-vinyl-2-methylpropionamide, N-vinyl-N,N'-dimethylurea, 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-N-propyl-3-methylene-2-pyrrolidone, 1-N-propyl-5-methylene-2-pyrrolidone, 1-isopropyl-3-methylene-2-pyrrolidone, 1-isopropyl-5-methylene-2-pyrrolidone, N-vinyl-N-ethyl acetamide, N-vinyl-N-ethyl formamide, N-vinyl formamide, N-vinyl isopropylamide, N-vinyl caprolactam, N-carboxyvinyl-β-alanine (VINAL), N-carboxyvinyl-α-alanine, N-vinylimidazole, and mixtures thereof.

Hydrophilic O-vinyl carbamates and O-vinyl carbonates monomers including: N-2-hydroxyethyl vinyl carbamate and N-carboxy-β-alanine N-vinyl ester. Further examples of the hydrophilic vinyl carbonate or vinyl carbamate monomers are disclosed in U.S. Pat. No. 5,070,215, and the hydrophilic oxazolone monomers are disclosed in U.S. Pat. No. 4,910,277.

Vinyl carbamates and carbonates, including N-2-hydroxyethyl vinyl carbamate, N-carboxy-β-alanine N-vinyl ester, Other hydrophilic vinyl monomers, including vinylimidazole, ethylene glycol vinyl ether (EGVE), di(ethylene glycol) vinyl ether (DEGVE), allyl alcohol, 2-ethyl oxazoline, vinyl acetate, acrylonitrile, and mixtures thereof.

(Meth)acrylamide monomers may also be included as hydrophilic monomers. Examples include N—N-dimethylacrylamide, acrylamide, N,N-bis(2-hydroxyethyl)acrylamide, acrylonitrile, N-isopropyl acrylamide, N,N-dimethylaminopropyl(meth)acrylamide, and any of the hydroxyl functional (meth)acrylamides listed above.

The hydrophilic monomers which may be incorporated into the polymers disclosed herein may be selected from N,N-dimethyl acrylamide (DMA), 2-hydroxyethyl acrylamide, 2-hydroxyethyl methacrylamide, N-hydroxypropyl methacrylamide, bishydroxyethyl acrylamide, 2,3-dihydroxypropyl (meth)acrylamide, N-vinylpyrrolidone (NVP), N-vinyl-N-methyl acetamide, N-vinyl methacetamide (VMA), and polyethyleneglycol monomethacrylate.

The hydrophilic monomers may be selected from DMA, NVP, VMA, NVA, and mixtures thereof.

The hydrophilic monomers of the present invention may be macromers of linear or branched poly(ethylene glycol), poly(propylene glycol), or statistically random or block copolymers of ethylene oxide and propylene oxide. The macromer of these polyethers has one reactive group. Non-limiting examples of such reactive groups are acrylates, methacrylates, styrenes, vinyl ethers, acrylamides, methacrylamides, and other vinyl compounds. In one embodiment, the macromer of these polyethers comprises acrylates, methacrylates, acrylamides, methacrylamides, and mixtures thereof. Other suitable hydrophilic monomers will be apparent to one skilled in the art.

The hydrophilic monomers may also comprise charged monomers including but not limited to acrylic acid, methacrylic acid, 3-acrylamidopropionic acid (ACA1), 4-acrylamidobutanoic acid, 5-acrylamidopentanoic acid (ACA2), 3-acrylamido-3-methylbutanoic acid (AMBA), N-vinyloxycarbonyl-α-alanine, N-vinyloxycarbonyl-6-alanine (VINAL), combinations thereof and the like.

The hydrophilic monomers may be selected from N,N-dimethyl acrylamide (DMA), N-vinylpyrrolidone (NVP), 2-hydroxyethyl methacrylate (HEMA), N-vinyl methacetamide (VMA), and N-vinyl N-methyl acetamide (NVA), N-hydroxypropyl methacrylamide, mono-glycerol methacrylate, 2-hydroxyethyl acrylamide, 2-hydroxyethyl methacrylamide, bishydroxyethyl acrylamide, 2,3-dihydroxypropyl (meth)acrylamide and mixtures thereof. The hydrophilic monomers may be selected from DMA, NVP, HEMA, VMA, NVA, and mixtures thereof.

The hydrophilic monomer(s) (including the hydroxyl alkyl monomers) may be present in amounts up to about 60 wt %, between about 1 to about 60 weight %, between about 5 to about 50 weight %, or about 5 to about 40 weight %, based upon the weight of all reactive components.

The silicone hydrogels of the present invention may further comprise at least one wetting agent. As used herein, wetting agents are hydrophilic polymers having a weight average molecular weight greater than about 5,000 Daltons, between about 150,000 Daltons to about 2,000,000 Daltons; between about 300,000 Daltons to about 1,800,000 Daltons; or between about 500,000 Daltons to about 1,500,000 Daltons.

The amount of wetting agent added to the reactive mixtures of the present invention may be varied depending on the other components used and the desired properties of the resulting silicone hydrogel. When present, the internal wetting agents in reactive mixtures may be included in amounts from about 1 weight percent to about 20 weight percent; from about 2 weight percent to about 15 percent, or from about 2 to about 12 percent, all based upon the total weight of all of the reactive components.

Wetting agents include but are not limited to homopolymers, statistically random copolymers, diblock copolymers, triblock copolymers, segmented block copolymers, graft copolymers, and mixtures thereof. Non-limiting examples of internal wetting agents are polyamides, polyesters, polylactones, polyimides, polylactams, polyethers, polyacids homopolymers and copolymers prepared by the free radical polymerization of suitable monomers including acrylates, methacrylates, styrenes, vinyl ethers, acrylamides, methacrylamides, N-vinyllactams, N-vinylamides, O-vinylcarbamates, O-vinylcarbonates, and other vinyl compounds. The wetting agents may be made from any hydrophilic monomer, including those listed herein.

The wetting agents may include acyclic polyamides comprise pendant acyclic amide groups and are capable of association with hydroxyl groups. Cyclic polyamides comprise cyclic amide groups and are capable of association with hydroxyl groups.

Examples of suitable acyclic polyamides include polymers and copolymers comprising repeating units of Formula XXXVII or Formula XXXVIII:

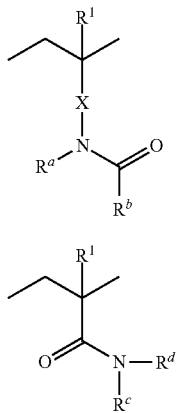

Formula XXXVII

Formula XXXVIII wherein X is a direct bond, —(CO)—, or —(CO)—NHR$^e$—, wherein R$^e$ is a C$_1$ to C$_3$ alkyl group; R$^a$ is selected from H, straight or branched, substituted or unsubstituted C$_1$ to C$_4$ alkyl groups; R$^b$ is selected from H, straight or branched, substituted or unsubstituted C$_1$ to C$_4$ alkyl groups, amino groups having up to two carbon atoms, amide groups having up to four carbon atoms, and alkoxy groups having up to two carbon groups; R$^c$ is selected from H, straight or branched, substituted or unsubstituted C$_1$ to C$_4$ alkyl groups, or methyl, ethoxy, hydroxyethyl, and hydroxymethyl; R$^d$ is selected from H, straight or branched, substituted or unsubstituted C$_1$ to C$_4$ alkyl groups; or methyl, ethoxy, hydroxyethyl, and hydroxymethyl wherein the number of carbon atoms in R$^a$ and R$^b$ taken together is 8 or less, including 7, 6, 5, 4, 3, or less, and wherein the number of carbon atoms in R$^c$ and R$^d$ taken together is 8 or less, including 7, 6, 5, 4, 3, or less. The number of carbon atoms in R$^a$ and R$^b$ taken together may be 6 or less or 4 or less. The number of carbon atoms in R$^c$ and R$^d$ taken together may be 6 or less. As used herein substituted alkyl groups include alkyl groups substituted with an amine, amide, ether, hydroxyl, carbonyl, carboxy groups or combinations thereof.

R$^a$ and R$^b$ can be independently selected from H, substituted or unsubstituted C$_1$ to C$_2$ alkyl groups. X may be a direct bond, and R$^a$ and R$^b$ may be independently selected from H, substituted or unsubstituted C$_1$ to C$_2$ alkyl groups.

R$^c$ and R$^d$ can be independently selected from H, substituted or unsubstituted C$_1$ to C$_2$ alkyl groups, methyl, ethoxy, hydroxyethyl, and hydroxymethyl.

The acyclic polyamides of the present invention may comprise a majority of the repeating unit of Formula XXXVII or Formula XXXVIII, or the acyclic polyamides can comprise at least about 50 mole % of the repeating unit of Formula XXXVII or Formula XXXVIII, including at least about 70 mole %, and at least 80 mole %.

Specific examples of repeating units of Formula XXXVII or Formula XXXVIII include repeating units derived from N-vinyl-N-methylacetamide, N-vinylacetamide, N-vinyl-N-methylpropionamide, N-vinyl-N-methyl-2-methylpropionamide, N-vinyl-2-methyl-propionamide, N-vinyl-N,N'-dimethylurea, N, N-dimethylacrylamide, methacrylamide and acyclic amides of structures (C) and (D):

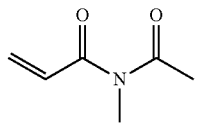

Formula XXXIX

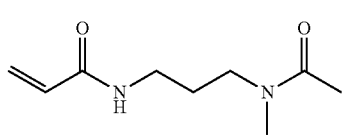

Formula XL

Examples of suitable cyclic amides that can be used to form the cyclic polyamides of include α-lactam, β-lactam, γ-lactam, δ-lactam, and ε-lactam. Examples of suitable cyclic polyamides include polymers and copolymers comprising repeating units of Formula XLI:

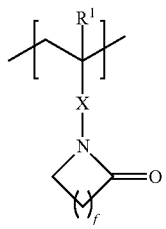

Formula XLI wherein f is a number from 1 to 10, X is a direct bond, —(CO)—, or —(CO)—NH—Re, wherein Re is a C1 to C3 alkyl group. In Formula XLI, f may be 8 or less, including 7, 6, 5, 4, 3, 2, or 1. In Formula E, f may be 6 or less, including 5, 4, 3, 2, or 1, or may be from 2 to 8, including 2, 3, 4, 5, 6, 7, or 8, or may be 2 or 3.

When X is a direct bond, f may be 2. In such instances, the cyclic polyamide may be polyvinylpyrrolidone (PVP).

The cyclic polyamides of the present invention may comprise 50 mole % or more of the repeating unit of Formula E, or the cyclic polyamides can comprise at least about 50 mole % of the repeating unit of Formula E, including at least about 70 mole %, and at least about 80 mole %.

Specific examples of repeating units of Formula XLI include repeating units derived from N-vinylpyrrolidone, which forms PVP homopolymers and vinylpyrrolidone copolymers or N-vinylpyrrolidone substituted with hydrophilic substituents such as phosphoryl choline.

The polyamides may also be copolymers comprising cyclic amide, acyclic amide repeating units or copolymers comprising both cyclic and acyclic amide repeating units. Additional repeating units may be formed from monomers selected from hydroxyalkyl(meth)acrylates, alkyl(meth)acrylates or other hydrophilic monomers and siloxane substituted acrylates or methacrylates. Any of the monomers listed as suitable hydrophilic monomers may be used as comonomers to form the additional repeating units. Specific examples of additional monomers which may be used to form polyamides include 2-hydroxyethylmethacrylate, vinyl acetate, acrylonitrile, hydroxypropyl methacrylate, 2-hydroxyethyl acrylate, methyl methacrylate and hydroxybutyl methacrylate, GMMA, PEGS, and the like and mixtures thereof. Ionic monomers may also be included. Examples of ionic monomers include acrylic acid, methacrylic acid, 2-methacryloyloxyethyl phosphorylcholine, 3-(dimethyl(4-vinylbenzyl)ammonio)propane-1-sulfonate (DMVBAPS), 3-((3-acrylamidopropyl)dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), methacryloyloxy)propyl)dimethylammonio)propane-1-sulfonate (MAPDAPS).

The reactive monomer mixture may comprise both an acyclic polyamide and a cyclic polyamide or copolymers thereof. The acyclic polyamide can be any of those acyclic polyamides described herein or copolymers thereof, and the cyclic polyamide can be any of those cyclic polyamides described herein or copolymers thereof. The polyamide may be selected from the group polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof.

The wetting agents may be made from DMA, NVP, HEMA, VMA, NVA, and combinations thereof. The wetting agents may also be reactive components, as defined herein, by having reactive groups, for example, made by the acylation reaction between pendant hydroxyl groups on HEMA repeating units of an internal wetting agent and methacryloyl chloride or methacryloyl anhydride. Other methods of functionalization will be apparent to one skilled in the art.

Such internal wetting agents are disclosed in U.S. Pat. No. 6,367,929, U.S. Pat. Nos. 6,822,016, 7,052,131, U.S. Pat. No. 7,666,921, U.S. Pat. No. 7,691,916, U.S. Pat. No. 7,786,185, U.S. Pat. No. 8,022,158, and U.S. Pat. No. 8,450,387.

The silicone hydrogels of the present invention may include toughening agents. As previously described, toughening agents are monomers whose corresponding homopolymers exhibit glass transition temperatures higher than 40° C. and when added to the reactive mixture improve the elongation of the resulting silicone hydrogels. Non-limiting examples of such monomers are methyl methacrylate, tert-butyl methacrylate, isobornyl methacrylate, cyclohexyl methacrylate, styrene, substituted styrenes, N-4-vinylbenzyl-N-alkyl acetamides, N-4-vinylbenzyl pyrrolidone, and combinations thereof.

The reaction mixture may contain additional reactive or non-reactive components such as but not limited to, UV absorbers, visible light absorbers, photochromic compounds, pharmaceuticals, nutraceuticals, antimicrobial substances, tints, pigments, copolymerizable and non-polymerizable dyes, release agents and combinations thereof.

Classes of suitable diluents for silicone hydrogel reaction mixtures include alcohols having 2 to 20 carbons, amides having 10 to 20 carbon atoms derived from primary amines, and carboxylic acids having 8 to 20 carbon atoms. Primary and tertiary alcohols may be used. Preferred classes include alcohols having 5 to 20 carbons and carboxylic acids having 10 to 20 carbon atoms.

Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy)-propylbis(trimethylsiloxy) methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino)ethanol mixtures thereof and the like.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like.

Aprotic solvents, including amide solvents, hydroxyl substituted, alkyl substituted on amide portion, including cyclic and acyclic amides, including N-methylpyrrolidone, N-ethylpyrrolidone, N, N-dimethyl propionamide, hydroxyethylpyrrolidone, and the like.

Mixtures of diluents may be used. The diluents may be used in amounts up to about 55% by weight of the total of all components in the reaction mixture. More preferably the diluent is used in amounts less than about 45% and more preferably in amounts between about 15 and about 40% by weight of the total of all components in the reaction mixture.

A polymerization initiator is preferably included in the reaction mixture used to form substrates such as contact lenses. Non-limiting initiators include compounds such as lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and diketones with tertiary amines, mixtures thereof, and the like.

Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N, N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitiators which may be used are disclosed in Volume III, Photoinitiators for Free Radical Cationic & Anionic Photopolymerization, 2nd Edition by J. V. Crivello & K. Dietliker; edited by G. Bradley; John Wiley and Sons; New York; 1998, which is incorporated herein by reference.

The initiator is used in the reaction mixture in effective amounts to initiate polymerization of the reaction mixture typically in amounts from about 0.1 to about 2 weight percent of the reactive mixture. Polymerization of the reaction mixture can be initiated using the appropriate choice of heat, visible light, ultraviolet irradiation, or other means depending on the polymerization initiator used. Alternatively, initiation can be conducted without a photoinitiator using e-beam, for example. However, when a photoinitiator is used, the preferred initiators are bisacylphosphine oxides, such as bis(2,4,6-trimethylbenzoyl)-phenyl phosphine oxide (Irgacure 819®) or a combination of 1-hydroxycyclohexyl phenyl ketone and bis(2,6-dimethoxybenzoyl)-2,4-4-trimethylpentyl phosphine oxide (DMBAPO), and the preferred method is visible light irradiation. The most preferred photoinitiator is bis(2,4,6-trimethylbenzoyl)-phenyl phosphine oxide (Irgacure 819®).

The reaction mixtures can be formed by any of the methods known to those skilled in the art, such as shaking or stirring, and then used to form polymeric articles or devices by known methods. For example, biomedical devices may be prepared by mixing reactive components and the diluents with a polymerization initiator and curing by appropriate conditions to form a product that can be subsequently formed into the appropriate shape by lathing, cutting and the like. Alternatively, the reaction mixture may be placed in a mold and subsequently cured into the appropriate article.

Second Hydrogel Reactive Mixture

The second hydrogel reactive mixture used in the peripheral zone may be formed from any known conventional or silicone hydrogel formulation. The second hydrogel reactive mixture, may be a silicone hydrogel reactive mixture, and may be a reactive mixture having similar components to those described for the first silicone hydrogel reactive mixture, described above.

The second reactive mixture may comprise the components described above for the first silicone hydrogel reactive mixture, but without N-alkyl methacrylamide monomer.

The second reactive mixture may comprise
a. between about 1 and about 15 wt % at least one acyclic polyimide;
b. at least one first mono-functional, hydroxyl substituted poly(disubstituted siloxane) having 4 to 8 siloxane repeating units;
c. at least one second hydroxyl substituted poly(disubstituted siloxane) selected from the group consisting of mono-functional hydroxyl substituted poly(disubstituted siloxane)s having 10 to 200 or 10-100 siloxane repeating units and multifunctional hydroxyl substituted poly(disubstituted siloxane)s having 10 to 200, or 10 to 100 siloxane repeating units, and mixtures thereof;
d. about 5 to about 30 wt % at least one additional hydrophilic monomer;
e. wherein the first hydroxyl substituted, linear poly(disubstituted siloxane) and the second mono-functional hydroxyl substituted, linear poly(disubstituted siloxane) are present in concentrations to provide a ratio of wt % of all first hydroxyl substituted, linear poly(disubstituted siloxane) to wt % of all one second hydroxyl substituted poly(disubstituted siloxane)s of 0.4-1.3, or 0.4-1.0.

The reactive monomer mixture also includes a mixture of hydroxyl-containing silicone components of different molecular weights or different compositions. The first hydroxyl-containing silicone component may be selected from hydroxyl-containing silicone monomers, and hydroxyl containing polydisubstituted siloxanes having at least 4 polydisubstituted siloxane repeating units or 4-8 polydisubstituted siloxane repeating units; and at least one monovalent reactive group. When the first hydroxyl-containing silicone component is a hydroxyl-containing silicone monomer, the second hydroxyl-containing silicone component may be selected from hydroxyl substituted poly(disubstituted siloxane) having 4 to 8 siloxane repeating units, monofunctional hydroxyl substituted poly(disubstituted siloxane)s having 10 to 200, 10-100 or 10-20 siloxane repeating units and multifunctional hydroxyl substituted poly(disubstituted siloxane)s having 10 to 200, or 10 to 100 siloxane repeating units, and mixtures thereof. When the first hydroxyl-containing silicone component is a hydroxyl-substituted poly(disubstituted siloxane) having 4 to 8 siloxane repeating units, the second hydroxyl-containing silicone component may be selected from monofunctional hydroxyl substituted poly(disubstituted siloxane)s having 10 to 200, 10-100 or 10-20 siloxane repeating units and multifunctional hydroxyl substituted poly(disubstituted siloxane)s having 10 to 200, or 10 to 100 siloxane repeating units, and mixtures thereof. The hydroxyl-containing silicone components may be any of those described above. When present, the hydroxyl-containing silicone components may be present in amounts between about 40-about 70, or about 45-about 70 wt %.

The hydrophilic components (including the charged components and the hydrophilic hydroxyl components, but excluding the acyclic polyamide) may be present in the second reactive mixture in amounts up to about 50 wt %, or in an amount in the range of about 10 to about 50 wt. %, or in the range of about 10 to about 40 wt. %, based on the total weight of the reactive components in the reactive monomer mixture.

The second hydrogel reactive mixture may contain cross-linking agents in amounts from about 0.000415 to about 0.0156 mole per 100 grams of reactive components in the reaction mixture.

The second hydrogel reactive mixture may comprise wetting agents, non-hydroxyl silicone-containing component, additional components and diluents, all as described above (including the amounts described above).

Micro-dosing technology may be utilized to fabricate or manufacture a contact lens 100 having an optic zone 102 with a higher Young's modulus than the surrounding lens. In a first step, a standard front curve for a given prescription is positioned to accept the reactive mixtures for forming a contact lens. The first silicone hydrogel reactive mixture is dosed into the center portion of the contact lens front curve mold. A second silicone hydrogel reactive mixture is dosed on top of the first silicone hydrogel reactive mixture. The first silicone hydrogel reactive mixture will generally have a higher viscosity that the second silicone hydrogel reactive mixture. This allows for miscible or partially miscible reactive mixtures to be used for the first and second silicone hydrogel reactive mixtures. The use of miscible, or partially miscible reactive mixtures is a benefit, as it provides a transition zone where mixing of the two reaction mixtures occurs. This provides a more gradual transition, which may lessen interfacial stress between the peripheral and optic zones of the cured contact lens.

The contact lens mold is closed by the deposition of the base curve mold. The closed mold is then positioned so that the reactive mixtures may be cured into a final contact lens with a central optic or optic zone having a Young's modulus as is set forth above.

Figure 2:
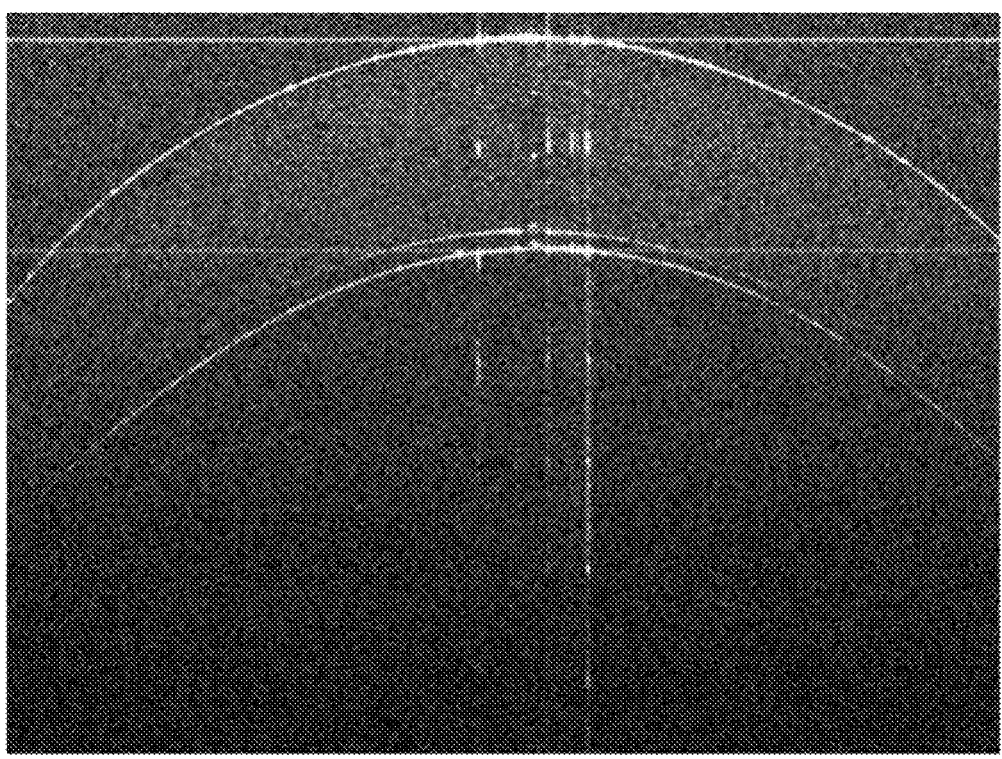
FIG. 2 is a planar view of a contact lens in accordance with the present invention.

Referring to FIGS. 2A and B, two methods of manufacturing contact lenses are schematically shown. In the first method shown in FIG. 2a, a front curve 11a is provided at step 10*a*. The front curve 11*a* is one part of the two part mold that is concave in shape so that the deposited material is held in the center of the mold by gravity. At step 12*a*, a small and precise dose of first silicone hydrogel reactive mixture mixture 13*a*, or is supplied or dosed on a surface of the front curve mold 11*a* preferably in a substantially central location and in substantially circular configuration.

The first silicone hydrogel reactive mixture may be dosed in a central circular area within the optic zone of the contact lens. The central circular area may be the same size as the optic zone, which in a typical contact lens is about 9 mm or less in diameter. In one embodiment, the central circular area has a diameter of between about 4 and about 7 mm and in another between about 4 and about 6 mm in diameter.

Optionally, the first silicone hydrogel reactive mixture may be at least partially polymerized through a controlled curing mechanism at step 12*a*. Then, a dose of second silicone hydrogel reactive mixture, is dosed on the top of the first silicone hydrogel reactive mixture 13*a* at step 14*a*. The dose of second silicone hydrogel reactive mixture 15*a* fills the concave front curve 11*a* to the desired amount and then, at step 16*a*, the base curve 17*a* is provided and the mold halves 11*a*, 17*a* are put into their final curing position and the monomer mixtures are cured and/or polymerized completing the molding process. Where the polymerization process includes a photo-polymerization mechanism, the radiation, may be directed to either the front curve mold half or the base curve mold half, or both. The molded lens is then extracted to remove the un-desired chemical components and hydrated.

An alternative method is shown in FIG. 2*b* in which the first dose of first silicone hydrogel reactive mixture 13*b* is provided in the center of a front curve mold 11*b* at step 12*b* and then an annular ring of second silicone hydrogel reactive mixture 15*b* is dosed at the edge of the front curve mold 11*b* at step 14*b*. The resultant annular ring of second silicone hydrogel reactive mixture 15*b* is drawn to the center of the front curve by gravity. The base curve mold 17*b* is then supplied and the curing is initiated and completed at step 16*b* and the extraction and hydration step(s) (not shown) proceed to form the final hydrogel contact lens product.

In order to provide a hydrogel contact lens with acceptable separation of the two regions (print quality) and low distortion, generally in terms of first silicone hydrogel reactive mixture 11 distribution, it has been found that, increasing the viscosities of the monomer mixtures 13, 15 and, specifically, increasing the viscosity of the first silicone hydrogel reactive mixture 13 as compared to the second silicone hydrogel reactive mixture 15, reduces molecular diffusion of the monomers 13, 15 thereby maintaining the first silicone hydrogel reactive mixture in the central region. Using a first silicone hydrogel reactive mixture that has higher viscosity than the second silicone hydrogel reactive mixture helps to reduce the shear at the interface of the two monomers mixtures thereby reducing the physical mixing. An analysis of the Stokes-Einstein equation, shown below, illustrates the parameters that affect the diffusivity of a material:

$$D = \frac{kT}{6\pi\mu r}$$

where D is the molecular diffusivity, k the Boltzmann constant, T the temperature, $\mu$ the viscosity and r the radius of the molecule. Operating at lower temperatures and using monomers of higher viscosities tends to reduce the molecular diffusion rate. In one embodiment the viscosity of the first silicone hydrogel reactive mixture is at least about 1000 cp higher than the viscosity of the second silicone hydrogel reactive mixture and in another embodiment at least about 1500 cp higher.

The process of the present invention may also comprise coating the lens molds with the second silicone hydrogel material prior to dosing the first silicone hydrogel material. Alternatively, a third material may be applied as a mold transfer coating. The coating may be partially or fully cured prior to dosing the first silicone hydrogel reactive mixture, or the coated molds may be heated to remove the solvent from the coating composition.

Existing silicone hydrogel formulations having the Young's modulus and water contents disclosed above may be used for the second silicone hydrogel reactive mixtures. Examples of commercialized silicone hydrogel formulations includes galyficon, senofilcon, narafilcon, lotrafilcon, balafilcon, comfilcon, samfilcon, acquafilcon, stenfilcon, enfilcon, formofilcon.

The more rigid or stiffer optical zone 102 materials and the less stiff peripheral 104 lens material do not necessarily have a distinct transition, as there may be a blending of the two materials during assembly. This would mean that the stiffness of the lens 100 may change gradually outside the optic zone, as a function of position from the center of the contact lens. Furthermore, the stiff optic zone 102 material would be continuous from the front surface of the central optic to the back surface of the central optic of the contact lens. This is different from a hybrid contact lens which encapsulates a rigid lens insert, inside of a soft lens material shell and has a distinct transition from stiff optic zone to softer periphery. This is also different from a skirted rigid gas permeable contact lens (RGP), since the periphery of the contact lens is not molded onto a rigid central optic, but rather the two materials are molded together, creating one non-homogenous soft contact lens.

The first and second silicone hydrogel reactive mixtures are clear, compatible with each other have the indexes of refraction within 10% of each other. Existing processes for forming contact lenses may be easily modified to manufacture contact lenses in accordance with the present invention.

The second hydrogel reactive mixture is compatible with the partially cured first hydrogel reactive mixture. This is a benefit in minimizing stresses between the polymers in the hybrid lens. However, because the second RMM is compatible with the first, prior to curing it can intercalate into the fully or partially cured first RMM. Complete mixing of the fully or partially cured RMM may undesirably change the properties of first SH, including decreasing the modulus. According, it may be desirable to limit the time the second RMM is in contact with the first partially or fully cured RMM ("dwell time") prior to curing. Dwell time is less than about 5 minutes and preferably is less than about 1 minute. Dwell times may be decreased as temperatures increase.

Curing of the composite lenses of the present invention may be done sequentially, by fully or partially curing a center dose material, by curing a first lens and intercalating the central material and curing, or by voxel by voxel curing using reactive components having different reactive groups for the central and peripheral regions. Lens inserts could also be used for the central region, and any of the foregoing methods may be combined.

Viscosity differences in optic zone and periphery monomers may be used to maintain separation during the lens manufacturing process, such as in using a higher viscosity central monomer that does not flow outwards to the periphery when the lens mold is closed. Consideration must be made to the shrinkage and expansion rates of both materials in order to form an acceptable lens.

The cure light intensity may be varied across the contact lens, to further vary the stiffness realized in different regions. Accordingly, by selective curing, a stiffer optic zone relative to the peripheral zone may be achieved.

Referring to FIG. 1, two methods of manufacturing composite photochromic contact lenses are schematically shown. In the first method shown in FIG. 1a, a front curve 11a is provided at step 10a. The front curve 11a is one part of the two part mold that is concave in shape so that the deposited material is held in the center of the mold by gravity. At step 12a, a small and precise dose of a first monomer mixture 13a, comprising the N-alkyl methacrylamide, is supplied or dosed on a surface of the front curve mold 11a preferably in a substantially central location and in substantially circular configuration.

The central circular area may be the same size as the optic zone, which in a typical contact lens is about 9 mm or less in diameter. In one embodiment, the central circular area has a diameter of between about 4 and about 7 mm and in another between about 4 and about 6 mm in diameter.

Optionally, the first monomer mixture may be at least partially polymerized through a controlled curing mechanism at step 12a. Then, a dose of a second monomer mixture, which will form a hydrogel having a modulus of less than about 200 psi, or less than about 150 psi, 15a is dosed on the top of the first monomer mixture 13a at step 14a. The dose of the second monomer mixture 15a fills the concave front curve 11a to the desired amount and then, at step 16a, the base curve 17a is provided and the mold halves 11a, 17a are put into their final curing position and the monomer mixtures are cured and/or polymerized completing the molding process. Where the polymerization process includes a photo-polymerization mechanism, the radiation, may be directed to either the front curve mold half or the base curve mold half, or both. The molded lens is then extracted to remove the un-desired chemical components and hydrated.

Figure 1B:
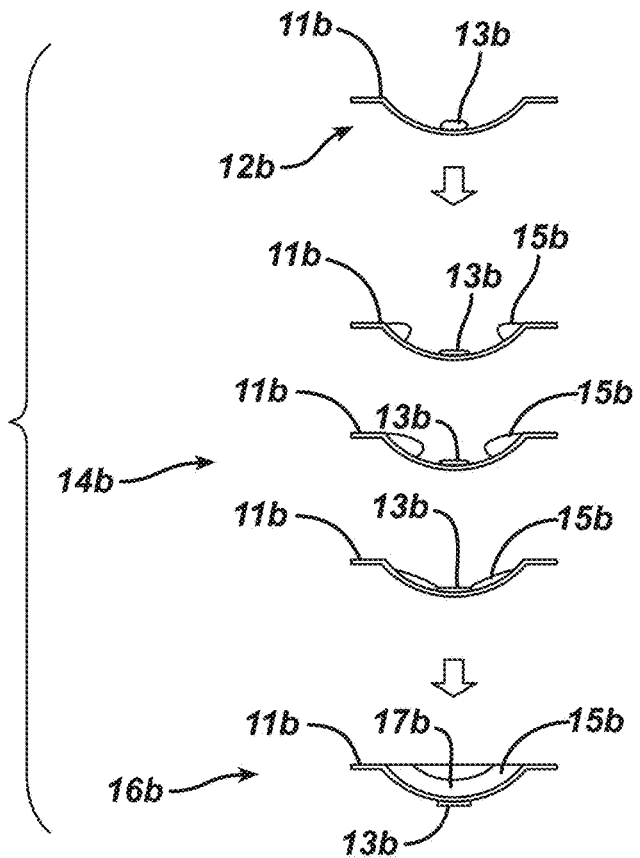

An alternative method is shown in FIG. 1b in which the first monomer mixture 13b is provided in the center of a front curve mold 11b at step 12b and then an annular ring of the second monomer mixture 15b is dosed at the edge of the front curve mold 11b at step 14b. The resultant annular ring of the second reactive mixture 15b is drawn to the center of the front curve by gravity. The base curve mold 17b is then supplied and the curing is initiated and completed at step 16b and the extraction and hydration step(s) (not shown) proceed to form the final hydrogel contact lens product.

It is desirable to prevent substantial mixing of the first and second monomer mixtures to preserve the desired moduli values in the central and peripheral zones. Increasing the viscosity of the first monomer mixture 13 as compared to the second, peripheral monomer mixture 15, can reduce molecular diffusion of the monomers 13, 15 when a cure (either partial or full) of the first monomer mixture in the central zone is not utilized. Using a first monomer mixture that has higher viscosity than the clear monomer mixture helps to reduce the shear at the interface of the two monomers mixtures thereby reducing the physical mixing. An analysis of the Stokes-Einstein equation, shown below, illustrates the parameters that affect the diffusivity of a material:

$$D = \frac{kT}{6\pi\mu r}$$

where D is the molecular diffusivity, k the Boltzmann constant, T the temperature, $\mu$ the viscosity and r the radius of the molecule. Operating at lower temperatures and using monomers of higher viscosities tends to reduce the molecular diffusion rate. In one embodiment the viscosity of the first monomer mixture is at least about 1000 cp higher than the viscosity of the peripheral monomer mixture and in another embodiment at least about 1500 cp higher.

However, controlling the viscosity of the monomer mixtures as disclosed in US2003/0142267 was insufficient to provide hydrogel contact lenses having suitable optics and comfort. It has been found that employing a partial or complete cure of the first monomer mixture and balancing the expansion factor of the polymers formed from the first and second monomer mixture hydrogel contact lenses having desirable optics and comfort may be produced. In one embodiment the expansion factors of the polymers formed from the respective monomer mixtures are within about 10% in some embodiments within about 8% and in other embodiments within about 5%. The expansion factor may be adjusted by manipulating a number of formulation variables including the diluent concentration, the concentration and hydrophilicity or hydrophobicity of hydrophilic and hydrophobic components and concentration of initiator and crosslinker, and combinations thereof. It may be desirable to maintain the concentration of the silicone components and replace a part of one of hydrophilic components. In these embodiments, multiple adjustments may be needed to achieve the desired expansion factor.

In addition, other formulation variables may be modified to achieve the desired expansion factor. For example, varying the concentration of the hydrophilic components, the diluent concentration and the initiator concentration, and combinations thereof have been effective at providing photochromic contact lenses having desirable optics and comfort. In one embodiment a hydrophilic polymer, such as poly(vinyl pyrrolidone) (PVP), methacrylic acid, polydimethylacrylamide or poly(vinyl methacetamide) may be added to the monomer mixtures.

The same or similar components may be used in both the first and second monomer mixtures. For example, it may be desirable to include the same hydrophilic components in both monomer mixtures. In this case, formulation variables in addition to the concentration of hydrophilic components may be varied.

When a single sided cure is used the expansion factor may be matched using monomers, diluent concentration and combinations thereof. Where cure is effected from only one side (such as during photocuring), increasing the initiator concentration may also be desirable.

In addition to using the bi-material contact lens with differences in Young's modulus in the center and periphery, pre-tensioning of the lens may also create additional resistance to deformation when placed on-eye. A pre-tensioned lens will require more force to deform as the internal tension must be overcome along with the elastic force from the modulus, lens shape, and lens thickness. Methods of manufacturing pre-tensioned lenses include varying the reaction rate, such as by introducing different levels of oxygen or another reaction inhibitor, to the front and back surfaces of the lens molds. The result is a lens that, intact maintains a "dome" shape, but if cross-sectioned will tend to curl or flatten. In addition to exposing the entire front and back mold surfaces to different oxygen levels, the concentration of oxygen or another inhibitor may be varied across both front and back surfaces, creating a custom tension or stress profile through the lens.

The basic premise behind this pre-tensioning process is that different plastic mold materials absorb oxygen or other reaction inhibitors at different rates and retain the oxygen or other reaction inhibitors with different affinities. By utilizing different materials to form the front and back curve molds or selectively exposing the front and/or back curve molds to oxygen or other reaction inhibitors, the reaction rate may be changed thereby inducing stresses in the contact lens. For example, polypropylene readily absorbs oxygen while zeonor and polystyrene absorb significantly less. Accordingly, by utilizing polystyrene for the front curve mold and polypropylene for the back curve mold, with equal access to oxygen, the back curve mold will absorb more oxygen than the front curve mold and thus the monomer in contact with this surface will have different properties, creating a differential stress between the front and back surfaces of the contact lens. The concentration of the oxygen or other reaction inhibitors may be further manipulated by controlling at least one of, all of, or any combination of time, temperature, concentration and pressure of the medium (environment) surrounding the front and back curve mold surfaces. In addition, concentration of absorbed oxygen or other reaction inhibitors may be varied across the surface, such as by masking the part prior to exposure or selectively removing absorbed gases.

Providing that the corneal astigmatism is effectively reduced per this design with a rotationally symmetric optic due to the increased stiffness of the soft contact lens by means of the increased Young's modulus in the central optic or optic zone or by any other suitable means such as varying cure light intensity and pre-tensioning of the contact lens as described in detail herein, the contact lens would not require any specific on eye orientation and therefore less or no mechanical stabilization for the contact lens. If corneal astigmatism and/or high order aberrations are reduced, but not made negligible, mechanical stabilization may still be required, but variations in lens position will have a smaller impact on visual quality. As set forth above, an advantage of the present invention is that the stabilization features may be reduced in size or substantially eliminated, thereby providing a more comfortable contact lens. The present invention offers a simple and elegant solution for the correction of astigmatism.

Test Methods

Standard deviations are shown in parentheses. It will be appreciated that all of the tests specified herein have a certain amount of inherent error. Accordingly, the results reported herein are not to be taken as absolute numbers, but numerical ranges based upon the precision of the particular test. The water content was measured as follows: lenses to be tested were allowed to sit in packing solution for 24 hours. Each of three test lens were removed from packing solution using a sponge tipped swab and placed on blotting wipes which have been dampened with packing solution. Both sides of the lens were contacted with the wipe. Using tweezers, the test lens were placed in a weighing pan (that was preweighed) and the weight of the wet lenses was obtained. Two more sets of samples were prepared and weighed as above.

The dry weight was measured by placing the sample pans in a vacuum oven which has been preheated to 60° C. for 30 minutes. Vacuum was applied until at least 0.4 inches Hg is attained. The vacuum valve and pump were turned off and the lenses were dried for a minimum of twelve hours. The purge valve was opened and the oven was allowed reach atmospheric pressure. The pans were removed and weighed. The water content was calculated as follows:

Wet weight= combined wet weight of pan and lenses − weight of weighing pan

Dry weight= combined dry weight of pan and lens − weight of weighing pan $$\% \text{ water content} = \frac{(\text{wet weight} - \text{dry weight})}{\text{wet weight}} \times 100$$

The average and standard deviation of the water content are calculated for the samples are reported.

Haze was measured by placing a hydrated test lens in borate buffered saline in a clear glass cell at ambient temperature above a flat black background, illuminating from below with a fiber optic lamp (Dolan-Jenner PL-900 fiber optic light with 0.5" diameter light guide) at an angle 66° normal to the lens cell, and capturing an image of the lens from above, normal to the lens cell with a video camera (DVC 1300C:19130 RGB camera or equivalent equipped with a suitable zoom camera lens) placed 14 mm above the lens holder. The background scatter is subtracted from the scatter of the test lens by subtracting an image of a blank cell with borate buffered saline (baseline) using EPIX XCAP V 3.8 software. The value for high end scatter (frosted glass) is obtained by adjusting the light intensity to be between 900 to 910 mean grayscale. The value of the background scatter (BS) is measured using a saline filled glass cell. The subtracted scattered light image is quantitatively analyzed, by integrating over the central 10 mm of the lens, a frosted glass standard as a high-end scattering standard. The light intensity/power setting was adjusted to achieve a mean grayscale value in the range of 900-910 for the frosted glass standard; at this setting, the baseline mean grayscale value was in the range of 50-70. The mean grayscale values of the baseline and frosted glass standard are recorded and used to create a scale from zero to 100, respectively. Then, the mean grayscale values and standard deviations were measured for the test lenses and compared a frosted glass standard. The light intensity/power setting was adjusted to achieve a mean grayscale value in the range of 900-910 for the frosted glass standard; at this setting, the baseline mean grayscale value was in the range of 50-70. The mean grayscale values of the baseline and frosted glass standard are recorded and used to create a scale from zero to 100, respectively. In the grayscale analysis, the mean and standard deviations of the baseline, frosted glass, and every test lens was recorded. For each lens, a scaled value was calculated according to the equation: scaled value equals the mean grayscale value (lens minus baseline) divided by the mean grayscale value (frosted glass minus baseline) times by 100. Three to five test lenses are analyzed, and the results are averaged.

Water content was measured gravimetrically. Lenses were equilibrated in packing solution for 24 hours. Each of three test lens are removed from packing solution using a sponge tipped swab and placed on blotting wipes which have been dampened with packing solution. Both sides of the lens are contacted with the wipe. Using tweezers, the test lens are placed in a tared weighing pan and weighed. The two more sets of samples are prepared and weighed. All weight measurements were done in triplicate, and the average of those values used in the calculations. The wet weight is defined as the combined weight of the pan and wet lenses minus the weight of the weighing pan alone.

The dry weight was measured by placing the sample pans in a vacuum oven which has been preheated to 60° C. for 30 minutes. Vacuum was applied until the pressure reaches at least 1 inch of Hg is attained; lower pressures are allowed. The vacuum valve and pump are turned off and the lenses are dried for at least 12 hours; typically overnight. The purge valve is opened allowing dry air or dry nitrogen gas to enter. The oven is allowed reach atmospheric pressure. The pans are removed and weighed. The dry weight is defined as the combined weight of the pan and dry lenses minus the weight of the weighing pan alone. The water content of the test lens was calculated as follows:

$$\% \text{ water content} = \frac{(\text{wet weight} - \text{dry weight})}{\text{wet weight}} \times 100$$

The average and standard deviation of the water content were calculated and the average value reported as the percent water content of the test lens.

The refractive index (RI) of a contact lens was measured by a Leica ARIAS 500 Abbe refractometer in manual mode or by a Reichert ARIAS 500 Abbe refractometer in automatic mode with a prism gap distance of 100 microns. The instrument was calibrated using deionized water at 20° C. (+/−0.2° C.). The prism assembly was opened and the test lens placed on the lower prism between the magnetic dots closest to the light source. If the prism is dry, a few drops of saline were applied to the bottom prism. The front curve of the lens was against the bottom prism. The prism assembly was then closed. After adjusting the controls so that the shadow line appeared in the reticle field, the refractive index was measured. The RI measurement was made on five test lenses. The average RI calculated from the five measurements was recorded as the refractive index as well as its standard deviation.

Oxygen permeability (Dk) was determined by the polarographic method generally described in ISO 9913-1:1996 and ISO 18369-4:2006, but with the following modifications. The measurement was conducted at an environment containing 2.1% oxygen created by equipping the test chamber with nitrogen and air inputs set at the appropriate ratio, for example, 1800 mL/min of nitrogen and 200 mL/min of air. The t/Dk is calculated using the adjusted oxygen concentration. Borate buffered saline was used. The dark current was measured by using a pure humidified nitrogen environment instead of applying MMA lenses. The lenses were not blotted before measuring. Four lenses were stacked instead of using lenses of various thickness (t) measured in centimeters. A curved sensor was used in place of a flat sensor; radius was 7.8 mm. The calculations for a 7.8 mm radius sensor and 10% (v/v) air flow are as follows:

$Dk/t = (\text{measured current} - \text{dark current}) \times (2.97 \times 10^{-8}$
mL $O_2/(\mu A\text{-sec-cm}^2\text{-mm Hg})$ The edge correction was related to the Dk of the material. For all Dk values less than 90 barrers:

$t/Dk(\text{edge corrected}) = [1 + (5.88 \times t)] \times (t/Dk)$

For Dk values between 90 and 300 barrers:

$t/Dk(\text{edge corrected}) = [1 + (3.56 \times t)] \times (t/Dk)$

For Dk values greater than 300 barrers:

$t/Dk(\text{edge corrected}) = [1 + (3.16 \times t)] \times (t/Dk)$

Non-edge corrected Dk was calculated from the reciprocal of the slope obtained from the linear regression analysis of the data wherein the x variable was the center thickness in centimeters and the y variable was the t/Dk value. On the other hand, edge corrected Dk was calculated from the reciprocal of the slope obtained from the linear regression analysis of the data wherein the x variable was the center thickness in centimeters and the y variable was the edge corrected t/Dk value. The resulting Dk value was reported in barrers.

Wettability of lenses was determined using the methods below. Dynamic contact angle (DCA) was determined by a Wilhelmy plate method using a Cahn DCA-315 instrument at room temperature and using deionized water as the probe solution. The experiment was performed by dipping the lens specimen of known parameter into the packing solution of known surface tension while measuring the force exerted on the sample due to wetting by a sensitive balance. The advancing contact angle of the packing solution on the lens is determined from the force data collected during sample dipping. The receding contact angle is likewise determined from force data while withdrawing the sample from the liquid. The Wilhelmy plate method is based on the following formula: Fg=∟∟cos∟∟∟∟∟, wherein F=the wetting force between the liquid and the lens (mg), g=gravitational acceleration (980.665 cm/sec$^2$), ∟=surface tension of probe liquid (dyne/cm), ∟=the perimeter of the contact lens at the liquid/lens meniscus (cm), ∟=the dynamic contact angle (degree), and B=buoyancy (mg). B is zero at the zero depth of immersion. Four test strips were cut from the central area of the contact lens. Each strip was approximately 5 mm in width and equilibrated in packing solution. Then, each sample was cycled four times, and the results were averaged to obtain the advancing and receding contact angles of the lens.

Wettability of lenses was also determined using a sessile drop technique measured using KRUSS DSA-100 TM instrument at room temperature and using DI water as probe solution. The lenses to be tested (3-5/sample) were rinsed in DI water to remove carry over from packing solution. Each test lens was placed on blotting lint free wipes which were dampened with packing solution. Both sides of the lens were contacted with the wipe to remove surface water without drying the lens. To ensure proper flattening, lenses were placed "bowl side down" on the convex surface of contact lens plastic molds. The plastic mold and the lens were placed in the sessile drop instrument holder, ensuring proper central syringe alignment. A 3 to 4 microliter drop of deionized water was formed on the syringe tip using DSA 100-Drop Shape Analysis software ensuring the liquid drop was hanging away from the lens. The drop was released smoothly on the lens surface by moving the needle down. The needle was withdrawn away immediately after dispensing the drop. The liquid drop was allowed to equilibrate on the lens for 5 to 10 seconds, and the contact angle was measured between the drop image and the lens surface.

The mechanical properties of the contact lenses were measured by using a tensile testing machine such as an Instron model 1122 or 5542 equipped with a load cell and pneumatic grip controls. Minus one diopter lens is the preferred lens geometry because of its central uniform thickness profile. A dog-bone shaped sample cut from a −1.00 power lens having a 0.522 inch length, 0.276 inch "ear" width and 0.213 inch "neck" width was loaded into the grips and elongated at a constant rate of strain of 2 inches per minute until it breaks. The center thickness of the dog-bone sample was measured using an electronic thickness gauge prior to testing. The initial gauge length of the sample (Lo) and sample length at break (Lf) were measured. At least five specimens of each composition were measured, and the average values were used to calculate the percent elongation to break: percent elongation=[(Lf−Lo)/Lo]×100. The tensile modulus was calculated as the slope of the initial linear portion of the stress-strain curve; the units of modulus are pounds per square inch or psi. The tensile strength was calculated from the peak load and the original cross-sectional area: tensile strength=peak load divided by the original cross-sectional area; the units of tensile strength are psi. Toughness was calculated from the energy to break and the original volume of the sample: toughness=energy to break divided by the original sample volume; the units of toughness are in-lbs/in$^3$.

Samples cast as flats were also measured by Instron testing; however, the test articles were prepared from flat circular plastic molds (diameter about 15 mm) similar to the molds used to make contact lenses but without curvature to produce flat round disks. The molds were designed to make disks with center thicknesses between 250 and 550 microns, depending on the volume of reactive monomer mixture dosed. The disks were cut to the desired sample size (width: 3.1 mm; length: about 7 mm). The crosshead of a constant rate-of-movement type-testing machine was equipped with a 100 Newton load cell and pneumatic action grips (250 Newton maximum) with diamond serrated jaw faces. The specimen was loaded into the grips and then elongated at 1 inch per minute until it breaks. The tensile properties are obtained from the resulting stress-strain curve. Additionally, for all mechanical testing experiments, samples were stored in packing solution until immediately before the analysis to minimize the effects of dehydration.

Center thickness; was individually measured using an electronic thickness gauge.

The following abbreviations will be used throughout the Examples

BC: back curve plastic mold
FC: front curve plastic mold
NVP: N-vinylpyrrolidone (Acros Chemical)
DMA: N,N-dimethylacrylamide (Jarchem)
HEMA: 2-hydroxyethyl methacrylate (Bimax)
NMMA: N-methyl methacrylamide
VMA: N-vinyl N-methyl acetamide (Aldrich)
Blue HEMA: 1-amino-4-[3-(4-(2-methacryloyloxy-ethoxy)-6-chlorotriazin-2-ylamino)-4-sulfophenylamino]anthraquinone-2-sulfonic acid, as described in Example 4 of U.S. Pat. No. 5,944,853
Styryl-TRIS: tris(trimethylsiloxy)silyl styrene
pVMA: poly(N-vinyl N-methyl acetamide)
PVP: poly(N-vinylpyrrolidone) K90 (ISP Ashland)
EGDMA: ethylene glycol dimethacrylate (Esstech)
TEGDMA: triethylene glycol dimethacrylate (Esstech)
TMPTMA: trimethylolpropane trimethacrylate (Esstech)
BMPP: 2,2-bis(4-methacryloxyphenyl)-propane (PolySciences)
BAPP: 2,2-bis[4-(2-acryloxyethoxy)phenyl]propane (PolySciences)
BHMPP: 2,2-bis[4-(2-hydroxy-3-methacryloxypropoxy)phenyl]propane (PolySciences)
Tegomer V-Si 2250: diacryloxypolydimethylsiloxane, having 20 average dimethylsiloxy repeating units (Evonik)
D3O: 3,7-dimethyl-3-octanol (Vigon)
Irgacure 819: bis(2,4,6-trimethylbenzoyl)-phenylphosphineoxide
Irgacure 1870: blend of bis(2,6-dimethoxybenzoyl)-2,4,4-trimethyl-pentylphosphineoxide and 1-hydroxy-cyclohexyl-phenyl-ketone
mPDMS: monomethacryloxypropyl terminated mono-n-butyl terminated polydimethylsiloxane, (800-1000 MW) (Gelest)
HO-mPDMS: mono-(2-hydroxy-3-methacryloxypropyl)-propyl ether terminated mono-n-butyl terminated polydimethylsiloxane (400-1000 MW) (DSM)
SiMAA: 2-methyl-2-hydroxy-3-[3-[1,3,3,3-tetramethyl-1-[(trimethylsilyl)oxy]disiloxanyl]propoxy]propyl ester (Toray)
SA2: N-(2,3-dihydroxylpropyl)N-(3-tetra(dimethylsiloxy) dimethylbutylsilane)propyl) acrylamide
TAM: t-amyl alcohol (BASF)
3E3P: 3-ethyl 3-pentanol
DI water: deionized water
IPA: isopropyl alcohol
Norbloc: 2-(2"-hydroxy-5-methacrylyloxyethylphenyl)-2H-benzotriazole (Janssen)
PP: polypropylene
Zeonor: polycycloolefin thermoplastic polymer (Nippon Zeon Co Ltd)
Borate Buffer: a solution prepared by dissolving 8.3 gm NaCl (from Sigma Aldrich), 9.1 gm boric acid (from Mallinckrodt) and 1 gm sodium borate (from Mallinckrodt) in 1 L deionized water (from Milli Q).

EXAMPLES

Examples 1-10

Each reactive mixture was formed by mixing the reactive components listed in Table 1, filtering through a 3 μm filter using a heated or unheated stainless steel or glass syringe, and then degassed by applying vacuum at ambient temperature for about 15 minutes. In a glove box with a nitrogen gas atmosphere and less than 0.1 percent oxygen gas, 75-100 μL of the reactive mixture was then dosed at room temperature into the FC. The BC was then placed on the front curve mold. The molds were equilibrated for a minimum of twelve hours in the glove box prior to dosing. The tray was transferred into an adjacent glove box maintained at 60-65° C., and the lenses were cured from the top for 20 minutes using TLO3 fluorescent bulbs having intensity of 4-5 mW/cm$^2$. The light source was about six inches above the trays. A detailed description of the curing process and apparatus can be found in U.S. Pat. No. 8,937,110.

The lenses were manually de-molded with most lenses adhering to the FC and released by suspending the 64 lenses in about one liter of aqueous IPA solution for about one or two hours, followed by washing with another aqueous IPA solution, two times with DI, and finally two times with borate buffered packaging solution. The concentrations of the aqueous IPA solutions are listed in Table 1. Each washing step lasted about 30 minutes. The lenses were sterilized by autoclaving at 122° C. for 30 minutes. The physical and mechanical properties of the sterile lenses were measured and are listed in Table 2.

TABLE 1

| Component | Ex 1 | Ex 2 | Ex 3 | Ex 4 | Ex 5 | Ex 6 | Ex 7 | Ex 8 | Ex 9 | Ex 10 |
|---|---|---|---|---|---|---|---|---|---|---|
| OH-mPDMS n = 4 | 43.2 | 43 | 42.75 | 42.5 | 43.5 | 41.5 | 41.5 | 41.5 | 43.5 | 43.5 |
| NMMA | 15 | 15 | 15 | 15 | 15 | 15 | 15 | 15 | 15 | 15 |
| HEMA | 16.98 | 16.98 | 16.98 | 16.98 | 16.98 | 16.98 | 14.48 | 12 | 13.98 | 13.98 |
| pVMA (507 KDa) | 10 | 10 | 10 | 10 | 7 | 7 | 7 | 7 | 10 | 10 |
| Tegomer 2250 | 10.7 | 10.5 | 10.25 | 10 | 10 | 10 | 10 | 10 | 10 | 10 |
| EGDMA | 2.1 | 2.5 | 3 | 3.5 | 5.5 | 7.5 | 7.5 | 7.5 | 5.5 | 7.5 |
| Norbloc | 1.75 | 1.75 | 1.75 | 1.75 | 1.75 | 1.75 | 1.75 | 1.75 | 1.75 | 1.75 |
| TMPTMA | 0 | 0 | 0 | 0 | 0 | 0 | 2.5 | 4.98 | 0 | 0 |
| CGI 819 | 0.25 | 0.25 | 0.25 | 0.25 | 0.25 | 0.25 | 0.25 | 0.25 | 0.25 | 0.25 |
| Blue HEMA | 0.02 | 0.02 | 0.02 | 0.02 | 0.02 | 0.02 | 0.02 | 0.02 | 0.02 | 0.02 |
| Diluent | 23 | 23 | 23 | 23 | 23 | 23 | 23 | 23 | 23 | 23 |
| D3O | 100 | 100 | 100 | 100 | 100 | 100 | 100 | 100 | 100 | 100 |
| FC | Z | Z | Z | Z | 9:1 Z:TT | 9:1 Z:TT | 9:1 Z:TT | 9:1 Z:TT | 9:1 Z:TT | 9:1 Z:TT |
| BC | Z | Z | Z | Z | PP | PP | PP | PP | PP | PP |
| % IPA release | 40 | 40 | 40 | 40 | 40 | 40 | 40 | 40 | 40 | 40 |
| % IPA wash | 70 | 70 | 70 | 70 | 50 | 50 | 50 | 50 | 50 | 50 |

TABLE 2

| Ex# | % Water | % Haze | DCA (°) | $D_k$ | CT (μm) | Mechanicals Modulus (psi) | TS (psi) | Toughness | Elong (%) | RI |
|---|---|---|---|---|---|---|---|---|---|---|
| 1 | 28.6 | 7 | 34 | 96 | 121 | 1727 | 469 | 236 | 80 | 1.4435 |
| 2 | 27.8 | 8 | 32 | 102 | 125 | 1907 | 498 | 238 | 76 | 1.4459 |
| Ex. 2 flats | NM | NM | NM | NM | NM | 2287 | NM | NM | NM | NM |
| Ex. 3 | 27 | 4 | 44 | 93 | 122 | 2145 | 476 | 152 | 55 | 1.4467 |
| Ex. 3 Flats | NM | NM | NM | NM | 332 | 5038 | 279 | 14 | 11 | NM |
| 4 | 26.5 | 5 | 39 | 85 | 133 | 2415 | 441 | 103 | 46 | 1.4467 |
| 5 | 18.6 | 2 | 41 | 83 | NM | NM | NM | NM | NM | 1.454 |
| 6 | 17.5 | 4 | 39 | 96 | 187 | 3030 | 250 | 14 | 262 | 1.4605 |
| Ex. 6 Flats | NM | NM | NM | NM | NM | 7794 | NM | NM | NM | NM |
| 7 | 14.3 | 4 | 28 | 58 | NM | NM | NM | NM | NM | NM |
| 8 | 12.9 | 3 | 29 | 50 | 298 | 17399 | 292 | 2 | 5 | 1.468 |
| 9 | 21.2 | 4 | 55 | 111 | 555 | 4251 | 88 | 0.7 | 7.1 | NM |
| 10 | 19.2 | 4 | 41 | 93 | 547 | 6588 | 141 | 6.3 | 1.4 | NM |

Formulations of the present invention provide a wide range of moduli. By varying the concentration and type of cross-linker (such as including a short chain, higher functionality crosslinker, such as TMTPA), moduli up to about 20,000 psi can be achieved.

Examples 11-22

Each reactive mixture was formed by mixing the reactive components listed in Tables 3 and 4 and then degassed by applying vacuum at ambient temperature for about 20 minutes. In a glove box with a nitrogen gas atmosphere and less than 0.1 percent oxygen gas, about 100 μL of the reactive mixture was then dosed at room temperature into the FC made from made from the materials shown in Tables 3 and 4. The BC made from the materials shown in Tables 3 and 4 was then placed on the front curve mold. A quartz plate was placed on top of a tray of eight such mold assemblies to maintain proper fitting. The molds were equilibrated for a minimum of twelve hours in the glove box prior to dosing. The tray was transferred into an adjacent glove box maintained at 60-65° C., and the lenses were cured for 12 minutes from the top using TLO3 fluorescent bulbs having intensity of 4-5 mW/cm².

The lenses were manually de-molded with most lenses adhering to the BC and released using 40% IPA, followed by washing two times with 40% IPA for about 0.5 to 1 hour except as noted in the tables, two times with DI water for about 0.5 to 1 hour, and finally two times with borate buffered packaging solution for about 30 minutes. The lenses were sterilized by autoclaving at 122° C. for 30 minutes. The physical and mechanical properties of the sterile lenses were measured and are listed in Table 5.

TABLE 3

| Component | Ex11 | Ex12 | Ex13 | Ex14 | Ex15 | Ex16 | Ex17 | Ex18 |
|---|---|---|---|---|---|---|---|---|
| SiMAA | 42.8 | 21.4 | 21.4 | 0 | 0 | 0 | 0 | 0 |
| Styryl TRIS | 0 | 0 | 21.4 | 42.8 | 42.8 | 42.8 | 42.8 | 42.8 |

TABLE 3-continued

| Component | Ex11 | Ex12 | Ex13 | Ex14 | Ex15 | Ex16 | Ex17 | Ex18 |
|---|---|---|---|---|---|---|---|---|
| TRIS | 0 | 21.4 | 0 | 0 | 0 | 0 | 0 | 0 |
| NMMA | 15 | 15 | 15 | 15 | 15 | 15 | 15 | 18 |
| HEMA | 16.98 | 16.98 | 16.98 | 17 | 16.98 | 16.89 | 16.98 | 16.98 |
| pVMA (507 KDa) | 10 | 10 | 10 | 0 | 0 | 0 | 7 | 7 |
| pVMA (617 KDa) | 0 | 0 | 0 | 10 | 10 | 0 | 0 | 0 |
| pVMA (700 KDa) | 0 | 0 | 0 | 0 | 0 | 10 | 0 | 0 |
| Tegomer 2250 | 10.2 | 10.2 | 10.2 | 10.2 | 10.2 | 10.2 | 13.2 | 10.2 |
| EGDMA | 3 | 3 | 3 | 3 | 3 | 3 | 3 | 3 |
| Norbloc | 1.75 | 1.75 | 1.75 | 1.75 | 1.75 | 1.75 | 1.75 | 1.75 |
| TMPTMA | 0 | 0 | 0 | 0 | 0 | 0 | 2.5 | 4.98 |
| CGI 819 | 0.25 | 0.25 | 0.25 | 0.25 | 0 | 0 | 0.25 | 0.25 |
| CGI 1870 | 0 | 0 | 0 | 0 | 0.34 | 0.34 | 0 | 0 |
| Blue HEMA | 0.02 | 0.02 | 0.02 | 0 | 0.02 | 0.02 | 0.02 | 0.02 |
| FC | 9:1 Z:TT | 9:1 Z:TT | 9:1 Z:TT | 9:1 Z:TT | Z | 9:1 Z:TT | 9:1 Z:TT | 9:1 Z:TT |
| BC | PP | PP | PP | PP | 55:45 Z:PP | PP | PP | PP |
| % IPA Wash | 40 | 40 | 40 | 40 | 40 | 40 | None | None |
| Diluent | 23 | 23 | 23 | 23 | 23 | 23 | 23 | 23 |
| D30 | 100 | 100 | 100 | 100 | 100 | 100 | 100 | 100 |

TABLE 4

| Component | Ex 19 | Ex 20 | Ex 21 | Ex 22 |
|---|---|---|---|---|
| SiMAA | 21.4 | 0 | 0 | 0 |
| Styryl TRIS | 21.4 | 42.8 | 42.8 | 42.8 |
| NMMA | 15 | 15 | 12.5 | 10.5 |
| HEMA | 16.98 | 16.98 | 16.98 | 16.98 |
| DMA | 0 | 0 | 2 | 4 |
| pVMA (507 KDa) | 0 | 0 | 10 | 10 |
| PVP K90 | 10 | 10 | 0 | 0 |
| Tegomer 2250 | 10.2 | 10.2 | 10.2 | 10.2 |
| EGDMA | 3 | 3 | 3.5 | 3.5 |
| Norbloc | 1.75 | 1.75 | 1.75 | 1.75 |
| CGI 819 | 0.25 | 0.25 | 0.25 | 0.25 |
| Blue HEMA | 0.02 | 0.02 | 0.02 | 0.02 |
| FC Material | 9:1 Z:TT | 9:1 Z:TT | 9:1 Z:TT | 9:1 Z:TT |
| BC Material | PP | PP | PP | PP |
| % IPA Wash | 40 | 40 | 40 | 40 |
| Diluent | 23 | 23 | 23 | 23 |
| D3O | 100 | 100 | 100 | 100 |

Silicone hydrogels having moduli in excess of 60,000 psi but still displaying water contents of 15 to about 25% were produced. The silicone hydrogels displayed desirable haze, Dk and contact angles.

Examples 23-32

Each reactive mixture was formed by mixing the reactive components listed in Table 6 and then degassed by applying vacuum at ambient temperature for about 20 minutes. In a glove box with a nitrogen gas atmosphere and less than 0.1 percent oxygen gas, about 100 µL of the reactive mixture was then dosed at room temperature into the FC made from Zeonor. The BC made from 55:45 (w/w) blend of Zeonor: polypropylene was then placed on the front curve mold. The molds were equilibrated for a minimum of twelve hours in the glove box prior to dosing. The tray was transferred into an adjacent glove box maintained at 60-65° C., and the lenses were cured from the top for 20 minutes using 420 nm LED lights having intensity of 4-5 mW/cm$^2$.

TABLE 5

| Example # | % Water | % Haze | DCA (degree) | $D_k$ | CT (µm) | Modulus (psi) | TS (psi) | Toughness | Elong. (%) | RI |
|---|---|---|---|---|---|---|---|---|---|---|
| Ex 11 | 24.9 | 4.9 | 60.6 | NM | NM | NM | NM | NM | NM | NM |
| Ex 12 | 24 | 7 | 55.8 | NM | NM | NM | NM | NM | NM | NM |
| Ex 13 | 22.6 | 15.8 | 38.4 | NM | 399 | 32562 | NM | NM | 9.2 | NM |
| Ex 14 | 21.5 | 26 | 37 | NM | 405 | 41181 | 2147 | 106 | 10.7 | 1.467 |
| Ex 15 | 20 | 19 | 56.4 | 199 | 370 | 57251 | 2469 | 156 | 12 | NM |
| Ex 16 | 25 | 141 | 34 | NM | 186 | 37983 | 1445 | 47 | 10 | 1.4464 |
| Ex 17 | 16.2 | 55 | 42.9 | 83 | NM | NM | NM | NM | NM | NM |
| Ex 18 | 17.7 | 63 | 36.4 | NM | NM | NM | NM | NM | NM | NM |
| Ex 19 | 20.8 | 13 | 38 | NM | 297 | 32267 | 1331 | 60.2 | 8.5 | 1.464 |
| Ex 19 flats | NM | NM | NM | NM | 288 | 32267 | 1331 | 60.2 | 8.5 | NM |
| Ex 20 | 17.1 | 44 | 32.7 | NM | 276 | 61629 | 2521 | 98.6 | 8.5 | 1.472 |
| Ex. 20 flats | NM | NM | NM | NM | 292 | 53600 | 1989 | 56.3 | 8.5 | NM |
| Ex 21 | 20.3 | 20 | 35.3 | NM | 290 | 56333 | 2339 | 90.7 | 9 | 1.467 |
| Ex. 21 flats | NM | NM | NM | NM | 299 | 46901 | 1956 | 61.2 | 8.9 | NM |
| Ex 22 | 18.3 | 20 | 39 | NM | 286 | 53690 | 2145 | 79.1 | 8.8 | 1.467 |
| Ex. 22 flats | NM | NM | NM | NM | 289 | 42899 | 1589 | 40.8 | 8.6 | NM |

The lenses were manually de-molded with most lenses adhering to the BC and released using 40% IPA overnight, followed by washing with 40% IPA 0.5 to 1 hour, two times with DI water for about 0.5 to 1 hour, and finally two times with borate buffered packaging solution for about 30 minutes. The lenses were sterilized by autoclaving at 122° C. for 30 minutes. The physical and mechanical properties of the sterile lenses were measured and are listed in Table 7.

TABLE 6

| Component | Ex 23 | Ex 24 | Ex 25 | Ex 26 | Ex 27 | Ex 28 | Ex 29 | Ex 30 | Ex 31 | Ex 32 |
|---|---|---|---|---|---|---|---|---|---|---|
| Styryl TRIS | 42.8 | 42.8 | 42.8 | 42.8 | 42.8 | 42.8 | 42.8 | 42.8 | 42.8 | 42.8 |
| NMMA | 15 | 15 | 15 | 12 | 9 | 15 | 15 | 15 | 15 | 15 |
| HEMA | 16.64 | 13.64 | 10.64 | 10.64 | 16.64 | 10.64 | 10.64 | 10.64 | 10.64 | 10.64 |
| DMA | 3 | 6 | 9 | 12 | 9 | 9 | 9 | 9 | 9 | 9 |
| PVP K90 | 7 | 7 | 7 | 7 | 7 | 7 | 7 | 7 | 7 | 7 |
| Tegomer 2250 | 10.2 | 10.2 | 10.2 | 10.2 | 10.2 | 10.2 | 10.2 | 10.2 | 10.2 | 10.2 |
| EGDMA | 3 | 3 | 3 | 3 | 3 | 3 | 3 | 3 | 3 | 3 |
| Norbloc | 2 | 2 | 2 | 2 | 2 | 2 | 2 | 2 | 2 | 2 |
| CGI 1870 | 0.34 | 0.34 | 0.34 | 0.34 | 0.34 | 0.34 | 0.34 | 0.34 | 0.34 | 0.34 |
| Blue HEMA | 0.02 | 0.02 | 0.02 | 0 | 0.02 | 0.02 | 0.02 | 0.02 | 0.02 | 0.02 |
| Diluent | 23 | 23 | 23 | 23 | 23 | 20 | 25 | 30 | 35 | 40 |
| D3O | 100 | 100 | 100 | 100 | 100 | 100 | 100 | 100 | 100 | 100 |

TABLE 7

| | | | | | Mechanicals | | | | |
|---|---|---|---|---|---|---|---|---|---|
| Ex # | % Water | % Haze | Sessile Drop (°) | Dk | CT (µm) | Modulus (psi) | TS (psi) | Toughness | Elong. (%) | RI |
| Ex 23 | 16 | 71 | 44.9 | 83 | 187 | 60219 | 2212 | 63.5 | 9.1 | 1.4713 |
| Ex 24 | 17 | 83 | 64.4 | 93 | 177 | 58448 | 2173 | 61 | 9.6 | 1.4722 |
| Ex 25 | 23 | 90 | 46.6 | NM | 184 | 58232 | 1996 | 61 | 9.6 | 1.4720 |
| Ex 26 | 22 | 94 | 60.9 | 96 | 169 | 40827 | 1454 | 39.8 | 10 | 1.4685 |
| Ex 27 | 19 | 64 | 50.4 | 109 | 188 | 43687 | 1919 | 63.3 | 10.2 | 1.4701 |
| Ex 28 | 20 | 10 | 25.7 | NM | 207 | 27958 | 1087 | 37.8 | 9.8 | 1.4591 |
| Ex 29 | 20 | 14 | 25.2 | NM | 212 | 27514 | 1067 | 35.8 | 9.9 | 1.4609 |
| Ex 30 | 19 | 45 | 30.5 | NM | 215 | 25849 | 1004 | 31.7 | 9.1 | 1.4568 |
| Ex 31 | 21 | 52 | 29.8 | NM | 177 | 27993 | 1102 | 39.4 | 9.7 | 1.4512 |
| Ex 32 | 19 | 18 | 31.6 | NM | 170 | 30335 | 1064 | 34.7 | 12.3 | 1.4532 |

Each reactive mixture was formed by mixing the reactive components listed in Table 8 and then degassed by applying vacuum at ambient temperature for about 20 minutes. In a glove box with a nitrogen gas atmosphere and less than 0.1 percent oxygen gas, about 100 µL of the reactive mixture was then dosed at room temperature into the FC made from Zeonor. The BC made from 55:45 (w/w) blend of Zeonor:polypropylene was then placed on the front curve mold. A quartz plate was placed on top of a tray of eight such mold assemblies to maintain proper fitting. The molds were equilibrated for a minimum of twelve hours in the glove box prior to dosing. The tray was transferred into an adjacent glove box maintained at 60-65° C., and the lenses were cured from the bottom for 20 minutes using TL03 lights having intensity of 4-5 mW/cm$^2$.

The lenses were manually de-molded with most lenses adhering to the BC and released using 40% IPA overnight, and 50% IPA overnight, followed by washing two times with 40% IPA for about 0.5 to 1 hour, two times with DI water for about 0.5 to 1 hour, and finally two times with borate buffered packaging solution for about 30 minutes, and finally two times with borate buffered packaging solution for about 30 minutes. The lenses were sterilized by autoclaving at 122° C. for 30 minutes. The physical and mechanical properties of the sterile lenses of Examples 33-36 were measured and are listed in Table 9.

TABLE 8

| Component | Ex 33 | Ex 34 | Ex 35 | Ex 36 | Ex 37 |
|---|---|---|---|---|---|
| Styryl TRIS | 42.8 | 44.8 | 44.3 | 43.8 | 42.8 |
| NMMA | 15 | 15 | 15 | 15 | 15 |
| HEMA | 17 | 16.98 | 16.98 | 16.98 | 16.98 |
| pVMA (507 KDa) | 10 | 10 | 10 | 10 | 10 |
| Tegomer 2250 | 10.2 | 10.2 | 10.2 | 10.2 | 10.2 |
| EGDMA | 3 | 1 | 1.5 | 2 | 3 |
| Norbloc | 1.75 | 1.75 | 1.75 | 1.75 | 1.75 |
| CGI 819 | 0.25 | 0.25 | 0.25 | 0.25 | 0.25 |
| Blue HEMA | 0 | 0.02 | 0.02 | 0.02 | 0.02 |
| Diluent | 23 | 30 | 30 | 30 | 30 |
| 3E3P | 100 | 100 | 100 | 100 | 100 |

TABLE 9

| | | | | | Mechanicals | | | |
|---|---|---|---|---|---|---|---|---|
| Ex # | % Water | % Haze | Sessile Drop (°) | CT (µm) | Modulus (psi) | TS (psi) | Toughness | Elong. (%) |
| Ex 33 | 29 | 370 | 41.6 | 446 | 30106 | 1249 | 57.1 | 10.8 |
| Ex 34 | 29 | 230 | 38 | 452 | 32991 | 1517 | 53.8 | 10.5 |

TABLE 9-continued

| Ex # | % Water | % Haze | Sessile Drop (°) | CT (μm) | Modulus (psi) | TS (psi) | Toughness | Elong. (%) |
|---|---|---|---|---|---|---|---|---|
| Ex 35 | 26 | 101 | 34.7 | 461 | 30656 | 1333 | 40.3 | 8.6 |
| Ex 36 | 21 | 43 | 34.8 | 400 | 42900 | 1978 | 83.9 | 10.1 |

The silicone hydrogels of Examples 33-36 display moduli up to 43,000 psi, and water contents between about 20 and 30%.

Examples 38-53

Each reactive mixture was formed by mixing the reactive components listed in Tables 10 and 11 filtering through a 3 μm filter using a heated or unheated stainless steel or glass syringe, and then degassed by applying vacuum at ambient temperature for about 10-20 minutes. In a glove box with a nitrogen gas atmosphere and less than 0.1 percent oxygen gas, about 75-100 μL of the reactive mixture were dosed using an Eppendorf pipet at room temperature into the FC. The BC was then placed onto the FC. The molds were equilibrated for a minimum of twelve hours in the glove box prior to dosing; the mold materials are listed in Tables 10-11. Eight trays, each containing eight such mold assemblies, were placed on a mirrored metallic plate and quartz plates were placed on top of the trays to maintain proper fit and alignment. The plate was transferred into an adjacent glove box maintained at 60-65° C., and the lenses were cured from the top for 12 or 15 minutes as listed in Tables 15-17 using TL03 lights having intensity of 4-5 m W/cm².

The lenses were manually de-molded with most lenses adhering to the FC and released by suspending the 64 lenses in about one liter of aqueous IPA solution for about two or three hours, followed by washing two or three times with another aqueous IPA solution, two times with DI, and finally two times with borate buffered packaging solution. The lens release process of Example 39 included releasing in 40% IPA overnight then two IPA washing steps using 40% and 50% IPA prior to the DI and PS washing steps. The lens release process of Example 45 included two 70% IPA washes lasting 4-5 hours. The concentrations of the aqueous IPA solutions are listed in Tables 10-11. Each washing step lasted about 30 minutes. Lens release is typically performed in jars on a laboratory roller. The lenses were transferred into vials and subsequently sterilized by autoclaving at 122° C. for 30 minutes. The physical and mechanical properties of the sterile lenses were measured and listed in Tables 18 and 19. NM=not measured.

TABLE 15

| Component | Ex 38 | Ex 39 55 | Ex 40 | Ex 41 | Ex 42 | Ex 43 | Ex 44 | Ex 45 | Ex 46 | Ex 47 | Ex 48 | Ex 49 |
|---|---|---|---|---|---|---|---|---|---|---|---|---|
| OH-mPDMS n = 4 | 45 | 46.75 | 30 | 30 | 25 | 20 | 15 | 10 | 10 | 10 | 10 | 10 |
| OH-mPDMS n = 15 | 0 | 0 | 30 | 30 | 35 | 40 | 45 | 50 | 50 | 50 | 50 | 50 |
| DMA | 12.5 | 12.5 | 7 | 10 | 10 | 10 | 10 | 10 | 10 | 10 | 12.5 | 11.25 |
| HEMA | 16.98 | 16.98 | 11 | 11 | 10.98 | 10.98 | 10.98 | 10.98 | 12.66 | 12.66 | 13.48 | 12.23 |
| pVMA (507 KDa) | 10 | 10 | 10 | 7 | 7 | 7 | 7 | 7 | 0 | 0 | 7 | 7 |
| pVMA (549 KDa) | 0 | 0 | 0 | 0 | 0 | 0 | 0 | 0 | 7 | 0 | 0 | 0 |
| AVMA (700 KDa) | 0 | 0 | 0 | 0 | 0 | 0 | 0 | 0 | 0 | 7 | 0 | 0 |
| Tegomer 2250 | 10 | 10 | 10 | 10 | 10 | 10 | 10 | 10 | 10 | 10 | 5 | 7.5 |
| TEGDMA | 3.5 | 1.75 | 0 | 0 | 0 | 0 | 0 | 0 | 0 | 0 | 0 | 0 |
| Norbloc | 1.75 | 1.75 | 1.75 | 1.75 | 1.75 | 1.75 | 1.75 | 1.75 | 0 | 0 | 1.75 | 1.75 |
| CGI 819 | 0.25 | 0.25 | 0.25 | 0.25 | 0.25 | 0.25 | 0.25 | 0.25 | 0 | 0 | 0.25 | 0.25 |
| CGI 1870 | 0 | 0 | 0 | 0 | 0 | 0 | 0 | 0 | 0.34 | 0.34 | 0 | 0 |
| Blue HEMA | 0.02 | 0.02 | 0 | 0 | 0.02 | 0.02 | 0.02 | 0.02 | 0 | 0 | 0.02 | 0.02 |
| Cure Time (min) | 12 | 12 | 12 | 12 | 12 | 12 | 12 | 12 | 15 | 15 | 12 | 12 |
| FC Material | 9:1 Z:TT | 9:1 Z:TT | NM | NM | 9:1 Z:TT | 9:1 Z:TT | 9:1 Z:TT | 9:1 Z:TT | PP | Z | Z | Z |
| BC Material | PP | PP | NM | NM | PP | PP | PP | PP | 55:45 Z:PP | 55:45 Z:PP | 55:45 Z:PP | 55:45 Z:PP |
| % IPA Release | 70 | 40 | NM | NM | 40 | 40 | 40 | 40 | 70 | 40 | 40 | 40 |
| % IPA Wash | 70 | 40 | NM | NM | 40 | 40 | 40 | 40 | 70 | 40 | 40 | 40 |
| Diluent | 23 | 23 | 23 | 23 | 23 | 23 | 23 | 23 | 23 | 30 | 23 | 23 |
| D3O | 100 | 100 | 100 | 100 | 100 | 100 | 100 | 100 | 100 | 100 | 100 | 100 |

TABLE 16

| Component | Ex 50 | Ex 51 | Ex 52 | Ex 53 | Ex 54 | Ex 55 |
|---|---|---|---|---|---|---|
| OH-mPDMS n = 4 | 15 | 10 | 10 | 10 | 10 | 10 |
| OH-mPDMS n = 15 | 45 | 50 | 50 | 50 | 50 | 50 |
| DMA | 10 | 10 | 10 | 10 | 12 | 12 |
| HEMA | 10.98 | 10.98 | 12.73 | 15.73 | 15.73 | 15.73 |

TABLE 16-continued

| Component | Ex 50 | Ex 51 | Ex 52 | Ex 53 | Ex 54 | Ex 55 |
|---|---|---|---|---|---|---|
| PVP K90 | 10 | 10 | 7 | 7 | 5 | 7 |
| Tegomer 2250 | 7 | 7 | 10 | 7 | 7 | 5 |
| Norbloc | 1.75 | 1.75 | 0 | 0 | 0 | 0 |
| CGI 819 | 0.25 | 0.25 | 0.25 | 0.25 | 0.25 | 0.25 |
| Blue HEMA | 0.02 | 0.02 | 0.02 | 0.02 | 0.02 | 0.02 |
| Cure Time (min) | 12 | 12 | 15 | 15 | 15 | 15 |
| FC Material | Z | Z | Z | Z | Z | Z |
| BC Material | 55:45 Z:PP | 55:45 Z:PP | 55:45 Z:PP | 55:45 Z:PP | 55:45 Z:PP | 55:45 Z:PP |
| % IPA Release | 40 | 40 | 40 | 40 | 40 | 40 |
| % IPA Wash | 40 | 40 | 40 | 40 | 40 | 40 |
| Diluent | 23 | 23 | 23 | 23 | 23 | 23 |
| D3O | 100 | 100 | 100 | 100 | 100 | 100 |

TABLE 11

| | | | | | Mechanicals | | | | |
|---|---|---|---|---|---|---|---|---|---|
| Ex # | % Water | % Haze | DCA (°) | $D_k$ | CT (μm) | Modulus (psi) | TS (psi) | Toughness | Elong. (%) | RI |
| 38 | 29.1 | 5 | NM | 107 | 110 | 385 | 182 | 106 | 101 | 1.439 |
| 39 | 31.3 | 7 | NM | 110 | 111 | 297 | 148 | 104 | 120 | 1.435 |
| 40 | 25.5 | 10 | 55 | 110 | 120 | 220 | 144 | 134 | 158 | 1.429 |
| 41 | 25.2 | 6 | 94 | 78 | 101 | 180 | 135 | 133 | 166 | 1.430 |
| 42 | 24.5 | 5 | 69 | 96 | 95 | 218 | 115 | 88 | 124 | 1.427 |
| 43 | 23.8 | 4 | 92 | 145 | 97 | 182 | 125 | 104 | 150 | 1.427 |
| 44 | 23.1 | 3 | 61 | 125 | 102 | 219 | 150 | 108 | 135 | 1.428 |
| 45 | 24.2 | 5 | 70 | 135 | 103 | 178 | 129 | 116 | 158 | 1.425 |
| 46 | 32 | 18 | 46 | 225 | 124 | 118 | 110 | 154 | 247 | 1.415 |
| 47 | 27.7 | 12 | 53 | 170 | 122 | 145 | 86 | 66 | 126 | 1.420 |
| 48 | 31 | 17 | 47 | 139 | 101 | 155 | 126 | 140 | 201 | 1.420 |
| 49 | 31 | 17 | 48 | 262 | 129 | 139 | 123 | 129 | 189 | 1.419 |
| 50 | NM | 8 | 45 | 303 | 113 | 186 | 111 | 87 | 132 | 1.426 |
| 51 | NM | 9 | 41 | 208 | 113 | 175 | 118 | 132 | 186 | 1.425 |
| 52 | NM | 10 | 37 | NM | 114 | 147 | 118 | 136 | 191 | 1.425 |
| 53 | NM | 13 | 34 | NM | 119 | 141 | 106 | 139 | 222 | 1.420 |

Example 54

In a glove box with a nitrogen gas atmosphere and less than 0.1 percent oxygen gas, about 20 μL to about 35 μL of the degassed reactive mixture from Example 15 was dosed at 60-65° C. into the FC made from a 55:45 (w/w) blend of Zeonor:polypropylene. The actual volume was used to control the optical zone. The FC was then irradiated for 2 minutes under 420 nm LED lights having an intensity of 4-5 mW/cm² producing a partially cured gel. Thereafter, about 125 μL of the degassed reactive mixture of Table was dosed into the FC on top of the aforementioned partially cured gel. A BC made from Zeonor was placed on the front curve mold. A quartz plate was placed on top of a tray of eight such mold assemblies to maintain proper fitting. The molds were equilibrated for a minimum of twelve hours in the glove box prior to dosing. The lenses were cured from the bottom for 18 minutes using 420 nm LED lights having intensity of 4-5 mW/cm².

The lenses were solvent released from the molds by the following method which prevented any damage to the lenses because of the differences in the two formulations: (1) suspended in 20% IPA overnight, 20% IPA for one hour, 30% IPA for 2-4 hours, 40% IPA overnight, 30% IPA for 2-4 hours, 20% IPA overnight, and finally DI water overnight. The lenses were sterilized by autoclaving at 122° C. for 30 minutes.

The properties for the hydrogel used in the peripheral and central zones are listed in Table 12, below. The resulting contact lens was evaluated for astigmatic masking using an in vitro test method in which the contact lens is fitted on an eye model and optical coherence tomography (OCT) was used to generate an image of the contact lens on the model eye. In FIG. 1, an OCT image demonstrating that the contact lens prepared in Example 49 was able to vault over the corneal region of the eye model thereby providing a gap filled with artificial tear fluid that from an optics point of view masks any astigmatism on the cornea.

TABLE 11

| Component | peripheral reactive mixture |
|---|---|
| OH-mPDMS n = 4 | 10 |
| OH-mPDMS n = 15 | 50 |

TABLE 11-continued

| Component | peripheral reactive mixture |
|---|---|
| DMA | 10 |
| HEMA | 10.98 |
| pVMA (507 KDa) | 7 |
| Tegomer 2250 | 10 |
| Norbloc | 1.75 |
| CGI 819 | 0.25 |
| Blue HEMA | 0.02 |
| Diluent | 23 |
| D3O | 100 |

TABLE 12

| | | | | Mechanical Properties | | | |
|---|---|---|---|---|---|---|---|
| zone | Sessile drop | % water | % haze | Mod (psi) | Elong (%) | TS (psi) | Toughness |
| Central | 37 (8) | 22 (0) | 26 (2) | 41181 (2385) | 11 (1) | 2148 (149) | 106 (26) |
| Periph. | 65 (6) | 24 (0) | 5 (0) | 178 (12) | 158 (42) | 129 (29) | 116 (53) |

TABLE 12-continued

| zone | Sessile drop | % water | % haze | Mechanical Properties | | | |
| --- | --- | --- | --- | --- | --- | --- | --- |
| | | | | Mod (psi) | Elong (%) | TS (psi) | Toughness |
| Central | 37 (8) | 22 (0) | 26 (2) | 41181 (2385) | 11 (1) | 2148 (149) | 106 (26) |
| Periph. | 65 (6) | 24 (0) | 5 (0) | 178 (12) | 158 (42) | 129 (29) | 116 (53) |

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. An ophthalmic device comprising:
a contact lens having a central optic zone and a peripheral zone surrounding the central optic zone, the peripheral zone being formed from a second material having a second Young's modulus; and
a first material incorporated into the central optic zone of the contact lens, the first material having a first Young's modulus of at least about 1000 psi and a water content of at least about 10%, formed from a first reactive mixture comprising at least one N-alkyl methacrylamide and at least one silicone-containing component.

2. The ophthalmic device of claim 1 wherein said first material further comprising a water content of about 20 to about 40%.

3. The ophthalmic device of claim 1 or 2 wherein said first reactive mixture further comprises at least one photoinitiator.

4. The ophthalmic device of claim 1 wherein said silicone hydrogel is cured via exposure to light, or visible light.

5. The ophthalmic device of any of the foregoing claims wherein said silicone containing component comprises at least one silicone chain having 3-30 siloxane repeating units.

6. The ophthalmic device of claim 5 wherein said at least one silicone chain is a polydialkyl siloxane chain.

7. The ophthalmic device of claim 5 wherein said at least one silicone chain is a polydimethyl siloxane chain.

8. The silicone hydrogel of claim 5 wherein said at least one silicone chain is a polydiaryl siloxane chain.

9. The ophthalmic device of any of the foregoing claims wherein said first reactive mixture comprises about 20 to about 60 wt % of said silicone containing component, based upon all reactive components.

10. The ophthalmic device of any of the foregoing claims wherein said first reactive mixture comprises about 5 wt % to about 50 wt % of at least one N-alkyl methacrylamide, based upon all reactive components.

11. The ophthalmic device of any of the foregoing claims wherein the second material is formed from a reaction mixture containing a silicone-containing component, said silicone-containing component is selected from compounds of Formulae IIIa through IVc, and combinations thereof:

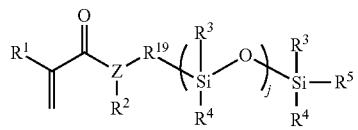

Formula IIIa

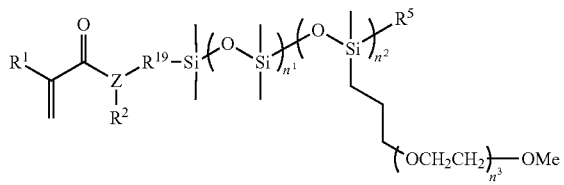

Formula IIIb

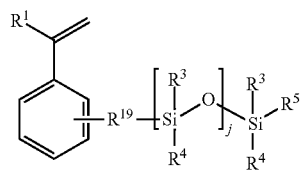

Formula IVa

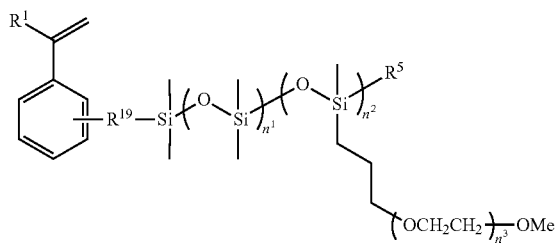

Formula IVb

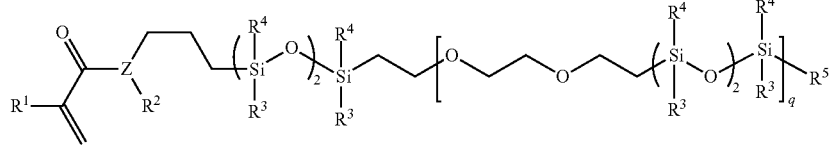

Formula IVc wherein $R^1$ is a hydrogen atom or methyl;

Z is selected from O, N, S or $NR_1CH_2CH_2O$; when Z=O or S, $R^2$ is not required;

wherein j is a whole number between 1 and 20;

wherein $R^{19}$ is
a substituted or unsubstituted $C_{1-6}$, $C_{1-4}$ or $C_{2-4}$ alkylene segment $(CH_2)_r$
each methylene group may optionally be independently substituted with ethers, amines, carbonyls, carboxylates, carbamates and combinations thereof; or
an oxyalkylene segment $(OCH_2)_k$ and k is a whole number from one to three, or wherein $R^{19}$ may be a mixture of alkylene and oxyalkylene segments and the sum of r and k is between 1 and 9;

wherein each $R^3$ and $R^4$ are independently a linear, branched, or cyclic alkyl group containing between one and six carbon atoms, a linear, branched, or cyclic alkoxy group containing between one and six carbon atoms, a linear or branched polyethyleneoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof;

wherein $R^5$ is a substituted or un-substituted linear or branched alkyl group having 1 to eight carbon atoms, or 1 to 4 carbon atoms, or methyl or butyl; or an aryl group, any of which may be substituted with one or more fluorine atoms.

12. The ophthalmic device of any of the foregoing claims wherein said at least one N-alkyl methacrylamide has the formula

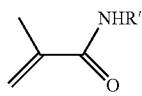

Formula I wherein R' is selected from linear, branched, or cyclic alkyl groups containing one to eight carbon atoms, benzyl or phenyl, any of which may be un-substituted or substituted with additional functional groups such as hydroxyl, amino, and combinations thereof.

13. The ophthalmic device of claim 12 wherein said N-alkyl methacrylamide is N-methyl methacrylamide.

14. The ophthalmic device of any of the foregoing claims wherein said first material has a modulus of about 1000 psi to about 200,000 psi, said first reactive mixture comprises about 5 to about 15 wt % at least one crosslinking component.

15. The silicone hydrogel of claim 14 wherein said modulus is about 1000 to about 100,000 psi, or about 5000 to about 100,000 psi.

16. The ophthalmic device of claim 14 wherein said first reactive mixture comprises about 20 to about 80 wt % or 30-80 wt % of said silicone containing component, based upon all reactive components.

17. The ophthalmic device of claim 14 wherein said first reactive mixture comprises about 5 wt % to about 50 wt % of at least one N-alkyl methacrylamide, based upon all reactive components.

18. The ophthalmic device of claim 14 wherein said first reactive mixture further comprises about 5 wt % to about 40 wt % of at least one hydroxyl functional silicone containing component.

19. The ophthalmic device of claim 18 wherein said hydroxyl functional silicone containing component is a hydroxyl functional polysiloxane selected from the group consisting of polydialkyl siloxanes and polydiaryl siloxanes.

20. The ophthalmic device of claim 19 wherein said first reactive mixture comprise about 10 to about 40 wt % hydroxyl functional polysiloxane.

21. The ophthalmic device of claim 19 or 20 wherein said hydroxyl functional polysiloxane comprises at least one polydimethyl siloxane.

22. The ophthalmic device of claim 19 or 20 wherein said hydroxyl functional silicone containing component is selected from the group consisting of monofunctional hydroxyl substituted poly(disubstituted siloxane)s of Formula XXI:

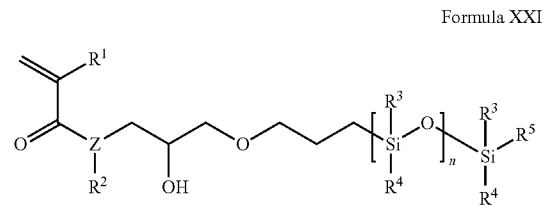

Formula XXI wherein Z is selected from O, N, S or $NR^1CH_2CH_2O$, when Z is O or S $R^2$ is not present;

$R^1$ is independently H or methyl;

$R^2$, $R^3$ and $R^4$ are independently a linear, branched, or cyclic alkyl group containing one to eight carbon atoms, any of which may be further substituted with at least one hydroxy group, and which may be optionally substituted with amide, ether, and combinations thereof; $R^3$ and $R^4$ may be independently selected from methyl, ethyl or phenyl, or may be methyl;

n is the number of siloxane units and is from 4 to 8 for the first monofunctional hydroxyl substituted poly(disubstituted siloxane) monomer, and $R^5$ is selected from straight or branched $C_1$ to $C_8$ alkyl groups, which may be optionally substituted with one or more hydroxyl, amide, ether, and combinations thereof; $R^5$ may be straight or branched $C_4$ alkyl, either of which may optionally be substituted with hydroxyl, or may be methyl.

23. The ophthalmic device of claim 19 or 20 wherein said hydroxyl functional silicone-containing component comprises mono-(2-hydroxy-3-methacryloxypropyl)-propyl ether terminated mono-n-butyl terminated polydimethylsiloxanes (OH-mPDMS) as shown in Formula XXIIa wherein n is between 4 and 30; and polydimethylsiloxanes having the chemical structures as shown in Formulae XXIIb through XXIIId, where n is between 4 and 30; $n^1$ $n^2$, and $n^3$ are independently between 4 to 100; $R^5$ is selected from straight or branched $C_1$ to $C_8$ alkyl groups, which may be optionally substituted with one or more hydroxyl, amide, ether, polyhydroxyl groups selected from straight or branched $C_1$ to $C_8$ groups having a formula of $C_fH_g(OH)_h$ wherein f=1-8 and g+h=2f+1 and cyclic $C_1$ to $C_8$ groups having a formula of $C_fH_g(OH)_h$ wherein f=1-8 and g+h=2f-1, and combinations thereof; or $R^5$ may be selected from methyl, butyl or hydroxyl substituted $C_2$-$C_5$ alkyl, and polycarbosiloxanes of Formula XXIV where a and b are between 4-100 and c is 4-8 and $R^1$ and $R^5$ are as defined above:

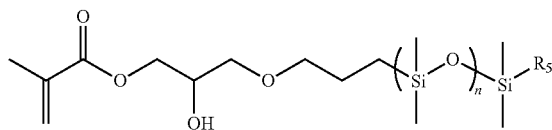

Formula XXIIa

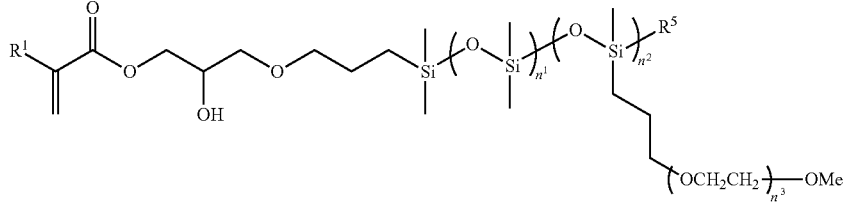

Formula XXIIb

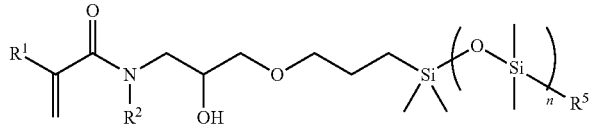

Formula XXIIIa

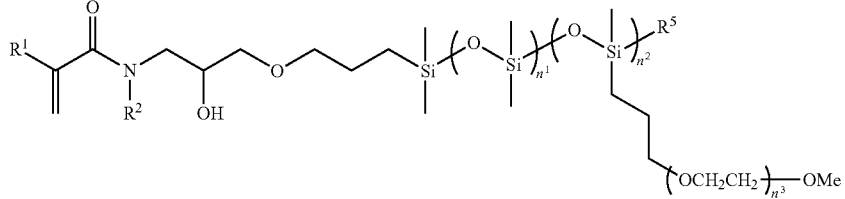

Formula XXIIIb

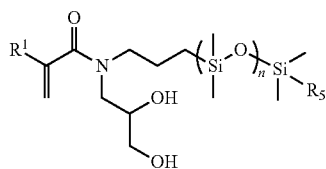

Formula XXIVa

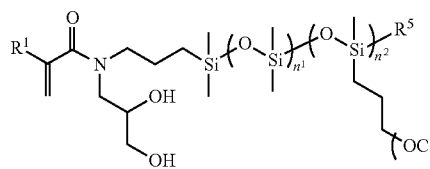

Formula XXIVb

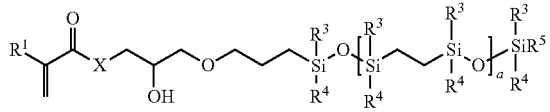

24. The ophthalmic device of any of the foregoing claims wherein said first reactive mixture further comprises at least one silicone-containing crosslinker.

25. The ophthalmic device of any of the foregoing claims wherein said first reactive mixture comprises about 4 to about 15 wt % said silicone-containing crosslinker.

26. The ophthalmic device of claim 24 wherein said silicone-containing crosslinker has the structure of Formula XXVI-XXXVI:

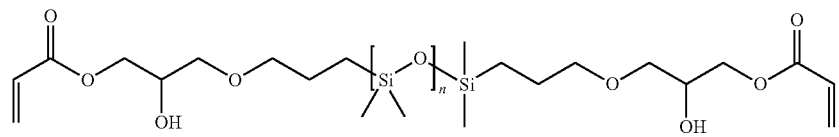

Formula XXVI

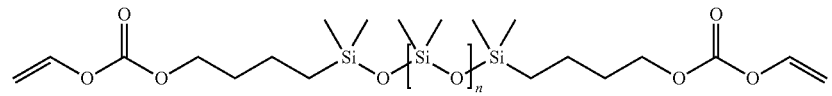

Formula XXVII

Formula XXVII
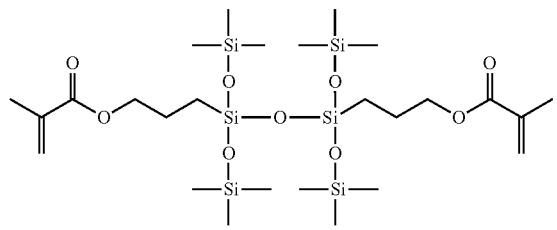
Formula XXIX
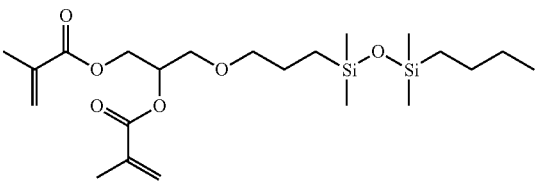
Formula XXX
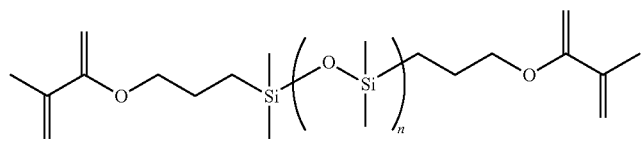
Formula XXXI
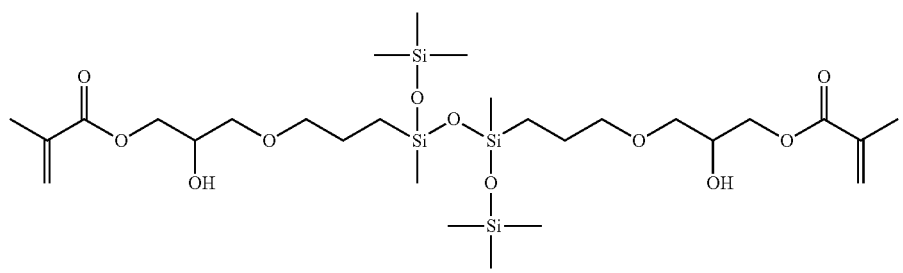
Formula XXXXII
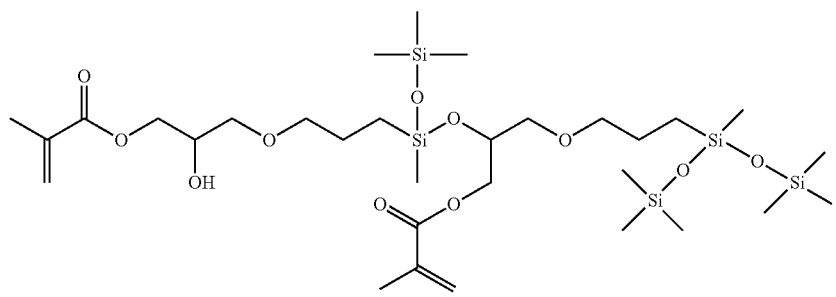
Formula XXXXIII
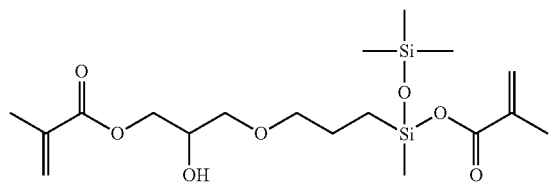
Formula XXXIV
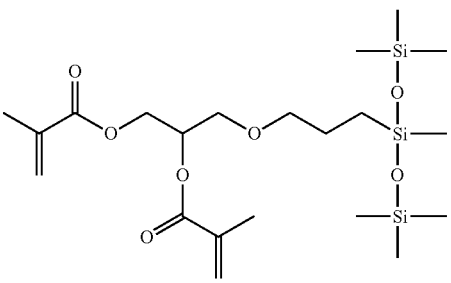
Formula XXXV
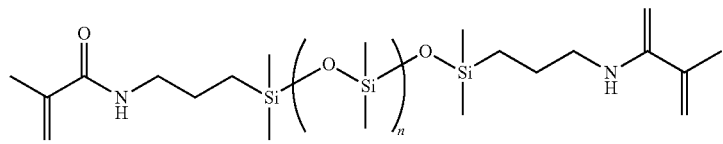

Formula XXXVI

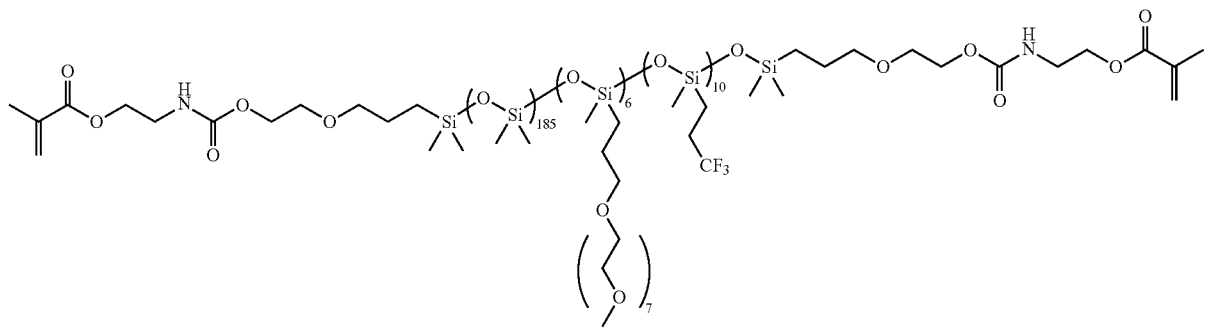

wherein n is between 1 and 200, 50 and 150, 50 and 100, or 10 and 50.

27. The ophthalmic device of any of claims 15-26 wherein said at least one N-alkyl methacrylamide has the formula

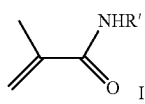

Formula I wherein $R_1$ is selected from linear, branched, or cyclic alkyl groups containing one to eight carbon atoms, benzyl or phenyl, any of which may be un-substituted or substituted with additional functional groups such as hydroxyl, amino.

28. The ophthalmic device of claim 27 wherein said N-alkyl methacrylamide is N-methyl methacrylamide.

29. The ophthalmic device of any of the foregoing claims wherein said first reactive mixture comprises about 20 to about 80 wt % of said silicone containing component, based upon all reactive components.

30. The ophthalmic device of any of the foregoing claims wherein said first reactive mixture comprises about 5 wt % to about 50 wt % of said at least one N-alkyl methacrylamide, based upon all reactive components.

31. The ophthalmic device of any of the foregoing claims, wherein the ophthalmic device comprises a toric contact lens.

32. The ophthalmic device according to any of the foregoing claims, wherein the second material comprises Young's modulus less than about 200 psi or 150 psi.

33. The contact lens of any of the foregoing claims wherein said central zone is about 9 mm or less in diameter.

34. The contact lens of any of the foregoing claims wherein said central zone has a diameter of between about 4 and about 7 mm.

35. A contact lens comprising:
an optic zone being formed from a first material having a first Young's modulus between about 1,000 psi and about 200,000 psi, said first material formed from a reactive mixture comprising at least one N-alkyl methacrylamide and at least one silicone-containing component; and
a peripheral zone formed from a material having a second Young's modulus less than about 200 psi.

36. A contact lens comprising:
an optic zone having a first stiffness, said optic zone being formed from a first material having a first Young's modulus between about 1,000 psi and about 200,000 psi, said first material formed from a reactive mixture comprising at least one N-alkyl methacrylamide and at least one silicone-containing component; and
a peripheral zone having a second stiffness formed from a material having a second Young's modulus less than about 200 psi, the first stiffness being greater than the second stiffness.

* * * * *

UNITED STATES PATENT AND TRADEMARK OFFICE
CERTIFICATE OF CORRECTION

PATENT NO.         : 10,209,534 B2                              Page 1 of 1
APPLICATION NO.    : 15/203414
DATED              : February 19, 2019
INVENTOR(S)        : Azaam Alli and Dola Sinha It is certified that error appears in the above-identified patent and that said Letters Patent is hereby corrected as shown below:

In the Claims

In Claim 26, Column 71, Formula XXX should read:

Formula XXX

Signed and Sealed this
Twenty-third Day of April, 2019

Andrei Iancu
*Director of the United States Patent and Trademark Office*